United States Patent [19]

Morita et al.

[11] Patent Number: 5,446,798
[45] Date of Patent: Aug. 29, 1995

[54] METHOD AND APPARATUS FOR MEASURING POSITION AND ORIENTATION OF AN OBJECT BASED ON A SEQUENCE OF PROJECTED POINTS

[75] Inventors: Toshihiko Morita, Kawasaki; Susumu Kawakami, Tama, both of Japan

[73] Assignee: Fujitsu Limited, Kawasaki, Japan

[21] Appl. No.: 201,082

[22] Filed: Feb. 24, 1994

Related U.S. Application Data

[63] Continuation of Ser. No. 929,505, Aug. 18, 1992, abandoned, which is a continuation of Ser. No. 655,373, filed as PCT/JP90/00811, Jun. 20, 1990, abandoned.

[30] Foreign Application Priority Data

Jun. 20, 1989 [JP] Japan ................................ 1-157906

[51] Int. Cl.$^6$ ........................................... G06K 9/00
[52] U.S. Cl. .................................. 382/154; 348/142; 356/12
[58] Field of Search ............... 382/1, 44, 45; 356/12, 356/20, 21, 22; 250/206.1, 206.2, 206.3; 348/135, 142

[56] References Cited

U.S. PATENT DOCUMENTS

| | | | |
|---|---|---|---|
| 4,791,482 | 12/1988 | Barry et al. | 358/107 |
| 4,893,183 | 1/1990 | Nayar | 358/107 |

FOREIGN PATENT DOCUMENTS

| | | | |
|---|---|---|---|
| 59-184973 | 10/1984 | Japan | G06K 9/00 |
| 63-113782 | 5/1988 | Japan | G06F 15/70 |
| 62-021305 | 1/1989 | Japan | G01B 11/00 |
| 1-318904 | 12/1989 | Japan | 356/12 |

OTHER PUBLICATIONS

Computer Vision Graphics And Image Processing, vol. 21, No. 1, Jan. 1983, New York, B. L. Yen et al., "Determining 3–d Motion And Structure of a Rigid Body Using the Spherical Projection".

Primary Examiner—David K. Moore
Assistant Examiner—Andrew W. Johns
Attorney, Agent, or Firm—Staas & Halsey

[57] ABSTRACT

A method for measuring a position and an orientation of an object. A sequence of movement points which line up on an intersection line of a predetermined projection surface and a plane which contains a predetermined projection center corresponding to a position of a camera, is obtained by obtaining projected points respectively generated for a plurality of positions of the camera, onto a point on the predetermined projection surface where the camera position is deemed as the projection center. Then, a sequence of reference points which line up on an intersection line of a plane containing the center of projection and the predetermined projection surface, shares a point with the sequence of movement points, and has the same cross ratio (inharmonic ratio) as a cross ratio of the sequence of movement points, is generated. An intersection point of intersection lines which are respectively intersection lines of the predetermined projection surface and planes each containing the center of projection and a pair of corresponding points one of which belongs to the sequence of movement points, and the other of which belongs to the sequence of reference points, is obtained. Then, geometrical information on the image element of the object when using the projection center in the three-dimensional space as a reference position is obtained based on the position of the above intersection point.

84 Claims, 36 Drawing Sheets

POINT SUBJECT TO MEASUREMENT

SEQUENCE OF MOVEMENT POINTS

MOVEMENT OF CAMERA $$\frac{\overline{AC}}{\overline{AD}} : \frac{\overline{BC}}{\overline{BD}}$$

METHOD AND APPARATUS FOR MEASURING POSITION AND ORIENTATION OF AN OBJECT BASED ON A SEQUENCE OF PROJECTED POINTS

This application is a continuation of application Ser. No. 07/929,505, filed Aug. 18, 1992, now abandoned, which is a continuation application Ser. No. 07/655,373, filed as PCT/JP90/00811, Jun. 20, 1990, now abandoned.

BACKGROUND OF THE INVENTION

1. Field of the Invention

The present invention relates to a method for measuring a position and an orientation of an object.

Recently, methods for measuring a position and an orientation of an object in a three-dimensional space have been extensively studied for realizing functions of human eyes by an unmanned mechanism. In such a measuring method, an object is captured as an image by using a camera, and then three-dimensional information is obtained on a position or an orientation of a point, a line segment, or the like which constitutes a contour of an object, e.g., a position or an orientation of a point, or a line segment from the position of the camera.

The above measuring method in a three-dimensional space is used, in particular, in an environment recognition apparatus in a robot. For example, in a movable robot, the robot must be equipped with an environment recognition apparatus for the robot to recognize an environment of the robot, and this environment may include an object. For example, the robot needs three-dimensional information on a position and an orientation of an object when the robot works with the object. Therefore, progress is required in the method for measuring a position and an orientation of an object in a three-dimensional space.

2. Description of the Related Art

Responding to the above requirement, a three-dimensional measuring method according to a so-called stereo method, has been studied. In the stereo method, as shown in FIG. 1, two cameras are arranged apart from each other by a predetermined distance, and a three-dimensional measurement is carried out in accordance with the principle of trigonometrical survey using parallaxes which are obtained from images caught by the cameras. However, it is difficult to determine correspondence between points in the two images, and results of the measurement are unstable.

A light projection method has been proposed as another three-dimensional method. That method is realized by replacing one of the cameras in the above stereo method with a light projector as shown in FIG. 2. For example, a distance from a camera to an object can be obtained based on the position of the camera and a direction of the projected light in accordance with the principle of trigonometrical survey, by projecting a spot light onto the object, and then taking an image of the object including a reflected light from the object. Other patterns of light, e.g., a slit pattern and the like, have been proposed in addition to the above spot light. The above light projection method is superior to the stereo method in reliability because the problem of the difficulty to obtain the correspondence of the points in the two images does not exist. However, the light projection method is not suitable for measurement of a large distance, and is liable to be affected by a surface condition of an object.

Further, a three-dimensional measuring method based on the principle of a moving stereographic view has been proposed as an other three-dimensional measuring method which does not contain the above problems. That technique is disclosed in the Japanese Unexamined Patent Publication Nos. 59-184973 and 63-113782.

In the above three-dimensional measuring method based on the principle of moving stereographic view, a position and an orientation of an object in the environment of a camera is three-dimensionally measured by taking images of the object while moving the camera, as shown in FIG. 3.

For example, a method for measuring a position and an orientation of a line segment based on the above-disclosed principle of moving stereographic view, contains the following steps. First, an image of contours is generated by preprocessing an original image, and projecting the contour image onto a sphere. Then, a projected point S is extracted which is generated by further spherically projecting a projected line segment which is projected on the sphere. Next, an orientation of the line segment is measured based on the projected points $S^0$, $S^1$, $S^2$, . . . which are obtained at a plurality of positions of taking an image (shooting the object). Finally, a distance is measured to the line segment based on the projected points $S^0$, $S^1$, $S^2$, . . . , and the information on the orientation of the line segment.

In the above processes of extraction of the contours and spherical projection, a line segment L in a three-dimensional space, is projected onto a sphere to obtain a projected line segment 1, as shown in FIG. 4. In the above process of extracting a line segment, an accumulating intersection point S is obtained (hereinafter called projected point S) of great circles which are obtained by spherically projecting respective points constituting the projected contour 1 onto the sphere as shown in FIG. 5, is obtained, where spherical projection of a point onto a sphere means to generate a great circle having its pole at the point which is to be projected (similar to the correspondence between the equator and the north pole on the earth) as shown in FIG. 6. The line segment in a three-dimensional space is projected onto a point on a sphere by obtaining the above accumulating intersection point (projected point) S, where the projected point S is a pole of a great circle which contains a projected line segment 1.

Next, in the above process of measuring an orientation of a line segment, as shown in FIG. 7, the projected points $S^0$, $S^1$, $S^2$, . . . which are obtained at a plurality of positions for taking an image (shooting the object), are respectively further spherically projected onto a sphere, i.e., great circles respectively having their poles at the above projected points $S^0$, $S^1$, $S^2$, . . . are generated, and then an accumulating intersection point SS (hereinafter called projected point SS) is extracted therefrom. Since in this case, a direction of a vector directing from the center of the sphere to the projected point SS, accords with the orientation of the line segment L, the orientation of the line segment L in the three-dimensional space can be obtained from the coordinate of the projected point SS on the sphere.

Finally, in the process of measuring a distance to the line segment, as shown in FIG. 8, each direction $Sh^t$ (t=0, 1, 2, . . . ) of a perpendicular line which is dropped from each shooting point $C^t$ (t=0, 1, 2, . . . , each position of the camera) to the line segment L is obtained based on each of the above projected points $S^t$ (t=0, 1, 2, . . .) and the projected point SS, and then, shooting points $\tau^t$ (t=0, 1, 2, . . .) are obtained on the sphere by projecting the above shooting points $C^t$ (t=0, 1, 2, . . .) of the camera onto the sphere, respectively. Then, each shooting point $\tau^t$ (t=0, 1, 2, . . .) and a corresponding direction $Sh^t$ (t=0, 1, 2, . . .) of the perpendicular line are connected by a great circle on the sphere. Since the accumulating intersection point Q of these great circles indicates the foot of the perpendicular line which is dropped from each shooting point $C^t$ (t=0, 1, 2, . . . , each position of the camera) to the line segment L, the position of the line segment L in the three-dimensional space (the distance to the line segment) can be obtained by reversely projecting the accumulating intersection point Q onto a measurement plane $\pi$.

However, in the above method, there is a drawback that an environment having complicated scenery is liable to lead an erroneous measuring result. That is, since, in the above process for measuring the orientation of a line segment in the three-dimensional space, accumulating intersection points are obtained by spherically projecting many projected points which have been obtained for many line segments in the three-dimensional space by moving the camera, onto a sphere, is liable to lead to an erroneous accumulating intersection point being obtained from the projected points for different line segments.

As explained above, the above method by the moving stereographic view does not stably function in an environment having complicated scenery.

SUMMARY OF THE INVENTION

An object of the present invention is to provide a method for measuring a position and an orientation of an object, whereby three-dimensional information can be extracted only from a sequence of projected points corresponding to a point or a line segment in a contour of an object, among projected points which are generated corresponding to movement of a camera, to improve credibility of the three-dimensional measurement.

According to a first aspect of the present invention, there is provided a method for measuring a position and an orientation of an objects. The method includes a first step for obtaining a sequence of movement points ($x^t$, t=0, 1, 2, . . .) which line up on an intersection line of a predetermined plane or surface of the second order and a plane which contains a predetermined center of projection corresponding to a position of a camera, by obtaining projected points which are respectively generated for a plurality of positions of the camera corresponding to movement of the camera in a predetermined direction by projecting an image element of the object which is subject to the measurement, onto a point on the predetermined plane or surface of the second order, where the position of the camera is deemed as the center of projection. A second step is included for generating a sequence of reference points ($\tau^t$, t=0, 1, 2, . . .) which line up on an intersection line of a plane containing the center of projection and the predetermined plane or surface of the second order. The sequence of reference points shares a point with the sequence of movement points ($x^t$, t=0, 1, 2, . . .), and has the same cross ratio (inharmonic ratio) as a cross ratio of the sequence of movement points ($x^t$, t=0, 1, 2, . . .). A third step is provided for obtaining an intersection point of intersection lines which are respectively intersection lines of the predetermined plane or surface of the second order and planes each containing the center of projection and a pair of corresponding points one of which belongs to the sequence of movement points ($x^t$, t=0, 1, 2, . . .), and the other of which belongs to the sequence of reference points ($\tau^t$, t=0, 1, 2, . . .). Finally, a fourth step is provided for obtaining geometrical information on the image element of the object when using the position of the camera in the three-dimensional space as a reference position, based on the position of the above intersection point.

According to a second aspect of the present invention, there is provided a method for measuring a position and an orientation of an object, which includes a first step for obtaining a sequence of movement points ($x^t$, t=0, 1, 2, . . .) which line up on an intersection line of a predetermined plane or surface of the second order and a plane which contains a predetermined center of projection corresponding to a position of a camera, by obtaining projected points which are respectively generated for a plurality of positions of the camera corresponding to movement of the camera in a predetermined direction by projecting an image element of the object which is subject to the measurement, onto a point on the above predetermined plane or surface of the second order, where the position of the camera is deemed as the center of projection. A second step is provided for generating a first sequence of reference points ($\tau^t$, t=0, 1, 2, . . .) which line up on a second intersection line of a plane containing the center of projection and the predetermined plane or surface of the second order, shares a point with the sequence of movement points ($x^t$, t=0, 1, 2, . . .), and has the same cross ratio (inharmonic ratio) as a cross ratio of the sequence of movement points ($x^t$, t=0, 1, 2, . . .). A third step is provided for generating a second sequence of reference points ($-\tau^t$, t=0, 1, 2, . . .) which line up, in the opposite direction to the first sequence of reference points, on the above second intersection line, shares its beginning point ($\tau^0$) with the first sequence of reference points ($\tau^t$, t=0, 1, 2, . . .), and has the same cross ratio as the first sequence of reference points). A fourth step is provided for obtaining a first intersection point of intersection lines which are respectively intersection lines of the predetermined plane or surface of the second order and planes each containing the center of projection and a pair of corresponding points one of which belongs to the sequence of movement points ($x^t$, t=0, 1, 2, . . .), and the other of which belongs to the first sequence of reference points ($\tau^t$, t=0, 1, 2, . . .). A fifth step is provided for obtaining a second intersection point of intersection lines which are respectively intersection lines of the predetermined plane or surface of the second order and planes each containing the center of projection and a pair of corresponding points one of which belongs to the sequence of movement points ($x^t$ t=0, 1, 2, . . .) and the other of which belongs to the second sequence of reference points ($-\tau^t$, t=0, 1, 2, . . .). Finally, sixth step is provided for obtaining geometrical information on the image element of the object when using the position of the camera in the three-dimensional space as a reference position, based on the positions of the above first and second intersection point.

According to a third aspect of the present invention, there is provided a method for measuring a position and an orientation of an object which includes: a first step for obtaining a sequence of movement points ($x^t$, t=0, 1, 2, . . .) which line up on an intersection line of a predetermined plane or surface of the second order and a plane which contains a predetermined center of projection corresponding to a position of a camera, by obtaining projected points which are respectively generated for a plurality of positions of the camera corresponding to movement of the camera in a predetermined direction by projecting an image element of the object which is subject to the measurement, onto a point on the above predetermined plane or surface of the second order, where the position of the camera is deemed as the center of projection). A second step is provided for obtaining as a reference point for plane projection an intersection point of the predetermined plane or surface of the second order and a straight line which passes through the center of projection and is perpendicular to an arbitrary projection plane which contains the predetermined center of projection). A third step is provided for obtaining a sequence of projected movement points ($x^t$, $t=0, 1, 2, \ldots$) by obtaining intersection points at which an intersection line of the predetermined plane or surface of the second order and the projection plane, intersects intersection lines of the predetermined plane or surface of the second order and planes each containing the above center of projection, the above reference point for plane projection, and a point of the sequence of movement points ($x^t$, $t=0, 1, 2, \ldots$), where the projected movement points ($x^t$, $t=0, 1, 2, \ldots$) are respectively projected points of the sequence of movement points ($x^t$, $t=0, 1, 2, \ldots$) on the intersection line of the predetermined plane or surface of the second order and the projection plane). A fourth step is provided for generating a sequence of reference points ($\tau^t$, $t=0, 1, 2, \ldots$) which line up on an intersection line of a plane containing the center of projection and the predetermined plane or surface of the second order, shares a point with the sequence of projected movement points ($x^t$, $t=0, 1, 2, \ldots$), and has the same cross ratio (inharmonic ratio) as a cross ratio of the sequence of movement points ($x^t$, $t=0, 1, 2, \ldots$). A fifth step is provided for obtaining an intersection point of intersection lines which are respectively intersection lines of the predetermined plane or surface of the second order and planes each containing the center of projection and a pair of corresponding points one of which belongs to the sequence of projected movement points ($x^t$, $t=0, 1, 2, \ldots$), and the other of which belongs to the sequence of reference points ($\tau^t$, $t=0, 1, 2, \ldots$). Finally, a sixth step is provided for obtaining geometrical information in the projection plane on the image element of the object when using the position of the camera in the three-dimensional space as a reference position, based on the position of the above intersection point.

Apparatuses for realizing the above methods for measuring a position and an orientation of an object according to the first to third aspects of the present invention are provided which include a shooting means for taking an image element of of an object which is subject to the measurement, at a plurality of camera positions. These apparatuses also include a data processing means for processing image data which is taken by the shooting means, and the data processing means respectively comprise means for executing the operations in the above respective steps. These means are respectively realized by a calculation circuit for processing data in each step.

DESCRIPTION OF THE PREFERRED EMBODIMENTS (1) Method for Measuring a Position and an Orientation of an Object According to the First Aspect of the Present Invention As mentioned before, according to the first aspect of the present invention, in the first step, a sequence of movement points ($x^t$, t=0, 1, 2, ...) which line up on an intersection line of a predetermined plane or surface of the second order and a plane which contains a predetermined center of projection corresponding to a position of a camera, is obtained by obtaining projected points which are respectively generated for a plurality of positions of the camera corresponding to movement of the camera in a predetermined direction by projecting an image element of the object which is subject to the measurement, onto a point on the predetermined plane or surface of the second order, where the position of the camera is deemed as the center of projection.

Next, in the second step, a sequence of reference points ($\tau^t$, t=0, 1, 2, ...) which line up on an intersection line of a plane containing the center of projection and the predetermined plane or surface of the second order, shares a point with the sequence of movement points ($x^t$, t=0, 1, 2, ...), and has the same cross ratio (inharmonic ratio) as a cross ratio of the sequence of movement points ($x^t$, t=0, 1, 2, ...), is generated.

In the third step, an intersection point is obtained of intersection lines which are respectively intersection lines of the predetermined plane or surface of the second order and planes each containing the center of projection and a pair of corresponding points one of which belongs to the sequence of movement points ($x^t$, t=0, 1, 2, . . .) and the other belonging to the sequence of reference points ($\tau^t$, t=0, 1, 2, . . .).

Then, in the fourth step, geometrical information on the image element of the object when using the position of the camera in the three-dimensional space as a reference position, based on the position of the above intersection point, is obtained.

Figure 1:
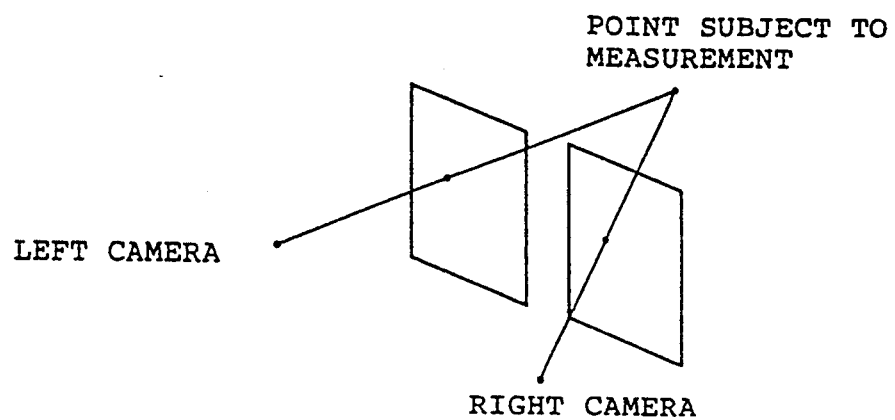
FIG. 1 is a diagram for explaining the stereo method.
Figure 2:
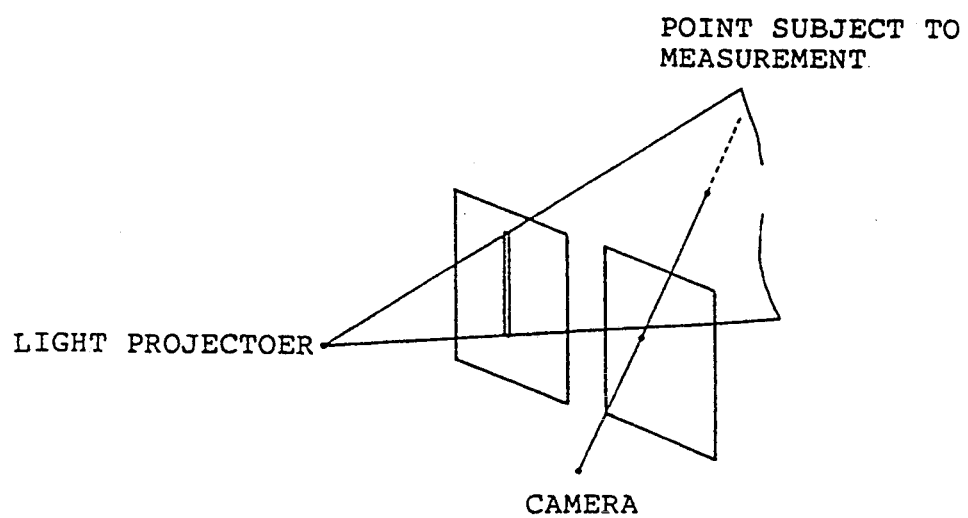
FIG. 2 is a diagram for explaining the light projection method.
Figure 3:
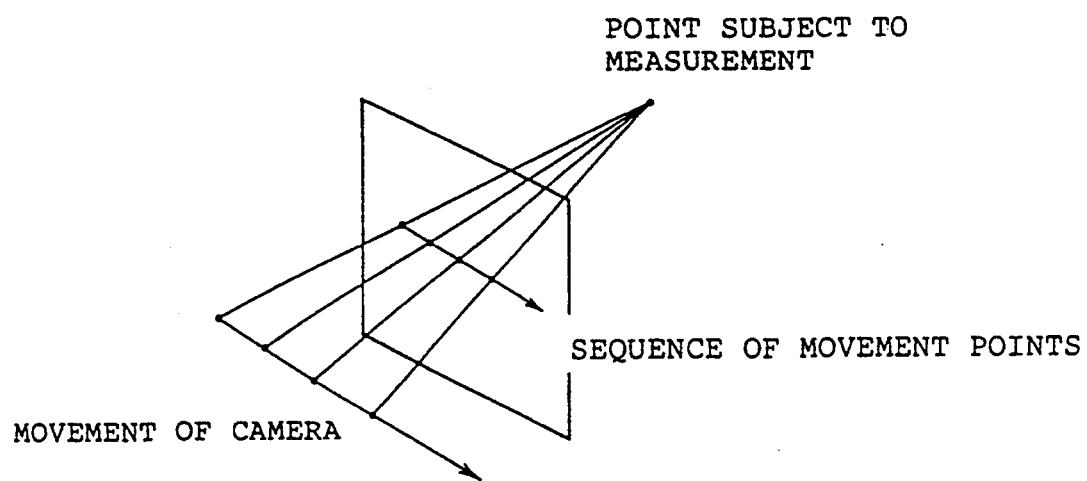
FIG. 3 is a diagram for explaining the three-dimensional measuring method based on the principle of moving stereographic view, as a method for three-dimensional measurement of an object.
Figure 4:
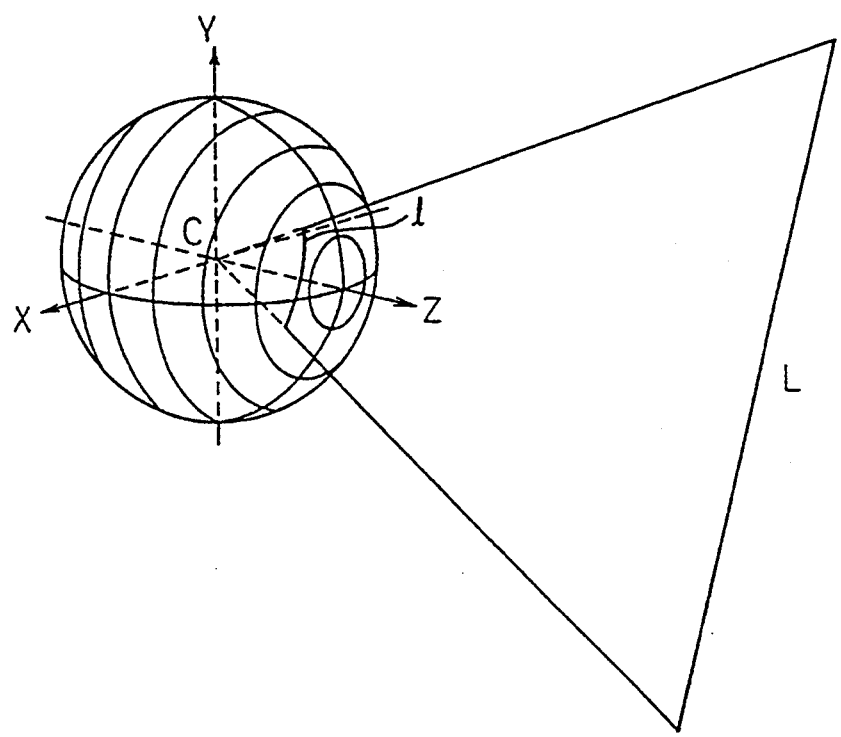
FIG. 4 is a diagram showing an example of a projection of a line segment L in a three-dimensional space on a sphere.
Figure 5:
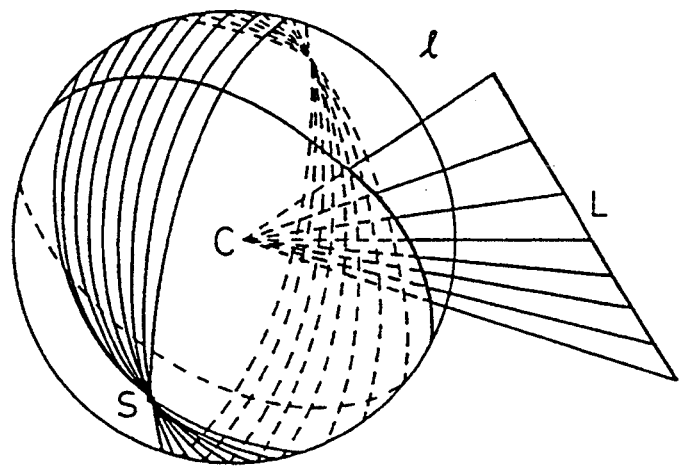
FIG. 5 is an example diagram showing an operation of obtaining a projected point by projecting a line segment L in a three-dimensional space onto a point on a sphere.
Figure 6:
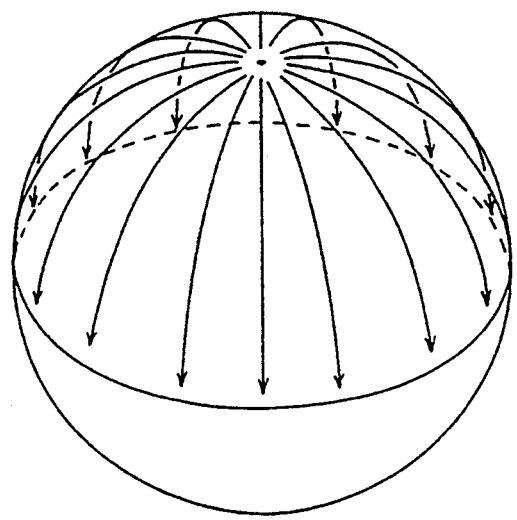
FIG. 6 is a diagram showing an operation of projection of a point on a sphere to a great circle.
Figure 7:
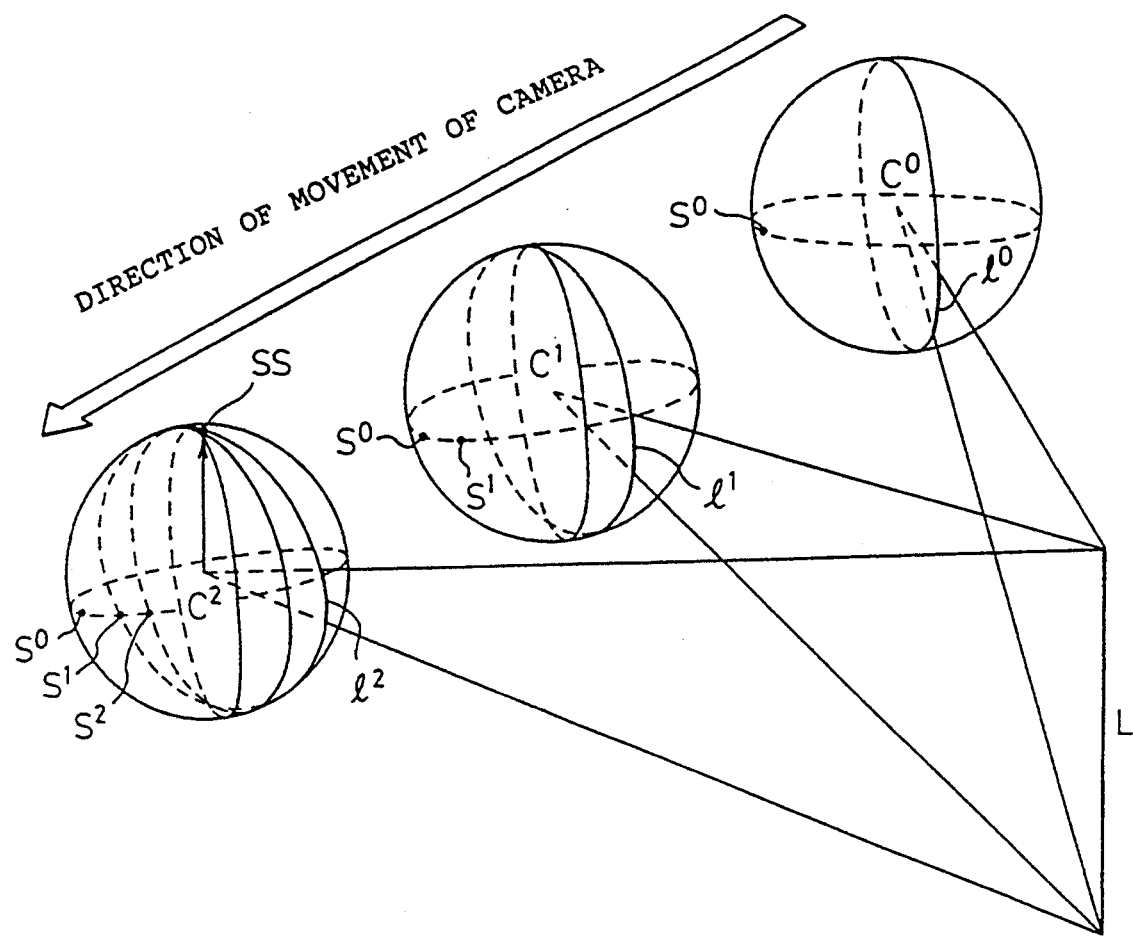
FIG. 7 is an example diagram showing an operation of obtaining an orientation of a line segment L in a three-dimensional space by obtaining projected points on a sphere of the line segment L, at a plurality of camera positions.
Figure 8:
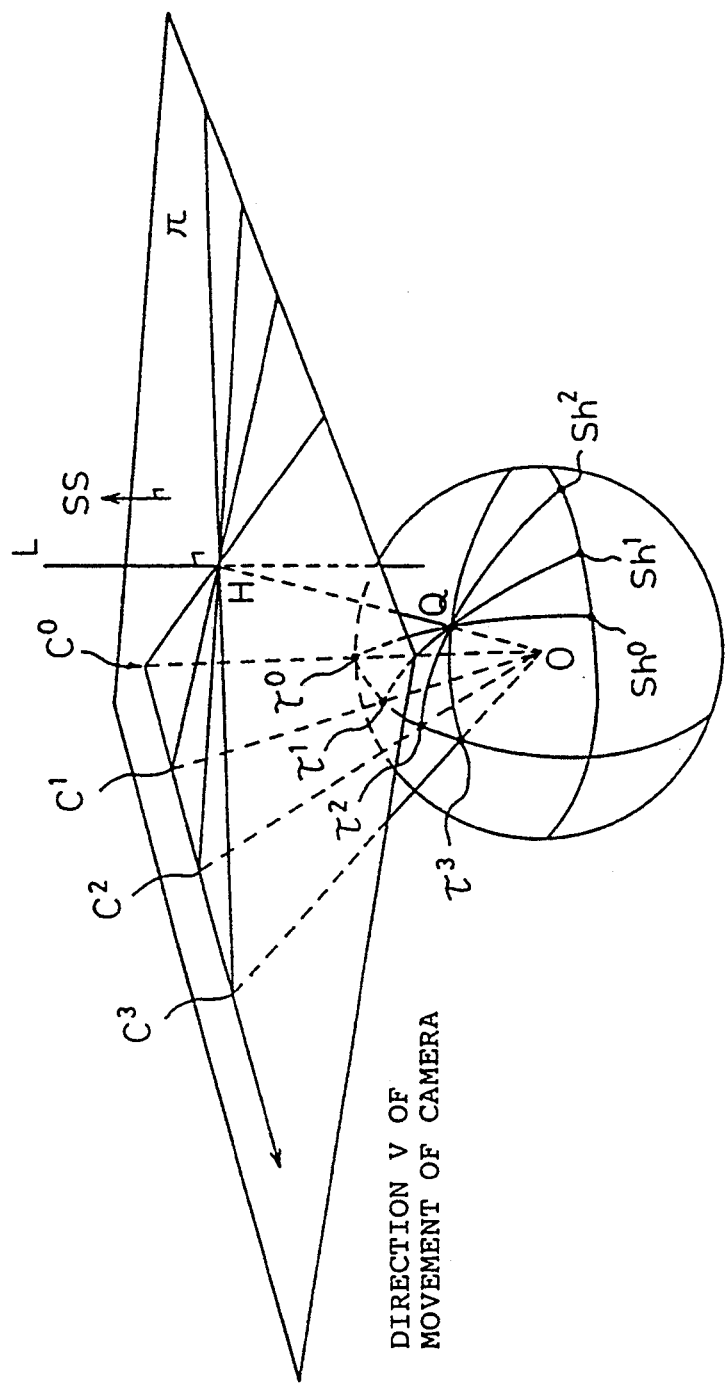
FIG. 8 is an example diagram showing an operation of obtaining a position of a line segment L (distance to the line segment) in a three-dimensional space by connecting, by a great circle, each direction $Sh^t$ ($t=0, 1, 2, \ldots$) of a perpendicular line which is dropped from each shooting point $C^t$ ($t=0, 1, 2, \ldots$, each position of the camera) to the line segment L, and shooting points $\tau^t$ ($t=0, 1, 2, \ldots$) which are obtained by projecting the above shooting points $C^t$ ($t=0, 1, 2, \ldots$) of the camera on the sphere, respectively, to obtain an accumulating intersection point Q, and inversely projecting the accumulating intersection point Q on a measurement plane $\pi$.
Figure 9:
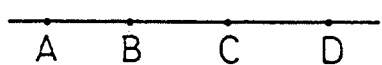
FIG. 9 is a diagram for explaining the cross ratio (inharmonic ratio)

In the above second step, the cross ratio (inharmonic ratio) is defined, for example, by the relationship AC/AD:BC/BD of the distances between four points A, B, C, and D lining up on a straight line on a plane, as shown in FIG. 9.

Figure 10:
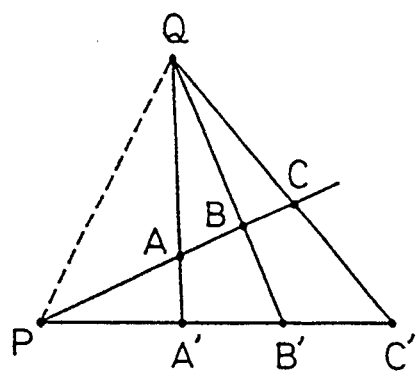
FIG. 10 is an example diagram showing an intersection point of lines connecting corresponding points in two sequences of points sharing a common point, and having the same cross ratio (inharmonic ratio)

In addition, it is generally known that, when two sequences of points respectively lining up on different lines on a predetermined plane or surface of the second order, share a common point, and have the same cross ratio, the intersection lines respectively connecting corresponding points on the two sequence of points intersect at one point, where each intersection line is defined by a line on which the predetermined plane or surface of the second order and a plane containing a center of projection and the corresponding points intersect. For example, on a plane, as shown in FIG. 10, the cross ratio in the sequence of points P, A, B, and C on the line PABC and the cross ratio in the sequence of points P, A', B', and C' on the line PA'B'C' are equal, since the point P is common to the two sequences of points, all the straight lines respectively connecting corresponding points on the two sequences of points P, A, B, and C, and P, A', B', and C', intersect at one point Q. The above theorem exists for the other surfaces of the second order, for example, a sphere, a circular cylinder, a paraboloid, a hyperboloid, and the like. Thus, when one sequence of points is the aforementioned sequence of movement points ($x^t$, t=0, 1, 2, . . .), since the sequence of reference points ($\tau^t$, t=0, 1, 2, . . .) shares one point with the sequence of movement points, and has the same cross ratio as the sequence of movement points on the surface of the second order, the above two lines (as described above) respectively connecting corresponding points on the two sequence of points intersect at one point on the surface of the second order.

The equality of the cross ratios of the sequence of movement points ($x^t$, t=0, 1, 2, . . .) and the sequence of reference points ($\tau^t$, t=0, 1, 2, . . .) on the predetermined plane or surface of the second order, is generally defined by the following equation:

$$\frac{\sin\ x^t x^{t+2}}{\sin\ x^t x^{t+3}} : \frac{\sin\ x^{t+1} x^{t+2}}{\sin\ x^{t+1} x^{t+3}} = \frac{\sin\ \tau^t \tau^{t+2}}{\sin\ \tau^t \tau^{t+3}} : \frac{\sin\ \tau^{t+1} \tau^{t+2}}{\sin\ \tau^{t+1} \tau^{t+3}}$$

$(t = 0, 1, 2, \ldots)$

In the above equation, or the like denotes an angle at the center of projection between the direction from the center of projection to the point $x^t$ and the direction from the center of projection to the point $x^{t+2}$. In addition, the above-mentioned corresponding points are, for example, $x^t$ and $\tau^t$, $x^{t+1}$ and $\tau^{t+1}$, and the like.

Figure 11:
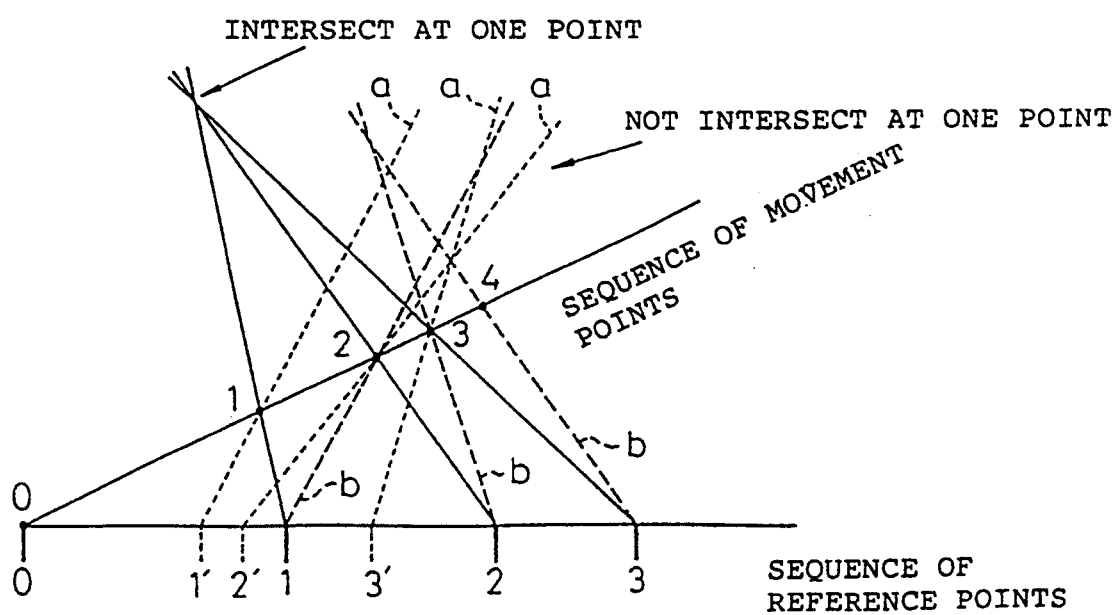
FIG. 11 is a diagram for explaining the principle of detection of a sequence of movement points.

As shown in FIG. 11, straight lines (a) respectively connecting corresponding points of a sequence of movement points 1, 2, 3 and a sequence of reference points 1', 2', 3' which has a different cross ratio from the cross ratio of the sequence of movement points, will not intersect at a point, and straight lines (b) connecting points which do not correspond to each other (in a different phase from each other), will not intersect at a point.

Each point of the above sequence of movement points ($x^t$, t=0, 1, 2, . . .) is obtained by projecting a direction of shooting of a specific image element, for example, a point in a three-dimensional space by the camera, on a surface of the second order (for example, a sphere) from a predetermined center of projection (for example, the position of the camera), where the image element is located far from the camera, and, for example, the camera may be attached to an arm of a robot. The position (polar coordinate) of the projected point on the surface of the second order (for example, the sphere) moves on the surface of the second order, with the movement of the camera. For example, when the camera moves in a predetermined direction, a sequence of movement points is generated on the surface of the second order (the sphere) by the movement of the projected point with pitches corresponding to pitches of the movement of the camera. Instead of moving the camera, a plurality of cameras may be arranged with the above pitches.

When generating a sequence of reference points having the same cross ratio, on the predetermined plane or surface of the second order, the common point of the sequence of movement points and the sequence of reference points, may be the beginning points $x^0$, $\tau^0$, or the points at infinity $x^\infty$, $\tau^\infty$ of the two sequences of points. The point at infinity $x^\infty$ is defined as an intersection point of the predetermined plane or surface of the second order and a straight line passing through the center of projection and being parallel to a direction of shooting the image element of the object in the three-dimensional space by the camera when the camera is moved to infinity in the above predetermined direction. Arbitrary i-th points $x^i$ and $\tau^i$ of the two sequences of points can be selected as the common point, where i is an arbitrary integer. The selection of the arbitrary i-th points $x^i$ and $\tau^i$ as the common point, is equivalent to the selection of the beginning points $x^0$, $\tau^0$ as the common point because the arbitrary i-th points $x^i$ and $\tau^i$ can be regarded as new beginning points instead of the above beginning points $x^0$, $\tau^0$.

Hereafter, a concrete example wherein the common point of the sequence of movement points and the sequence of reference points is the beginning points $x^0$, $\tau^0$ and a concrete example wherein the common point is the points at infinity $x^\infty$, $\tau^\infty$ of the two sequences of points, are explained, where the above-mentioned method for measuring a position and an orientation of an object, according to the first aspect of the present invention, is denoted as a projection measurement method.

(2) The Projection Measurement Method ($x^0 = \tau^0$)

First, the case wherein the common point of the sequence of movement points and the sequence of reference points is the beginning points is explained. In this explanation, the above-mentioned predetermined plane or surface of the second order is a sphere, and the center of projection is the center of the sphere O.

When projection is repeated while moving a camera in parallel with a predetermined pitch $\Delta X$, the direction of shooting an object moves relatively in the opposite direction with the pitch $\Delta X$, and a sequence of movement points $x^t$ (t=0, 1, 2, . . . ; t is a frame number) consisting of the projected points, is obtained.

Figure 12:
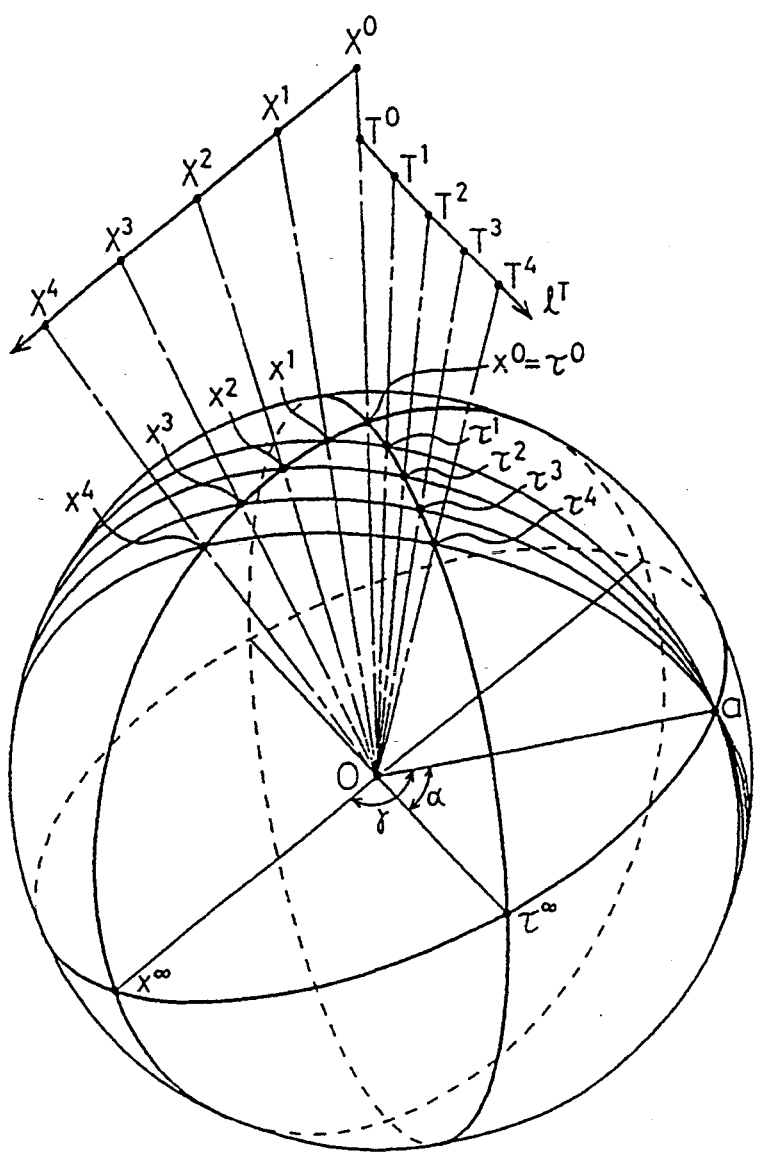
FIG. 12 is a diagram stereographically showin a relationship of positions on a sphere, of sequences of points and intersection points in the projection measurement method of sharing a beginning point.

A point $T^0$ is determined at an arbitrary position on a straight line $Ox^0$, and an arbitrary straight line π passing through the point $T^0$, to generate a sequence of reference points $\tau^t$ which has the same cross ratio (inharmonic ratio) as the cross ratio of the sequence of movement points $x^t$, and shares their beginning points $x^0$, $\tau^0$ with the sequence of movement points $x^t$. Next, a sequence of points $T^1$, $T^2$, ... is generated on the straight line lT from the point $T^0$ with the pitch $\Delta X$. Then, a sequence of points $\tau^t$ (t=0, 1, 2, ...) which have the same cross ratio (inharmonic ratio) as the cross ratio of the sequence of movement points $x^t$, and share their beginning points $x^0$, $\tau^0$ with the sequence of movement points $x^t$, is obtained by projecting the sequence of points $T^t$ (t=0, 1, 2, ...) from the center of projection O onto the sphere. In this case, the point at infinity ($\tau^\infty$) of the sequence of points ($\tau^t$, t=0, 1, 2, ...) can be obtained as an intersection point of a straight line passing through the center of projection and being parallel to the straight line lT, and the sphere, as shown in FIG. 12. Further, the above straight line lT can be determined so that the condition IT⊥OT$^0$ is satisfied. This is equivalent to determining the sequence of reference points $\tau^t$ ( t=0, 1, 2, ...) as follows. First, an arbitrary great circle l$\tau$ passing through the point $x^0$ is determined, and then, points $\tau^t$(t=0, 1, 2, ...) are determined on the Great circle by the following equation, $$=\tan^{-1}(\Delta X \cdot t/R^0) \qquad (1)$$

where $R^0 = \overline{OT^0}$. \qquad (2)

In this case, is equal to a length of arc $\tau^0\tau^t$ on the sphere (the great circle l$\tau$), i.e., an angle at the center of projection O between the direction to the point $\tau$hu o and the direction to the point $\tau^t$, where the direction to the point $\tau^\infty$ is perpendicular to the direction to the point $\tau^0$ on the great circle l$\tau$. That is, =90°. \qquad (3)

Figure 13:
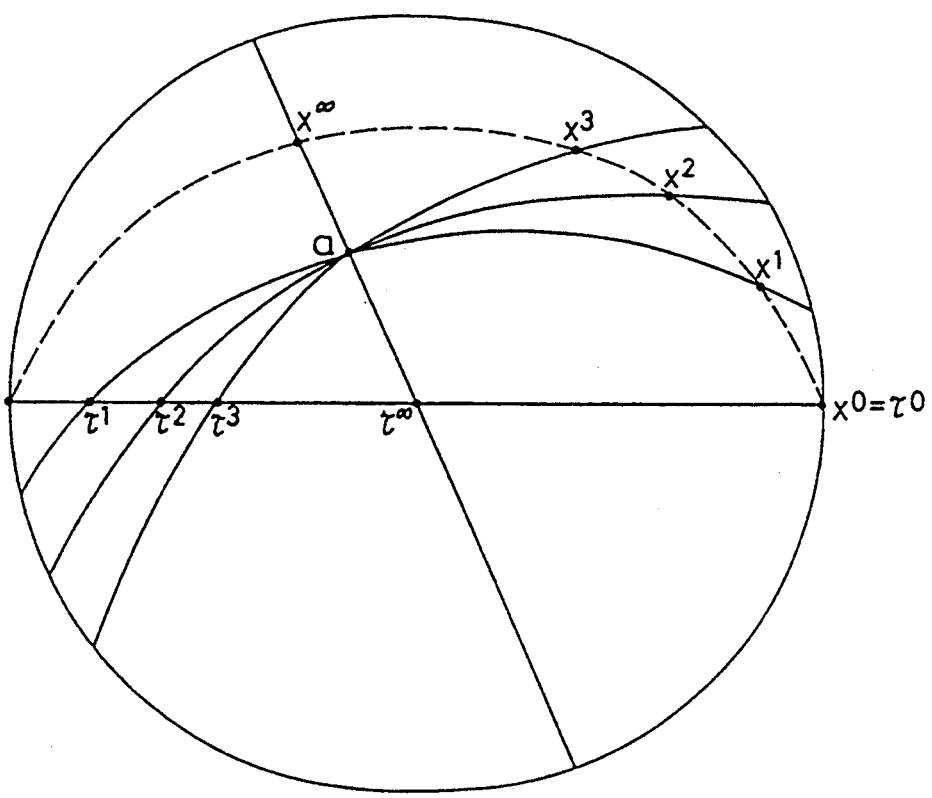
FIG. 13 is a plan view of relationship of positions on a sphere, of sequences of points and intersection points in the projection measurement method of sharing a beginning point.

FIG. 13 is a plan view of the above sphere in a direction parallel to a straight line passing through the center of projection O and the point at infinity $\tau^\infty$ of the sequence of reference points when the equation (3) exists. When the equation IT⊥OT$^0$ is satisfied, the equation (3) exists, and therefore, the point $\tau^\infty$ is located at the center of the sphere in the plan view of FIG. 13.

According to the third step of the first aspect of the present invention, each point of the sequence of movement points ($x^t$, t=0, 1, 2, ...) is connected with a corresponding point (corresponding to the same frame number t) of the sequence of reference points ($\tau^t$, t=0, 1, 2, ...) by an intersection line of the sphere and a plane containing the above corresponding points and the center of projection O, i.e., a great circle passing through the corresponding points (FIGS. 12 and 13). As explained before with reference to FIG. 10, when the sequence of movement points ($x^t$, t=0, 1, 2, ...) and the sequence of reference points ($\tau^t$, t=0, 1, 2, ...) share a common point ( the beg inning point $x^0 = \tau^0$), and have the same cross ratio, and the corresponding points of the sequence of movement points and the sequence of reference points are connected by great circles, respectively, the great circles intersect at a point on the sphere. The intersection point is indicated by "a" in FIGS. 12 and 13.

When an angle between a direction to the point at infinity ($x^\infty$) of the sequence of movement point and a direction to the point at infinity ($\tau^\infty$) of the sequence of reference points ($\tau^t$, t=0, 1, 2, ...) at the center of projection, is denoted by $\gamma$, and an angle between a direction to the intersection point and a direction to the point at infinity ($\tau^\infty$) of the sequence of reference points ($\tau^t$, t=0, 1, 2, ...) at the center of projection, is denoted by $\alpha$, the distance r from an initial position of the camera to a point X of the object which is subject to the measurement is obtained by $$r = R^0 \cdot |\sin(\gamma - \alpha)|/|\sin\alpha|. \qquad (4)$$

Thus, the position of the point X in the three-dimensional space when being viewed from the initial position of the camera is obtained by the following equation.

$$X^0 = r \cdot Ox^0/|Ox^0| \qquad (5)$$

where $Ox^0/|Ox^0|$ is a shot direction vector when viewing the point X from the camera. The equations (4) and (5) generally exist regardless of the above relationship of IT⊥OT$^0$. In addition, the common point may be any point $x^t$ other than $x^0$ (except $x^\infty$), and in this case, a distance from the point corresponding to the frame number t which corresponds to the common point $x^t$ is obtained.

As explained above, $x^\infty$ must be known for obtaining the distance r. However, when a trace of the sequence of points is known, $x^\infty$ can be obtained from an intersection point of the trace and a great circle $\tau^\infty$a.

Thus, according to the first aspect of the present invention, when the beginning point ($\tau^0$) of the sequence of reference points is located at the same position as the beginning point ($x^0$) of the sequence of movement points, and the initial position ($x^0$) (two degrees of freedom) and the point at infinity ($x^\infty$) (two degrees of freedom) on the projection surface, of the above point X of the object which is subject to the measurement, are given, the distance r (one degree of freedom) for the point X in the three-dimensional space can be obtained.

Further, when an initial position ($x^0$) (two degrees of freedom) and a trace of the sequence of movement points beginning from the initial position ($x^0$) (one degree of freedom) are given, a distance r to the position X (one degree of freedom) on an object subject to measurement in the three dimensional space can be obtained therefrom.

(3) The Projection Measurement Method ($X^\infty = \tau^\infty$)

Next, the case will be explained wherein the point at infinity ($x^\infty$) of the sequence of movement points and the point at infinity ($\tau^\infty$) of the sequence of reference points are common. In this explanation, the predetermined plane or surface of the second order on which the projection is to be made is a sphere, and the center of projection is the center O of the sphere.

The point X in the space, which is subject to the measurement, is projected on the sphere having its center at a camera origin. The projection is repeated while the camera is moved with a fixed pitch $\Delta X$, to obtain a sequence of movement points ($x^t$, t=0, 1, 2, ...; t is a frame number) of the projected points.

Then, a sequence of reference points $\tau^t$ is generated, so that the sequence of reference points has the same cross ratio as the sequence of movement points ($x^t$, t=0, 1, 2, ...), and both the sequence of movement points and the sequence of reference points share their points $x^\infty$ and $\tau^\infty$ as a common point. The sequence of reference points is generated, for example, by the following process.

First, an arbitrary straight line lT is provided which is parallel to the straight line $Ox^\infty$. A point $T^0$ is determined at an arbitrary position on the straight line lT, and a sequence of points $T^0$ of a pitch $\Delta X$ beginning at the point $T^0$ is generated on the straight line lT. Then, a sequence of points $\tau^t$ (t=0, 1, 2, . . .) having the same cross ratio as the sequence of movement points $x^t$ (t=0, 1, 2, . . .), having its point at infinity $x^\infty$ at the same location as the point at infinity $\tau^\infty$, is generated by projecting the sequence of points $T^t$ from the center of projection O onto the sphere.

The sequence of points $\tau^t$ can be determined so that the equation lT$\perp$OT$^0$ is satisfied, as below. First, an arbitrary great circle l$\tau$ passing through the point at infinity $x^\infty$ of the sequence of movement points $x^t$ (t=0, 1, 2, . . .) is determined, and then a point $\tau^0$ is determined at a point on the great circle l$\tau$ so that the direction to the point $\tau^0$ from the center of projection O is perpendicular to the direction to the point at infinity $x^\infty$. That is, =90°. (6)

Then, points $\tau^t$ are determined on the great circle by the following equation. $=\tan^{-1}(\Delta X \cdot t/R^0)$ (7)

where $R^0$ denotes a distance from the center of the sphere (the center of projection) O to the above point $T^0$, i.e., $R^0 = \overline{OT^0}$, and denotes a length of arc $\tau^0\tau^t$ on the sphere (the great circle l$\tau$), i.e., an angle $<\tau^0 O \tau^t$.

Figure 15:
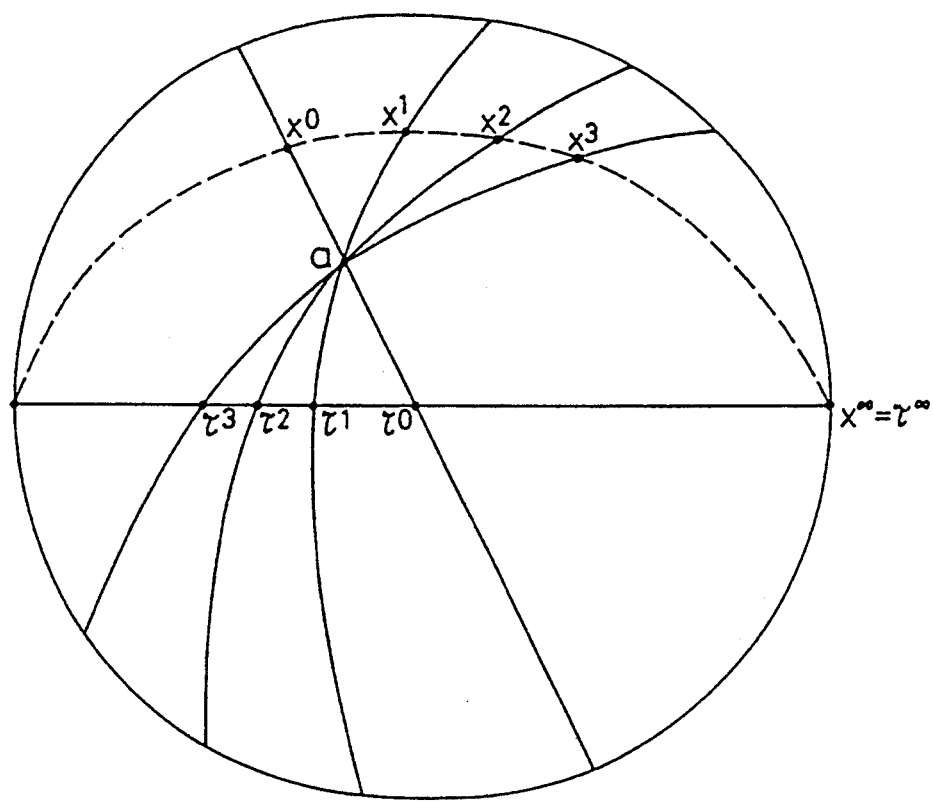
FIG. 15 is a plan view indicating a relationship of positions of sequences of points and intersection points on a sphere, in the projection measurement method of sharing a point at infinity.

FIG. 15 is a view of the sphere in a direction parallel to a straight line passing through the center of projection O and the beginning point $\tau^{28}$ of the sequence of reference points when the equation (6) exists. When the equation lT$\perp$OT$^0$ is satisfied, the equation (6) exists, and therefore, the point $\tau^\infty$ is located at the center of the sphere in the plan view of FIG. 15.

Figure 14:
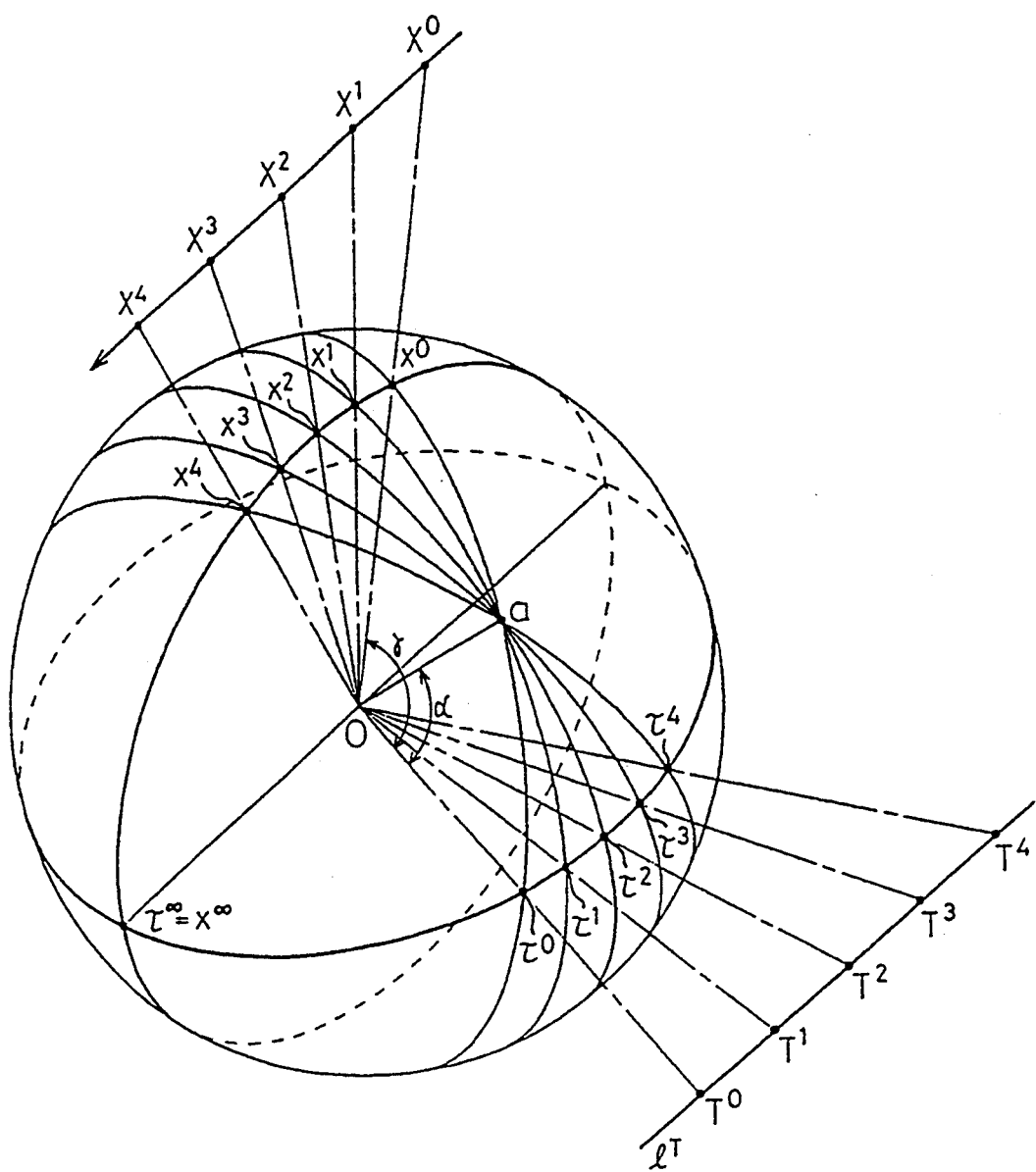
FIG. 14 is a diagram stereographically showing a relationship of positions on a sphere, of sequences of points and intersection points in the projection measurement method of sharing a point at infinity.

According to the third step of the first aspect of the present invention, each point of the sequence of movement points ($x^t$, t=0, 1, 2, . . .) is connected with a corresponding point (corresponding to the same frame number t) of the sequence of reference points ($\tau^t$, t=0, 1, 2, . . .) by an intersection line of the sphere and a plane containing the above corresponding points and the center of projection O, i.e., a great circle passing through the corresponding points (FIGS. 14 and 15). As explained before with reference to FIG. 10, when the sequence of movement points ($x^t$, t=0, 1, 2, . . .) and the sequence of reference points ($\tau^t$, t=0, 1, 2, . . .) share a common point (the point at infinity $x^\infty = \tau^\infty$), and have the same cross ratio, and the corresponding points of the sequence of movement points and the sequence of reference points are connected by great circles, respectively, the great circles intersect at a point on the sphere. The intersection point is indicated by "a" in FIGS. 14 and 15. By using the point a, a distance r ($=\overline{OX^0}$) to the point $X^0$ which is subject to the measurement is obtained by the following equation. That is, the distance r from an initial position of the camera to a point X of the object which is subject to the measurement is obtained by $$r = R^0 \cdot |\sin\alpha| / |\sin(\gamma - \alpha)| \quad (8)$$

where $\gamma$ denotes an angle between a direction to the beginning point $x^\infty$ of the sequence of movement point and a direction to the beginning point $\tau^\infty$ of the sequence of reference points ($\tau^t$, t=0, 1, 2, . . .) at the center of projection, and $\alpha$ denotes an angle between a direction to the intersection point and a direction to the beginning point $\tau^\infty$ of the sequence of reference points ($\tau^t$, t=0, 1, 2, . . .) at the center of projection.

Then, the position of the point X in the three-dimensional space when being viewed from the initial position of the camera is obtained by the following equation, $$X^0 = r \cdot Ox^0 / |Ox^0| \quad (9)$$

where it is assumed that the position of the initial projected point $x^0$. However, when a trace of the sequence of movement points ($x^t$, t=0, 1, 2, . . .) is known, the point $x^0$ can be obtained from the trace and the above-obtained point a. That is, the point a is obtained from an intersection point of the trace of $x^t$ and the great circle $\tau^0$a (FIG. 15), after the point a is obtained in the third step in the first aspect of the present invention. Since, in this case, the point a is obtained based on the information which is obtained from a plurality of images, the position of the point a can be obtained accurately. Therefore, by carrying out the calculation of the equations (8) and (9) using the point $x^0$ which is obtained as above, the three-dimensional position of the point X can be obtained with high accuracy.

Thus, according to the first aspect of the present invention, when the point at infinity $\tau^\infty$ of the sequence of reference points is located at the same position as the point at infinity $x^\infty$ of the sequence of movement points, and the initial position ($x^0$) (two degrees of freedom) and the point at infinity ($x^\infty$) (two degrees of freedom) on the projection surface, of the above point X of the object which is subject to the measurement, are given, the three-dimensional position (the point $x^0$ and the distance, where either has one degree of freedom) for of the point X of the object which is subject to the measurement, can be obtained.

All the above explanations can be applied to the cases wherein a predetermined plane or surface of the second order other than the sphere is used as a projection surface, according to the process of the first aspect of the present invention.

As explained above, according to the present invention, the three-dimensional distance from the camera position can be obtained by obtaining a trace of projection of an arbitrary point in the three-dimensional space, onto a predetermined plane or surface of the second order. Since data of a plurality of projected points which are obtained from the directions of shots from the camera to a point which is subject to the measurement, are obtained at a plurality of camera positions, high accuracy and credibility are achieved in the result of the measurement. Further, generally, a plurality of points of objects are shot in an image by the camera, and these points move with the movement of the camera. When obtaining an intersection point of lines connecting, on the predetermined plane or surface of the second order, corresponding points of the points of the shot directions and the sequence of reference points having a cross ratio corresponding to the pitches in the movement of the camera, according to the present invention, lines connecting points of different objective points and sequence of reference points, do not intersect at a point, as understood from the aforementioned example of FIG. 11. Therefore, mixing of data between different objective points can be avoided. Namely, high credibility of the result of the measurement is assured by the use of the pitches of the sequence of points $x^t$ and the phase (which is determined by sharing the above-mentioned common point).

(4) Second Aspect of the Present Invention

The method for measuring a position and an orientation of an object according to the second aspect of the present invention is explained below. According to the second aspect of the present invention, two sequences of reference points are used for the three-dimensional measurement of the position and the orientation of an object.

Namely, as explained before, according to the second aspect of the present invention, in the first step, a sequence of movement points ($x^t$, t=0, 1, 2, ...) which line up on an intersection line of a predetermined plane or surface of the second order and a plane which contains a predetermined center of projection corresponding to a position of a camera, is obtained by obtaining projected points which are respectively generated for a plurality of positions of the camera corresponding to movement of the camera in a predetermined direction by projecting an image element of the object which is subject to the measurement, onto a point on the predetermined plane or surface of the second order, where the position of the camera is deemed as the center of projection.

Next, in the second step, a first sequence of reference points is generated ($\tau^t$, t=0, 1, 2, ...) which line up on a second intersection line of a plane containing the center of projection and the predetermined plane or surface of the second order, shares a point with the sequence of movement points ($x^t$, t=0, 1, 2, ...), and has the same cross ratio (inharmonic ratio) as a cross ratio of the sequence of movement points ($x^t$, t=0, 1, 2, ...).

In the third step, a second sequence of reference points ($-\tau^t$, t=0, 1, 2, ...) is generated which line up, in the opposite direction to the above first sequence of reference points, on the second intersection line of a plane containing the center of projection and the predetermined plane or surface of the second order, shares a point with the first sequence of reference points ($\tau^t$, t=0, 1, 2, ...), and has the same cross ratio (inharmonic ratio) as a cross ratio of the sequence of movement points ($x^t$, t=0, 1, 2, ...).

In the fourth step, a first intersection point is obtained of intersection lines which are respectively intersection lines of the predetermined plane or surface of the second order and planes each containing the center of projection and a pair of corresponding points one of which belongs to the sequence of movement points ($x^t$, t=0, 1, 2, ...) and the other of which belongs to the first sequence of reference points ($\tau^t$, t=0, 1, 2, ...).

In the fifth step, a second intersection point is obtained of intersection lines which are respectively intersection lines of the predetermined plane or surface of the second order and planes each containing the center of projection and a pair of corresponding points one of which belongs to the sequence of movement points ($x^t$, t=0, 1, 2, ...) and the other of which belongs to the second sequence of reference points ($-\tau^t$, t=0, 1, 2, ...).

Then, in the sixth step, geometrical information is obtained on the image element of the object when using the position of the camera in the three-dimensional space as a reference position, based on the position of the above first and second intersection point.

Each point of the above sequence of movement points ($x^t$, t=0, 1, 2, ...) is obtained by projecting a direction of shooting of a specific image element, for example, a point in a three-dimensional space by the camera, on a surface of the second order (for example, a sphere) from a predetermined center of projection (for example, the position of the camera), where the image element is located far from the camera, and, for example, the camera may be attached to an arm of a robot. The position (polar coordinate) of the projected point on the surface of the second order (for example, the sphere) moves on the surface of the second order, with the movement of the camera. For example, when the camera moves in a predetermined direction, a sequence of movement points is generated on the surface of the second order (the sphere) by the movement of the projected point with pitches corresponding to pitches of the movement of the camera. Instead of the moving of the camera, a plurality of cameras may be arranged with the above pitches.

When generating two sequences of reference points having the same cross ratio, on the predetermined plane or surface of the second order, the common point of the sequence of movement points and the sequence of reference points, may be the beginning points $x^0$, $\tau^0$, or the points at infinity $x^\infty$, $\tau^\infty$ of the two sequences of points. The point at infinity $x^\infty$ is defined as an intersection point of the predetermined plane or surface of the second order and a straight line passing through the center of projection and being parallel to a direction of shooting the image element of the object in the three-dimensional space by the camera when the camera is moved to infinity in the above predetermined direction. Arbitrary i-th points $x^i$ and $\tau^i$ of the two sequences of points can be selected as the common point, where i is an arbitrary integer. The selection of the arbitrary i-th points $x^i$ and $\tau^i$ as the common point, is equivalent to the selection of the beginning points $x^0$, $\tau^0$ as the common point because the arbitrary i-th points $x^i$ and $\tau^i$ can be regarded as new beginning points instead of the above beginning points $x^0$, $\tau^0$.

Hereafter, a concrete example wherein the common point of the sequence of movement points and the sequences of reference points is the beginning points $x^0$, $\tau^0$ and a concrete example wherein the common point is the points at infinity $x^\infty$, $\tau^\infty$ of the two sequences of points, are explained, where the above-mentioned method for measuring a position and an orientation of an object, according to the second aspect of the present invention, is denoted as a symmetric projection measurement method.

(5) The Symmetric Projection Measurement Method ($x^0 = \tau^0$)

First, the case is explained wherein the common point of the sequence of movement points and the sequence of reference points are at their beginning points. In this explanation, the above-mentioned predetermined plane or surface of the second order is a sphere, and the center of projection is the center of the sphere O.

When projection is repeated while moving a camera in parallel with a predetermined pitch $\Delta X$, the direction of shooting an object moves relatively in the opposite direction with the movement of the camera, and a sequence of movement points $x^t$ (t=0, 1, 2, ...; t is a frame number) consisting of the projected points, is obtained.

Figure 16:
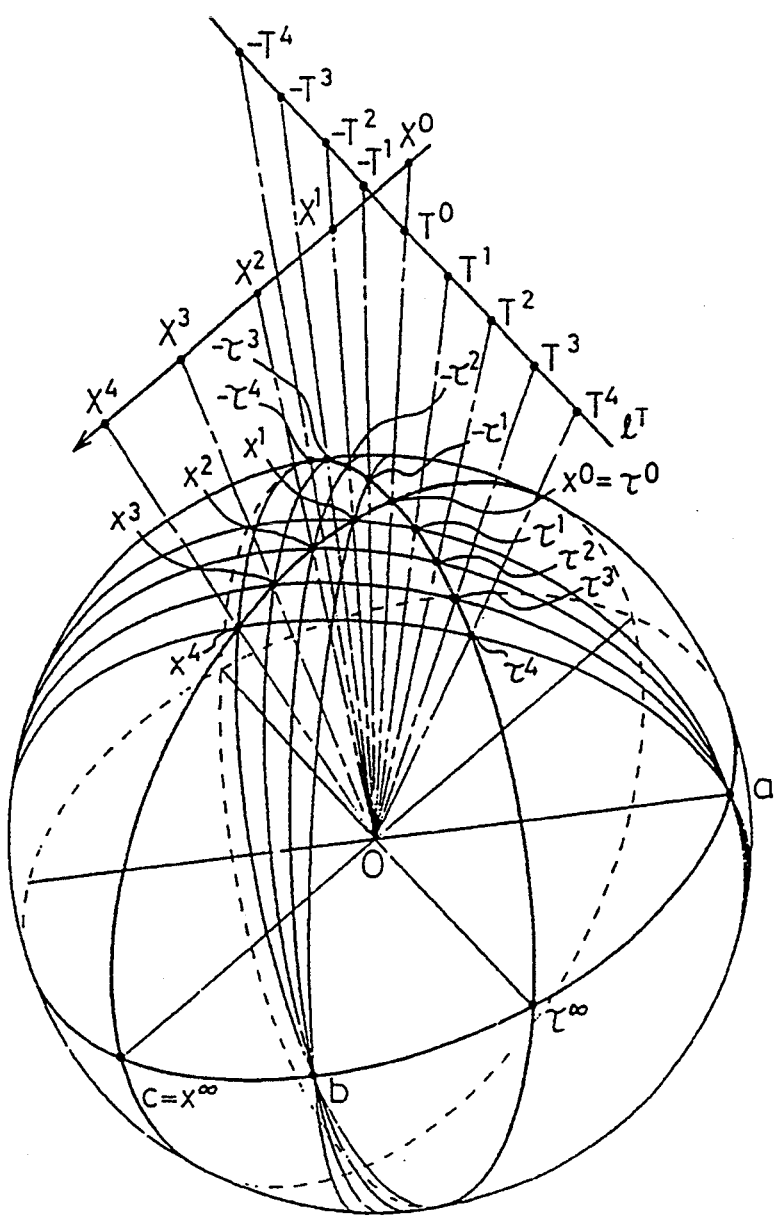
FIG. 16 is a diagram stereographically showing a relationship of positions on a sphere, of sequences of points and intersection points in the symmetrical projection measurement method of sharing a beginning point.

A point $T^0$ is determined at an arbitrary position on a straight line $Ox^0$, and an arbitrary straight line lT passing through the point $T^0$, to generate a first sequence of reference points $\tau^t$ which has the same cross ratio (inharmonic ratio) as the cross ratio of the sequence of movement points $x^t$, and shares their beginning points $x^0$, $\tau^0$ with the sequence of movement points $x^t$. Next, a sequence of points $T^1$, $T^2$, ... is generated on the straight line IT from the point $T^0$ with the pitch $\Delta X$. Then, a sequence of points $\tau^t$ (t=0, 1, 2, . . .) which has the same cross ratio (inharmonic ratio) as the cross ratio of the sequence of movement points $x^t$, and shares their beginning points $x^0$, $\tau^0$ with the sequence of movement points $x^t$, is obtained by projecting the sequence of points $T^t$ (t=0, 1, 2, . . .) from the center of projection O onto the sphere. Similarly, a second sequence of reference points $-\tau^t$ can be defined by generating a sequence of points $-T^1$, $T^2$, . . . having the pitch $\Delta X$ in the opposite direction from the point $T^0$, and projecting the sequence of points $-T^t$ (t=0, 1, 2, . . .) onto the sphere from the center O of projection. In this case, the point at infinity $\tau^\infty$ of the sequence of points ($\tau^t$, t=0, 1, 2, . . .) can be obtained as an intersection point of a straight line passing through the center of projection and being parallel to the straight line IT, and the sphere, as shown in FIG. 16. Further, the above straight line IT can be determined so that the condition IT⊥$OT^0$ is satisfied. This is equivalent to determining the sequence of reference points $\tau^t$(t=0, 1, 2, . . .) as follows. First, an arbitrary great circle $l\tau$ passing through the point $x^0$ is determined, and then, the first sequence of reference points $\tau^t$(t=0, 1, 2, . . .) is determined on the great circle by the following equation, $$= \tan^{-1}(\Delta X \cdot t/R^0) \quad (10)$$

where $R^0 = \overline{OT^0}$. (11)

In this case, is equal to a length of arc $\tau^0\tau^t$ on the sphere (the great circle $l\tau$), i.e., an angle at the center of projection O between the direction to the point $\tau^0$ and the direction to the point $\tau^t$.

In addition, the second sequence of reference points $-\tau^t$(t=0, 1, 2, . . .) is determined on the great circle by the following equation, $$= \tan^{-1}(\Delta X \cdot t/R^0). \quad (12)$$

In this case, $\tau^0\tau^t$ is equal to a length of arc $\tau^0\tau^t$ on the sphere (the great circle $l\tau$), i.e., an angle at the center of projection O between the direction to the point $\tau^0$ and the direction to the point $\tau^t$.

In this case, the direction to the point $\tau^\infty$ is perpendicular to the direction to the point $\tau^0$ on the great circle $l\tau$. That is, $$= 90°. \quad (13)$$

Figure 17:
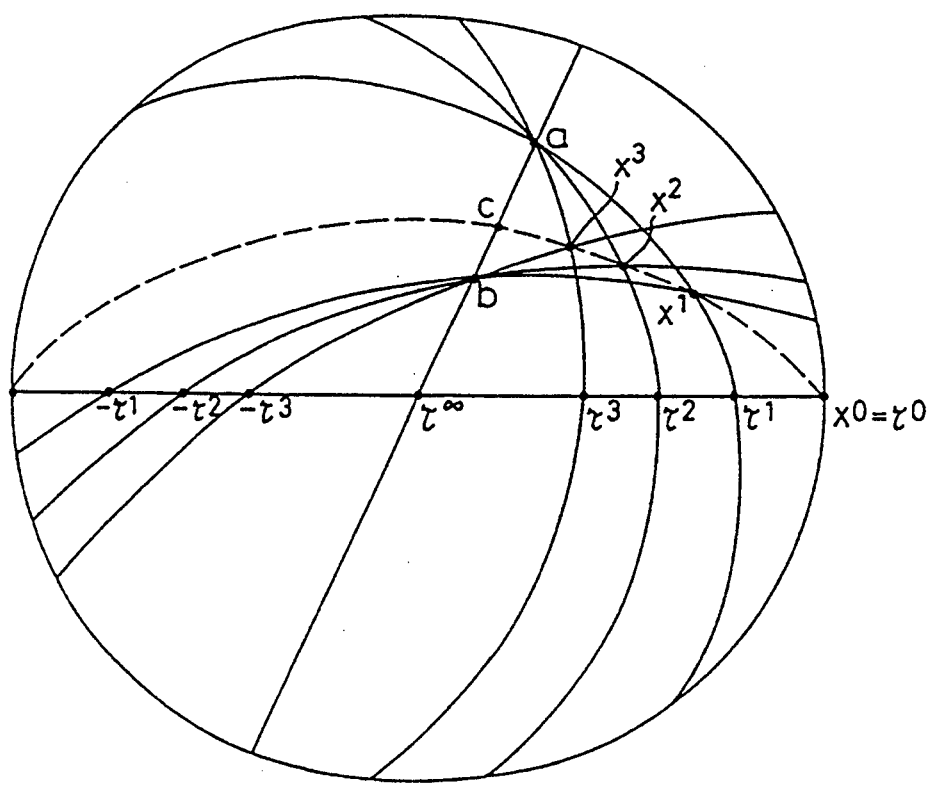
FIG. 17 is a plan view indicating a relationship of positions of sequences of points and intersection points on a sphere, in the symmetric projection measurement method of sharing a beginning point.

FIG. 17 is a plan view of the above sphere in a direction parallel to a straight line passing through the center of projection O and the point at infinity $\tau^\infty$ of the sequence of reference points when the equation (13) exists. When the equation IT⊥$OT^0$ is satisfied, the equation (13) exists, and therefore, the point $\tau^\infty$ is located at the center of the sphere in the plan view of FIG. 17.

According to the fourth step of the first aspect of the present invention, each point of the sequence of movement points ($x^t$, t=0, 1, 2, . . .) is connected with a corresponding point (corresponding to the same frame number t) of the first sequence of reference points ($\tau^t$, t=0, 1, 2, . . .) by an intersection line of the sphere and a plane containing the above corresponding points and the center of projection O, i.e., a great circle passing through the corresponding points (FIGS. 16 and 17). As explained before with reference to FIG. 10, when the sequence of movement points ($x^t$, t=0, 1, 2, . . .) and the first sequence of reference points ($\tau^t$, t=0, 1, 2, . . .) share a common point (the beginning point $x^0 = \tau^0$), and have the same cross ratio, and the corresponding points of the sequence of movement points and the first sequence of reference points are connected by great circles, respectively, the great circles intersect at a point on the sphere. The intersection point (the first intersection point) is indicated by "a" in FIGS. 16 and 17.

In addition, according to the fifth step of the second aspect of the present invention, each point of the sequence of movement points ($x^t$, t=0, 1, 2, . . .) is connected with a corresponding point (corresponding to the same frame number t) of the second sequence of reference points ($-\tau^t$, t=0, 1, 2, . . .) by an intersection line of the sphere and a plane containing the above corresponding points and the center of projection O, i.e., a great circle passing through the corresponding points (FIGS. 16 and 17). As explained before with reference to FIG. 10, when the sequence of movement points ($x^t$, t=0, 1, 2, . . .) and the second sequence of reference points ($-\tau^t$, t=0, 1, 2, . . .) share a common point (the beginning point $x^0 = \tau^0$), and have the same cross ratio, and the corresponding points of the sequence of movement points and the second sequence of reference points are connected by great circles, respectively, the great circles intersect at a point on the sphere. The intersection point (the second intersection point) is indicated by "b" in FIGS. 16 and 17.

When an angle between a direction to the point at infinity ($x^\infty$) of the sequence of movement point and a direction to the point at infinity ($\tau^\infty$) of the sequence of reference points ($\tau^t$, t=0, 1, 2, . . .) at the center of projection, is denoted by $\gamma$, an angle between a direction to the first intersection point a and a direction to the point at infinity ($\tau^\infty$) of the sequence of reference points ($\tau^t$, t=0, 1, 2, . . .) at the center of projection, is denoted by $\alpha$, and an angle between a direction to the second intersection point b and a direction to the point at infinity ($\tau^\infty$) of the first sequence of reference points ($\tau^t$, t=0, 1, 2, . . .) at the center of projection, is denoted by $\beta$, a reference point c is determined on the great circle ab by the following equation, $$\gamma = \cot^{-1}((\cot\alpha + \cot\beta)/2). \quad (14)$$

The above-obtained reference point c is the point at infinity ($x^\infty$) of the sequence of movement points ($x^t$, t=0, 1, 2, . . .). Namely, the point at infinity ($x^\infty$) is obtained by merely giving the initial position ($x^0$) on the projection surface.

Further, a pole z of the trace (great circle) of the sequence of projected points $x^t$ by the following exterior product of the initial position ($x^0$) and the point at infinity ($x^\infty$) on the projection surface.

$$z = [x^0 \times c] \quad (15)$$

By using the above angle $\alpha$ between the direction to the first intersection point a and the direction to the point at infinity ($\tau^\infty$) of the first sequence of reference points ($\tau^t$, t=0, 1, 2, . . .) at the center of projection O, the distance r ($=\overline{OX^0}$) from the initial position of the camera to the point X of the object which is subject to the measurement is obtained by $$r = R^0 \cdot |\sin(\gamma - \alpha)|/|\sin\alpha|. \quad (16)$$

Alternatively, by using the above angle $\beta$ between the direction to the second intersection point b and the direction to the point at infinity ($\tau^\infty$) of the first sequence of reference points ($\tau^t$, t=0, 1, 2, . . .) at the center of projection O, the distance r from the initial position of the camera to the point X of the object which is subject to the measurement is obtained by $$r = R^0 \cdot |\sin(\gamma - \beta)| / |\sin\beta|. \tag{17}$$

The common point may be any point $x^t$ other than $x^0$ (except $x^\infty$), and in this case, a distance from the point corresponding to the frame number t which corresponds to the common point $x^t$ is obtained.

The position of the point X in the three-dimensional space when being viewed from the initial position of the camera is obtained by the following equation.

$$X^0 = r \cdot OX^0 / |OX^0| \tag{18}$$

Thus, according to the second aspect of the present invention, when the beginning point ($\tau^0$) of the first and second sequences of reference points is located at the same position as the beginning point ($x^0$) of the sequence of movement points, and the initial position ($x^0$) (two degrees of freedom) on the projection surface of the above point X of the object which is subject to the measurement is given, the point at infinity ($x^\infty$) (one degree of freedom), the trace of the projected points (one degree of freedom), and the distance r (one dimensional quantity) for the point X in the three-dimensional space can be obtained.

(6) Three-Dimensional Measurement of a Contour Point by Symmetric Projection Measurement Method ($x^0 = \tau^0$)

As an application of the method for measuring a position and an orientation of an object according to the second aspect of the present invention, where the beginning point of the first and second sequences of reference points is located at the same position of the beginning point of the sequence of movement points, a process for measuring a distance to a contour point p of an object which is subject to the measurement, is provided as follows.

1. Points of contour of the object which is subject to the measurement are obtained by extracting a contour in each image which is obtained during movement of a camera.

2. A point $p^0$ of the contour which is subject to the measurement is selected from the image which is obtained in an initial image.

3. A position of the point $p^0$ of the contour in a three-dimensional space is obtained by executing the symmetric projection measurement method ($x^0 = \tau^0$) for the above-selected contour point $p^0$ and each contour image.

Thus, when a contour point $p^0$ is selected, and an initial shooting position is given, a distance from the initial position of the camera to the contour point can be measured.

In addition, since, as explained above, a point at infinity $p^\infty$ (two degrees of freedom) of the projected point, and a trace (two degrees of freedom) of the sequence of movement points are obtained from the initial position $p^0$ of the projected point, the direction of the movement of the camera, can be measured.

Further, the distance to the selected contour point can be obtained, separated from the other points in the same scene.

(7) Application I of Three-Dimensional Measurement of a Contour Point by Symmetric Projection Measurement Method ($x^0 = \tau^0$)

As an application of the method for measuring a position and an orientation of an object according to the second aspect of the present invention, where the beginning point of the first and second sequences of reference points is located at the same position of the beginning point of the sequence of movement points, it is possible to confirm the result of the measurement with the result of the measurement with the direction v of the movement of the camera which is known in advance.

When the direction v of the movement of the camera is known in advance, the three-dimensional measurement of a contour point based on the method for measuring a position and an orientation of an object according to the second aspect of the present invention ($x^0 = \tau^0$). Then, it is confirmed that a reference point c = a point at infinity ($x^\infty$) which is obtained during the process, accords with the known direction v of the movement of the camera.

When the scene which is taken by the camera is complicated, some noise may be included in the result of the measurement. In this case, the influence of the noise can be eliminated by the above confirmation, to improve the credibility of the result of the measurement.

(8) Application II of Three-Dimensional Measurement of a Contour Point by Symmetric Projection Measurement Method ($x^0 = \tau^0$)

As another application of the method for measuring a position and an orientation of an object according to the second aspect of the present invention, where the beginning point of the first and second sequences of reference points is located at the same position of the beginning point of the sequence of movement points, it is possible to measure the direction v of the movement of the camera, by executing the method for measuring a position and an orientation of an object according to the second aspect of the present invention ($x^0 = \tau^0$) for a plurality of contour points as the object which is subject to the measurement, and extracting a plurality of points $p^\infty$ at infinity. The process comprises the following steps.

1. The method for measuring a position and an orientation of an object according to the second aspect of the present invention ($x^0 = \tau^0$) is executed for a plurality of contour points.

2. An average of positions of a plurality of points $c = (p^\infty)$ at infinity which are extracted during the process of the above step 1, is obtained to obtain the direction v of the movement of the camera.

Thus, the direction of the movement of the camera can be obtained from the information on the contour points the image of which are taken. Since the direction of the movement of the camera is obtained from a plurality of results of the measurement, the credibility and accuracy of the result of the measurement, is improved.

(9) Three-Dimensional Measurement of a Line Segment by Symmetric Projection Measurement Method ($s^0 = \tau^0$)

An explanation is now provided for the case wherein the object which is subject to the measurement is a line segment (straight line) in the method for measuring a position and an orientation of an object according to the second aspect of the present invention, where the beginning point of the first and second sequences of reference points is located at the same position as the beginning point of the sequence of movement points. Here, it is assumed that the direction v of the movement of the camera is known prior to the measurement.

Figure 20:
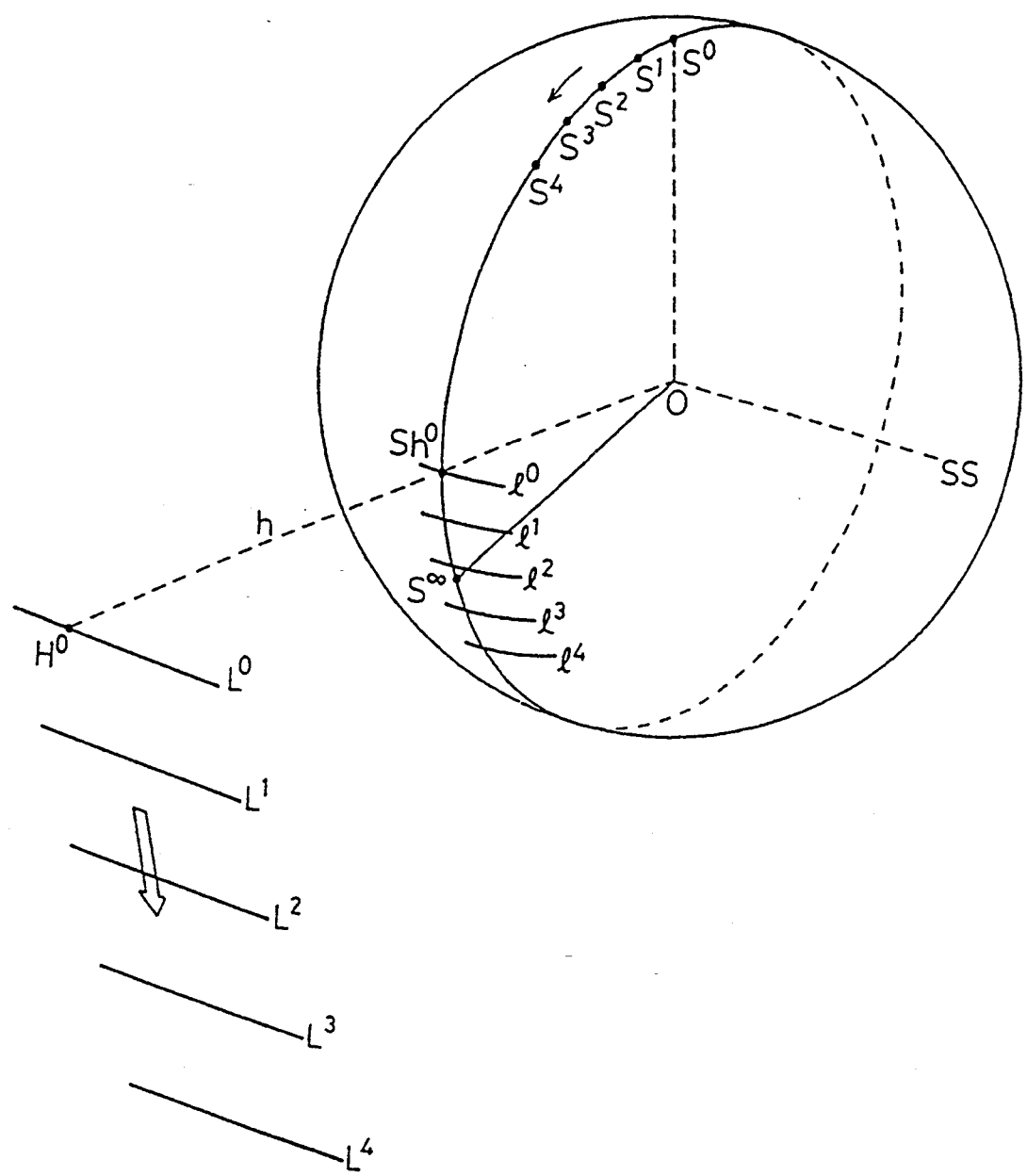
FIG. 20 is a diagram showing a relationship of parameters when images of a line segment are taken on a sphere from a plurality of camera positions, of sequences of points and intersection points in the projection measurement method of sharing a beginning point.

First, contours are extracted from each image which is obtained during movement of the camera, and a contour image of the object is obtained on a sphere having its center at the position O of the camera. Then, a contour line segment L in the three-dimensional space is extracted from the contour image. Namely, a contour line segment l is projected on the sphere from the camera position O. The contour line segment l is a part of a great circle, and then a pole s of the great circle is obtained. By executing the above operation for each image, a sequence of movement points $s^t$ ($t=0, 1, 2, \ldots$; t is a frame number) of poles s of great circles, is obtained. FIG. 20 shows an example of such a sequence of movement points $s^t$ ($t=0, 1, 2, \ldots$; t is a frame number) of poles s of great circles. In FIG. 20, the coordinate of the camera is fixed. When viewed from the camera, the line segment L moves relatively.

Next, a pole $s^0$ of the line segment which is subject to the measurement is selected from the initial projected image, and then, the above symmetrical projection measurement method sharing the aforementioned beginning points ($x^0 = \tau^0$), using the above pole $s^0$.

When a line segment is measured, as mentioned above, the sequence of movement points $s^t$ ($t=0, 1, 2, \ldots$; t is a frame number) of the poles s of the great circles which are obtained by projecting contour line segment l on a sphere from the camera position O, is regarded as the aforementioned sequence of movement points ($x^t$, $t=0, 1, 2, \ldots$) which line up on an intersection line of the predetermined plane or surface of the second order and a plane which contains a predetermined center of projection corresponding to a position of a camera according to the first step in the second aspect of the present invention.

In the above situation, a pole of a trace of the sequence of movement points $s^t$ ($t=0, 1, 2, \ldots$; t is a frame number) of the poles s, i.e., a pole ($=S_s$) of a great circle containing the sequence of movement points $s^t$ ($t=0, 1, 2, \ldots$; t is a frame number) of the poles s, indicates a three-dimensional orientation of the line segment which is subject to the measurement. By using the value r which is obtained by the equations (16) and (17), the length h of a perpendicular line which is dropped from the initial position of the camera to the line segment which is subject to the measurement, where $$h = r \cdot \sin \eta \qquad (19)$$

and $$\eta = \cos^{-1}(v \cdot S_s). \qquad (20)$$

In addition, for the orientation $sh^0$ of the perpendicular line which is dropped from the camera to the line segment which is subject to the measurement, by an exterior product of $s^0$ and $S_s$, $$sh^0 = [s^0 \times S_s]. \qquad (21)$$

Figure 21:
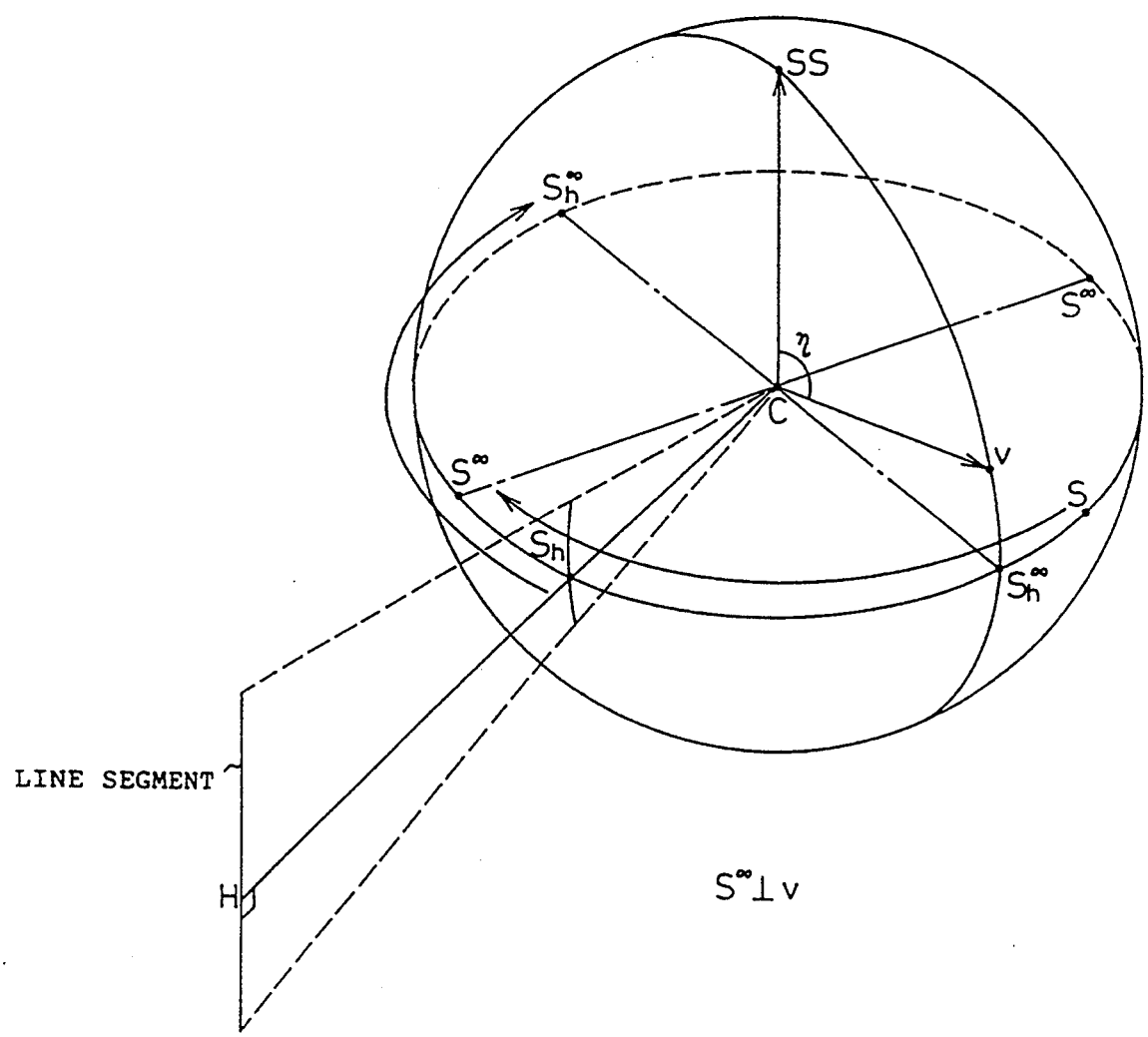
FIG. 21 is a diagram showing a relationship of parameters in spherical projection of a line segment.

FIG. 21 shows the above parameters.

Thus, by using the method according to the second aspect of the present invention where the beginning points are made a common point, for the measurement of a three-dimensional position and an orientation of a line segment, the orientation of the line segment (one degree of freedom) and a distance (one degree of freedom) from an initial position of the camera to the line segment are obtained when an initial position $s^0$ (two degrees of freedom) of a sequence of movement points $s^t$ ($t=0, 1, 2, \ldots$; t is a frame number) of poles s of great circles which are obtained by projecting a contour line segment l on a sphere from a camera position O, and a direction v (two degrees of freedom) of movement of the camera, are given. In addition, a point at infinity $s^\infty$ (one degree of freedom) of the pole positions is obtained as a result of the second aspect of the present invention where the beginning points are made a common point, and an orientation $Sh^0$ (one degree of freedom) of a perpendicular line which is dropped from the camera to the line segment can be obtained.

Further, as a characteristic feature of the present invention, three-dimensional parameters of only a selected line segment, can be separated from the other line segments in the same scene.

All the above explanations can be applied to the cases wherein the predetermined plane or surface of the second order other than the sphere is used as a projection surface.

For example, the above process for obtaining a pole can be generalized as below. Generally, contours are extracted from a plurality of images which are obtained during movement of a camera, a contour image of the object is obtained on the predetermined plane or surface of the second order from the center of projection (O), and a contour line segment (l) is extracted from the contour image. Then, an intersection point of the predetermined plane or surface of the second order and a normal line, passing through the center of projection, of a plane containing the center of projection and the contour line segment (l), is obtained as a projected point of the line segment. Next, the above process for selecting a pole $s^0$ of a line segment which is subject to the measurement, from an initial projected image, corresponds to a process of regarding projected points which are obtained from a plurality of images, as a sequence of movement points ($s^t$, $t=0, 1, 2, \ldots$; t is a frame number), and selecting a beginning point ($s^0$) of the sequence of movement points of the projected points of the line segment which is subject to the measurement, from an image at the initial camera position.

A pole $S_s$ of a trace of the sequence of movement points ($s^t$, $t=0, 1, 2, \ldots$; t is a frame number) is obtained as an intersection point $S_s$ of the predetermined plane or surface of the second order and a normal line, passing through the center of projection, of a plane containing the trace of the sequence of movement points ($s^t$, $t=0, 1, 2, \ldots$).

(10) Application I of Three-Dimensional Measurement of a Line Segment by Symmetric Projection Measurement Method ($s^0 = \tau^0$)

The directions to the point at infinity $s^\infty$ of the sequence of movement points ($s^t$, $t=0, 1, 2 \ldots$) are perpendicular to the direction v of the camera movement, and therefore, relative angle between the point at infinity $s^\infty$ of the poles and the direction v of the movement of the camera, is 90 degrees. Therefore, credibility of a result of measurement can be confirmed by confirming that a relative angle between a known direction v of movement of the camera and the point at infinity $s^\infty$ of the poles which are obtained when the method according to the second aspect of the present invention where the beginning point of the first and second sequence of reference points is located at the same position of the beginning point of the sequence of movement points, is applied to measurement of a line segment (straight line). The above confirmation is carried out by the following steps of 1 and 2. Here, it is assumed that the direction v of the movement of the camera, is known before the measurement.

1. The three-dimensional measurement of a contour line segment is carried out according to the three-dimensional measurement method of a line segment in accordance with the symmetric projection measurement method ($s^0 = \tau^0$).

2. It is confirmed that a relative angle between the direction v of the movement of the camera and the reference point c=(the point at infinity $s^\infty$ of the poles) which is obtained in the above process.

When the scene which is taken by the camera is complicated, some noise may be included in the result of the measurement. In this case, the influence of the noise can be eliminated by the above confirmation, to improve the credibility of the result of the measurement.

(11) Application II of Three-Dimensional Measurement of a Line Segment by Symmetric Projection Measurement Method ($s^0 = \tau^0$)

In contrast to the above application example, the direction v of movement of the camera can be obtained based on the fact that the relative angle between the point at infinity $s^\infty$ of the poles and the direction v of the movement of the camera is 90 degrees, when measurement of a line segment (straight line) is carried out using the method according to the second aspect of the present invention where the beginning point of the first and second sequence of reference points is located at the same position of the beginning point of the sequence of movement points. The direction v of the movement of the camera is determined by the following steps of 1 and 2.

1. The three-dimensional measurement method of a line segment in accordance with the symmetric projection measurement method ($s^0 = \tau^0$) is executed more than one time for different contour line segments.

2. Great circles having their respective poles at the plurality of reference points c=(the points at infinity $s^\infty$ of the poles), are drawn, and then, the direction v of the movement of the camera is obtained from an intersection point of the great circles.

Since the direction of the movement of the camera is obtained from only the information on the image of the contour line segment which is taken by the camera, and is obtained from a plurality of measurement results, the credibility and accuracy of the measurement result are improved.

(12) The Symmetric Projection Measurement Method ($x^\infty = \tau^\infty$)

Next, the case wherein the common point of the sequence of movement points and the sequence of reference points is at their points at infinity is explained. In this explanation, the above-mentioned predetermined plane or surface of the second order is a sphere, and the center of projection is the center of the sphere O.

Figure 18:
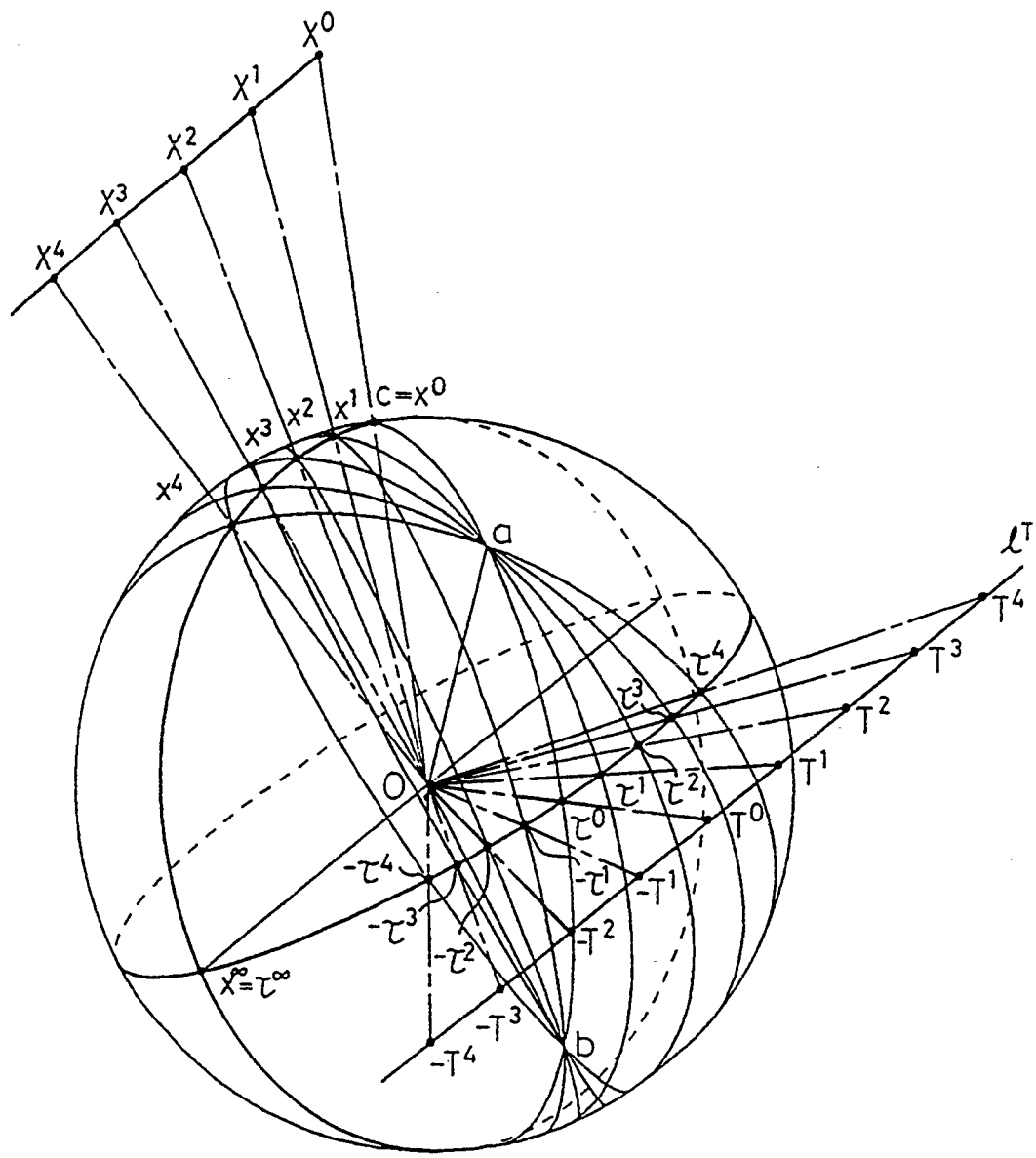
FIG. 18 is a diagram stereographically showing a relationship of positions on a sphere, of sequences of points and intersection points in the symmetric projection measurement method of sharing a point at infinity.

A point X which is subject to the measurement in the three-dimensional space, is projected on a sphere from a point of origin O of a camera. By repeating projection while moving the camera in parallel with a predetermined pitch $\Delta X$, a sequence of movement points $x^t$ ($t=0, 1, 2, \ldots$; t is a frame number) consisting of the projected points, is obtained. These operations are shown in FIG. 18.

Then, the first sequence of reference points ($\tau^t$, $t=0$, 1, 2, ...) which has the same cross ratio (inharmonic ratio) as a cross ratio of the sequence of movement points ($x^t$, $t=0, 1, 2, \ldots$), and the point at infinity $\tau^\infty$ of the sequence of reference points is located at the same position as the point at infinity $x^\infty$ of the sequence of movement points, is generated. This sequence of reference points can be generated, for example, as follows.

First, a point $T^0$ is determined at an arbitrary position on an arbitrary straight line IT which is parallel to the straight line $Ox^\infty$. Then, a sequence of points $T^t$ on the straight line IT beginning at the point $T^0$ with a pitch $\Delta X$, is generated. The first sequence of reference points $\tau^t$ ($t=0, 1, 2, \ldots$) which have the same cross ratio (inharmonic ratio) as the cross ratio of the sequence of movement points $x^t$, and share their beginning points $x^0$, $\tau^0$ with the sequence of movement points $x^t$, is generated by projecting the sequence of points $T^t$ ($t=0, 1, 2, \ldots$) on the sphere from the center of projection O. The second sequence of reference points ($-\tau^t$, $t=0, 1, 2, \ldots$) is generated by a sequence of points $-T^1, -T^2, \ldots$ in the opposite direction to the above from the point $T^0$ with the pitch $\Delta X$, and projecting the sequence of points $-T^t$ ($t=0, 1, 2, \ldots$) on the sphere from the center of projection O.

Alternatively, the sequence of points $\tau^t$ ($t=0, 1, 2, \ldots$) can be determined as follows, given a condition $IT \perp OT^0$. First, an arbitrary great circle $1\tau$ passing through the point at infinity $x^\infty$ of the sequence of movement points $x^t$ ($t=0, 1, 2, \ldots$) is determined, and then, a point $\tau^0$ is determined at a position perpendicular to the point at infinity $x^\infty$ on the great circle $1\tau$. Namely, $$=90°. \qquad (22)$$

Then, the sequence of points $\tau^t$ is formed on the great circle by the following equation.

$$=\tan^{-1}(\Delta X \cdot t/R^0). \qquad (23)$$

In this case, $R^0$ is a distance from the center of the sphere (center of projection) O to the above point $T^0$, i.e., $R^0 = \overline{OT^0}$, and is equal to a length of arc $\tau^0\tau^t$ on the sphere, i.e., an angle $<\tau^0 O \tau^t$.

Figure 19:
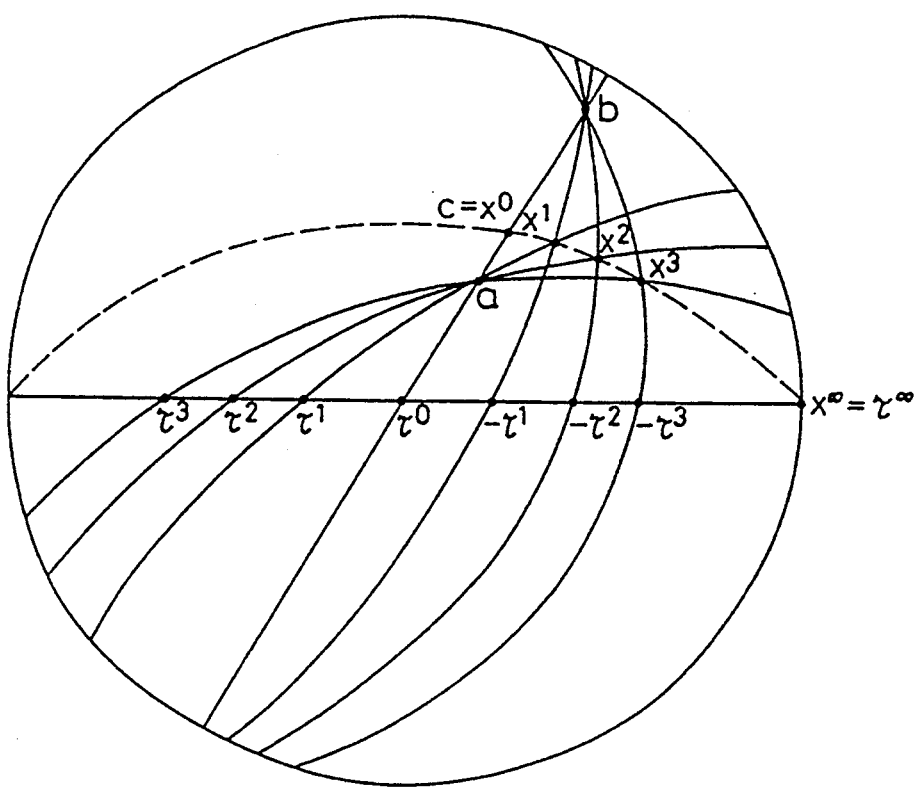
FIG. 19 is a plan view indicating a relationship of positions of sequences of points and intersection points on a sphere, in the symmetric projection measurement method of a common point at infinity.

FIG. 19 is a plan view of a sphere, viewing in the direction parallel to the above straight line passing through the center of projection O and the point at infinity $\tau^\infty$ of the sequence of reference points, when the above equation (22) exists. Since, the equation (22) exists when the above condition $IT \perp OT^0$ exists, the point $\tau^0$ is located at the center of the sphere when viewed in the direction as FIG. 19.

Further, the second sequence of reference points $-\tau^t$ ($t=0, 1, 2, \ldots$) is determined on the great circle $1\tau$ passing through the point at infinity $x^\infty$ by the following equation.

$$=\tan^{-1}(\Delta X \cdot t/R^0). \qquad (24)$$

In this case, the direction to the point $\tau^\infty$ is perpendicular to the direction to the point $\tau^0$ on the great circle $1\tau$. That is, $$=90°. \quad (25)$$

According to the fourth step of the second aspect of the present invention, each point of the sequence of movement points ($x^t$, $t=0, 1, 2, \ldots$) is connected with a corresponding point(corresponding to the same frame number t) of the first sequence of reference points ($\tau^t$, t=0, 1, 2, . . .) by an intersection line of the sphere and a plane containing the above corresponding points and the center of projection O, i.e., a great circle passing through the corresponding points (FIGS. 18 and 19). As explained before with reference to FIG. 10, when the sequence of movement points ($x^t$, t=0, 1, 2, . . .) and the first sequence of reference points ($\tau^t$, t=0, 1, 2, . . .) share a common point (the point at infinity $x^\infty = \tau^\infty$, and have the same cross ratio, and the corresponding points of the sequence of movement points and the first sequence of reference points are connected by great circles, respectively, the great circles intersect at a point on the sphere. The intersection point (the first intersection point) is indicated by "a" in FIGS. 18 and 19.

In addition, according to the fifth step of the second aspect of the present invention, each point of the sequence of movement points ($x^t$, t=0, 1, 2, . . .) is connected with a corresponding point (corresponding to the same frame number t) of the second sequence of reference points ($-\tau^t$, t=0, 1, 2, . . .) by an intersection line of the sphere and a plane containing the above corresponding points and the center of projection O, i.e., a great circle passing through the corresponding points (FIGS. 18 and 19). As explained before with reference to FIG. 10, when the sequence of movement points ($x^t$, t=0, 1, 2, . . .) and the second sequence of reference points ($-\tau^t$, t=0, 1, 2, . . .) share a common point (the point at infinity $x^\infty = \tau^\infty$), and have the same cross ratio, and the corresponding points of the sequence of movement points and the second sequence of reference points are connected by great circles, respectively, the great circles intersect at a point on the sphere. The intersection point (the second intersection point) is indicated by "b" in FIGS. 18 and 19.

When an angle between the direction to the beginning point ($x^0$) of the sequence of movement point and the direction to the beginning point ($\tau^0$) of the sequence of reference points ($\tau^t$, t=0, 1, 2, . . .) at the center of projection, is denoted by $\gamma$, an angle between the direction to the first intersection point a and the direction to the beginning point ($\tau^0$) of the first sequence of reference points ($\tau^t$, t=0, 1, 2, . . .) at the center of projection, is denoted by $\alpha$, and an angle between the direction to the second intersection point b and the direction to the beginning point ($\tau^0$) of the first sequence of reference points ($\tau^t$, t=0, 1, 2, . . .) at the center of projection, is denoted by $\beta$, a reference point c is determined on the great circle ab by the following equation, $$\gamma = \cot^{-1}((\cot\alpha + \cot\beta)/2). \tag{26}$$

The above-obtained reference point c is the beginning point ($x^0$) of the sequence of movement points ($x^t$, t=0, 1, 2, . . .). Namely, the initial position ($x^0$) is obtained by merely giving the point at infinity ($x^\infty$) on the projection surface.

Further, a pole z of the trace (great circle) of the sequence of projected points $x^t$ by the following exterior product of the initial position ($x^0$) and the point at infinity ($x^\infty$) on the projection surface.

$$z = [x^\infty \times c] \tag{27}$$

By using the above angle $\alpha$ between the direction to the first intersection point a and the direction to the beginning point ($\tau^\infty$) of the first sequence of reference points ($\tau^t$, t=0, 1, 2, . . .) at the center of projection O, the distance r ($=\overline{Ox^0}$) from the initial position of the camera to the point X of the object which is subject to the measurement is obtained by $$r = R^0 \cdot |\sin\alpha| / |\sin(\gamma - \alpha)|. \tag{28}$$

Alternatively, by using the above angle $\beta$ between the direction to the first intersection point b and the direction to the beginning point ($\tau^\infty$) of the first sequence of reference points ($\tau^t$, t=0, 1, 2, . . .) at the center of projection O, the distance r from the initial position of the camera to the point X of the object which is subject to the measurement is obtained by $$\bar{r} = R^0 \cdot |\sin\beta| / |\sin(\gamma - \beta)|. \tag{29}$$

The position of the point X in the three-dimensional space when being viewed from the initial position of the camera is obtained by the following equation.

$$X^0 = r \cdot Ox^0 / |Ox^0| \tag{30}$$

Thus, according to the second aspect of the present invention, when the point at infinity ($\tau^\infty$) of the first and second sequences of reference points is located at the same position as the point at infinity ($x^\infty$) of the sequence of movement points, and only the point at infinity ($x^\infty$) (two degrees of freedom) on the projection surface, of the above point X of the object which is subject to the measurement, is given, the initial position of the projected point ($x^0$) (two degrees of freedom), the trace (two degrees of freedom) of the projected points, and the distance r (one dimensional quantity) for the point X in the three-dimensional space can be obtained.

(13) Three-Dimensional Measurement of a Contour Point by Symmetric Projection Measurement Method ($x^\infty = \tau^\infty$)

As an application of the method for measuring a position and an orientation of an object according to the second aspect of the present invention, where the point at infinity of the first and second sequences of reference points is located at the same position of the point at infinity of the sequence of movement points, a process for measuring a distance to a contour point p of an object which is subject to the measurement, is provided as follows.

1. Points of contour of the object which is subject to the measurement are obtained by extracting a contour in each image which is obtained during movement of a camera.

2. The symmetric projection measurement method ($x^\infty = \tau^\infty$) is executed for each of the contour images, to obtain three-dimensional positions of all the contour points.

Here, the points at infinity $p^\infty$ for all the projected points accord with the direction v of the movement of the camera. Therefore, the process is executed as $p^\infty = v$.

Thus, when only the direction of the movement of the camera (two degrees of freedom) is Given, a distance from the initial position of the camera to the contour point can be measured.

Namely, the trace (two degrees of freedom) of the projected points, the initial position of the projected point ($x^0$) (two degrees of freedom), and the distance (two degrees of freedom) to the point which is subject to the measurement, can be measured from the direction of the movement of the camera. Further, the three-dimensional positions of all the contour points in the same scene, can be obtained at one time.

(14) Three-Dimensional Measurement of a Line Segment by Symmetric Projection Measurement Method ($x^\infty = \tau^\infty$)

An explanation is provided for the case wherein the object which is subject to the measurement is a line segment (straight line) in the method for measuring a position and an orientation of an object according to the second aspect of the present invention, where the point at infinity of the first and second sequences of reference points is located at the same position as the point at infinity of the sequence of movement points. Here, it is assumed that the direction v of the movement of the camera is known prior to the measurement.

First, contours are extracted from each image which is obtained during movement of the camera, and a contour image of the object is obtained on a sphere having its center at the position O of the camera. Then, a contour line segment l is extracted from the contour image. Namely, a contour line segment l is projected on the sphere from the camera position O. The contour line segment l is a part of a great circle, and then a pole s of the great circle is obtained. By executing the above operation for each image, a sequence of movement points $s^t$ (t=0, 1, 2, ... ; t is a frame number) of poles s of great circles, is obtained. FIG. 20 shows an example of such a sequence of movement points $s^t$ (t=0, 1, 2, .. . ; t is a frame number) of poles s of great circles. In FIG. 20, the coordinate of the camera is fixed. When viewed from the camera, the line segment L moves relatively.

The above method wherein the points at infinity are made to be common, can be applied to a case wherein the point at infinity $s^\infty$ of the sequence of movement points $s^t$ (t=0, 1, 2, ... ; t is a frame number) of poles s is given first. By using this point at infinity $s^\infty$, the above symmetric projection measurement method ($x^\infty = \tau^\infty$) when the points at infinity are made to be common, is executed.

When a line segment is measured, as mentioned above, the sequence of movement points $s^t$ (t=0, 1, 2, . . . ; t is a frame number) of the poles s of the great circles which are obtained by projecting contour line segment l on a sphere from the camera position O, is regarded as the aforementioned sequence of movement points ($x^t$, t=0, 1, 2, . . .) which line up on an intersection line of the predetermined plane or surface of the second order and a plane which contains a predetermined center of projection corresponding to a position of a camera according to the first step in the second aspect of the present invention.

Here, the three-dimensional orientation of the line segment is obtained from the pole z(=Ss) of the trace which is obtained by the present invention. By using the value r which is obtained by the equations (28) and (29), the length h of a perpendicular line which is dropped from the initial position of the camera to the line segment which is subject to the measurement.

$$h = r \cdot \sin \pi \quad (31)$$

where $\pi = \cos^{-1}(v \cdot Ss)$. (32)

In addition, the orientation $Sh^0$ of the perpendicular line which is dropped from the camera to the line segment which is subject to the measurement, is obtained by an exterior product of $s^0$ and Ss, $$sh^0 = [s^0 \times Ss]. \quad (33)$$

The point $s^0$ is obtained as the reference point c by the equation (26). FIG. 21 shows the above parameters.

Thus, by using the method according to the second aspect of the present invention where the points at infinity are made a common point, for the measurement of a three-dimensional position and an orientation of a line segment, when the point at infinity $s^\infty$ (two degrees of freedom) of a sequence of movement points $s^t$ (t=0, 1, 2, ... ; t is a frame number) of poles s of great circles which are obtained by projecting a contour line segment l on a sphere from a camera position O, and a direction v (two degrees of freedom) of movement of the camera, are given, the orientation of the line segment (one degree of freedom) and a distance (one degree of freedom) from an initial position of the camera to the line segment are obtained. In addition, the beginning point ($s^0$) (one degree of freedom) of the pole positions is obtained as a result of the second aspect of the present invention where the points at infinity are made a common point, and an orientation $Sh^0$ (one degree of freedom) of a perpendicular line which is dropped from the camera to the line segment can be obtained.

Further, as a characteristic feature of the present invention, three-dimensional parameters of all the line segments which share a point at infinity $S^\infty$ (which are parallel to each other) can be obtained. Namely, three-dimensional parameters of a plurality of line segments in a scene which is shot by the camera, can be obtained at one time, by shooting the line segments at a plurality of camera positions, and generating once first and second sequences of reference points.

(15) Third Aspect of the Present Invention

An explanation is given next for the method for measuring a position and an orientation of an object, according to the third aspect of the present invention.

As mentioned before, according to the third aspect of the present invention, in the first step, a sequence of movement points ($x^t$, t=0, 1, 2, . . .) which line up on an intersection line of a predetermined plane or surface of the second order and a plane which contains a predetermined center of projection corresponding to a position of a camera, is obtained by obtaining projected points which are respectively generated for a plurality of positions of the camera corresponding to movement of the camera in a predetermined direction by projecting an image element of the object which is subject to the measurement, onto a point on the predetermined plane or surface of the second order, where the position of the camera is deemed as the center of projection.

In the second step, an intersection point of the predetermined plane or surface of the second order and a straight line which passes through the center of projection and is perpendicular to an arbitrary projection plane which contains the predetermined center of projection, is obtained as a reference point for plane projection.

In the third step, a sequence of projected movement points ($x'^t$, t=0, 1, 2, . . .) is obtained by obtaining intersection points at which an intersection line of the predetermined plane or surface of the second order and the projection plane, intersects with intersection lines of the predetermined plane or surface of the second order and planes each containing the center of projection, the reference point for plane projection, and a point of the sequence of movement points ($x^t$, t=0, 1, 2, . . .), where the projected movement points ($x'^t$, t=0, 1, 2, . . .) are respectively projected points of the sequence of movement points ($x^t$, t=0, 1, 2, ...) on the intersection line of the predetermined plane or surface of the second order and the projection plane.

In the fourth step, a sequence of reference points is obtained ($\tau^t$, t=0, 1, 2, ...) which line up on an intersection line of a plane containing the center of projection and the predetermined plane or surface of the second order, shares a point with the sequence of projected movement points ($x'^t$, t=0, 1, 2, ...) and has the same cross ratio (inharmonic ratio) as a cross ratio of the sequence of movement points ($x^t$, t=0, 1, 2, ...).

In the fifth step, an intersection point is obtained of intersection lines which are respectively intersection lines of the predetermined plane or surface of the second order and planes each containing the center of projection and a pair of corresponding points one of which belongs to the sequence of projected movement points ($x'^t$, t=0, 1, 2, ...), and the other of which belongs to the sequence of reference points ($\tau^t$, t=0, 1, 2, ...).

In the sixth step, geometrical information is obtained in the projection plane on the image element of the object when using the position of the camera in the three-dimensional space as a reference position, based on the position of the intersection point.

Each point of the above sequence of movement points ($x^t$, t=0, 1, 2, ...) is obtained by projecting a direction of shooting of a specific image element, for example, a point in a three-dimensional space by the camera, on a surface of the second order (for example, a sphere) from a predetermined center of projection (for example, the position of the camera), where the image element is located far from the camera, and, for example, the camera may be attached to an arm of a robot. The position (polar coordinate) of the projected point on the surface of the second order (for example, the sphere) moves on the surface of the second order, with the movement of the camera. For example, when the camera moves in a predetermined direction, a sequence of movement points is generated on the surface of the second order (the sphere) by the movement of the projected point with pitches corresponding to pitches of the movement of the camera. Instead of the moving of the camera, a plurality of cameras may be arranged with the above pitches.

Figure 22:
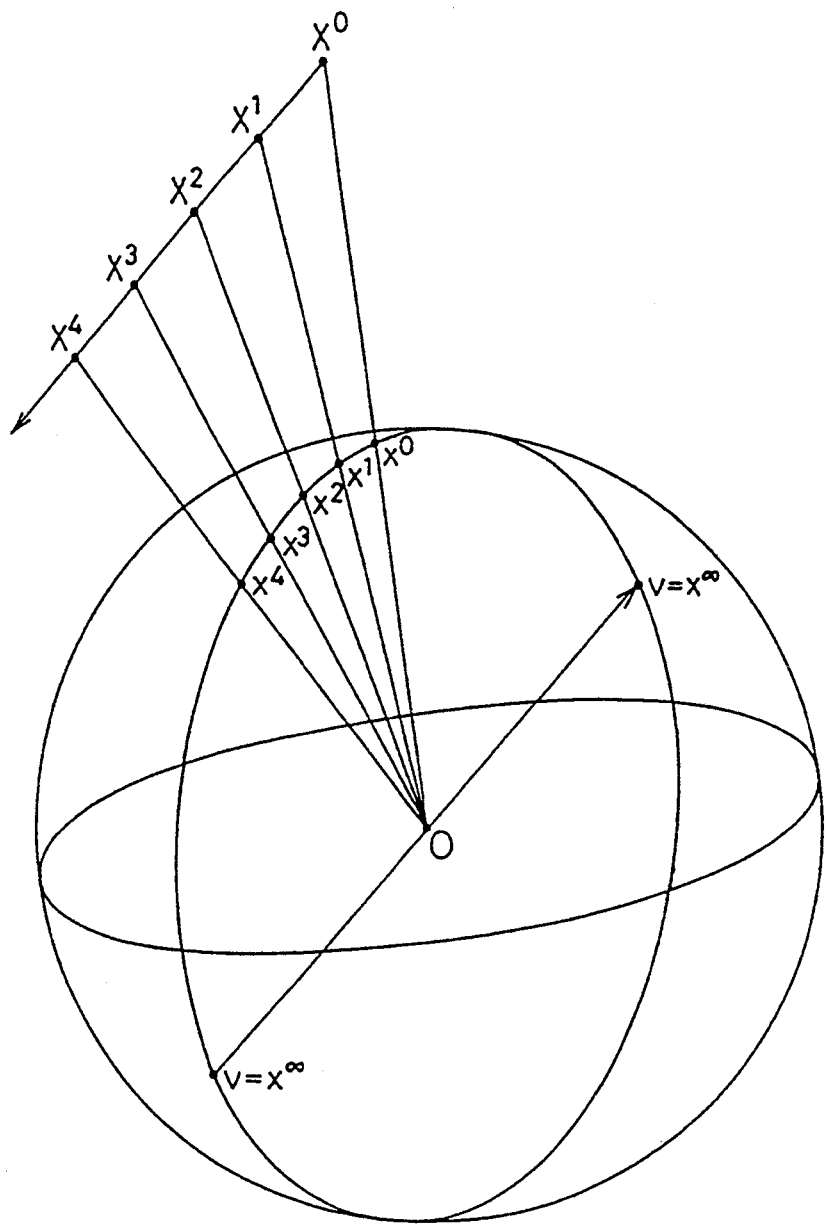
FIG. 22 is a diagram for explaining projection on a sphere of a point which is subject to measurement, corresponding to movement of a camera.

For example, the point which is subject to the measurement, in the three-dimensional space, is projected on the sphere from the point of origin O. The projection is repeated while the camera is moved in parallel with a fixed pitch $\Delta X$, to obtain a time sequence ( sequence of movement points ) $x^t$ (t=0, 1, 2, ...; t is a frame number), as shown in FIG. 22.

Then, the following process is executed.

Figure 23:
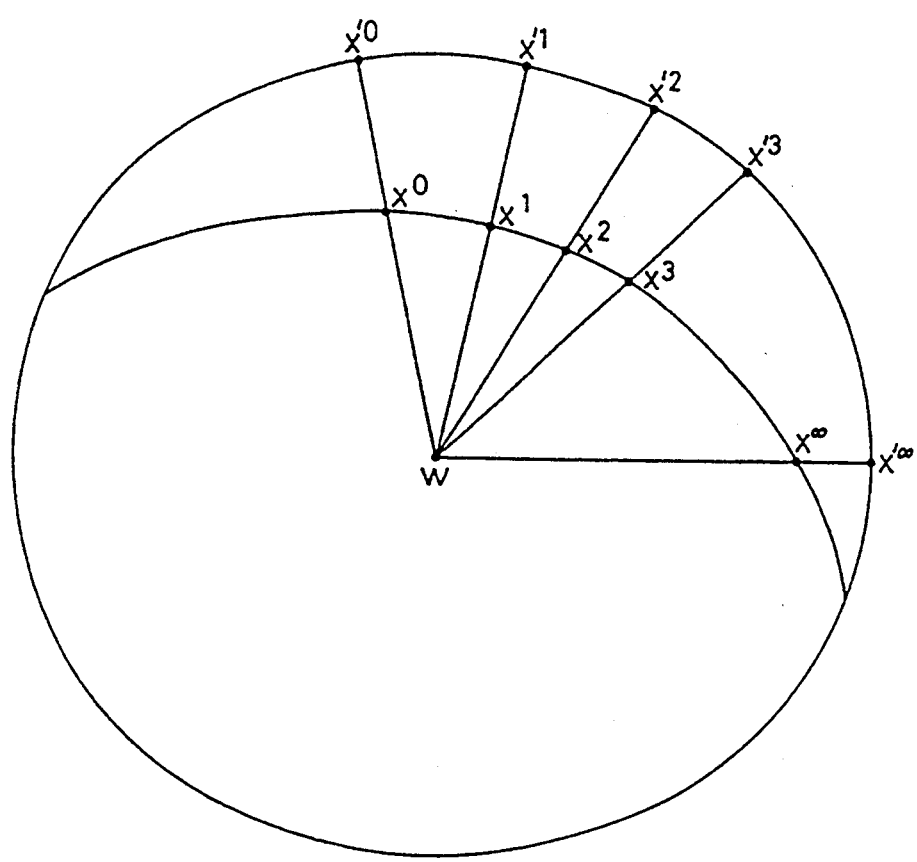
FIG. 23 is a view in a direction perpendicular to a projection plane, of an operation of obtaining sequence of projected movement points, in the plane projection type projection measurement method.
Figure 24:
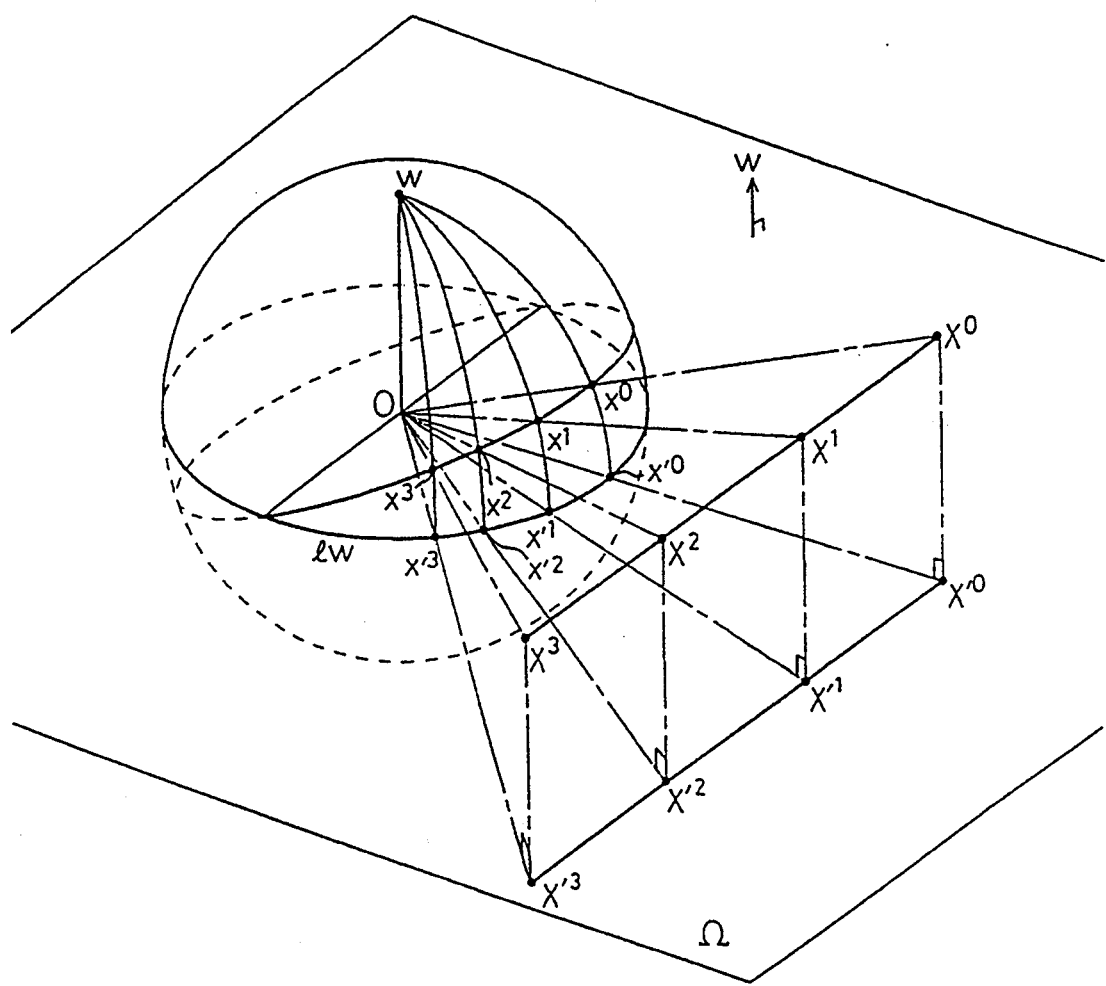
FIG. 24 is a stereographic view of an operation of obtaining sequence of projected movement points, in the plane projection type projection measurement method.

1. A new projection center w is determined at an arbitrary position on the sphere, and a great circle having its pole at the point w is denoted by lw. Then, an intersection point $x'^t$ of the great circle lw and a great circle $wx^t$ is obtained for all the points $x^t$ of the sequence of movement points. FIG. 23 is a plan view of the sphere in the direction of w, and FIG. 24 is a stereographic view of the process.

2. The projection measurement method is executed for the sequence of points $x'^t$.

Figure 25:
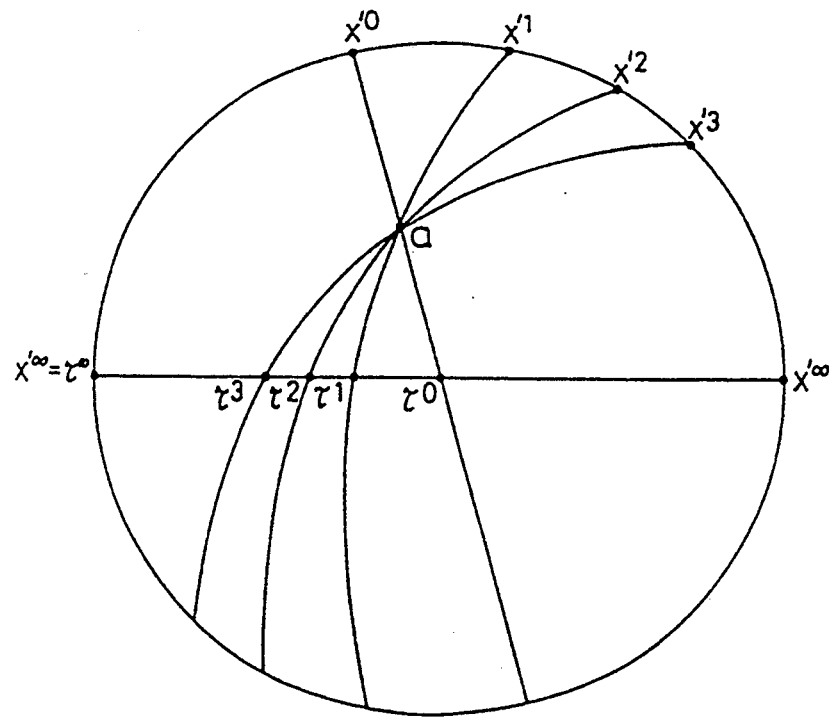
FIG. 25 is a view from a direction perpendicular to a projection plane, of a sphere in the plane projection type projection measurement method sharing a point at infinity.
Figure 26:
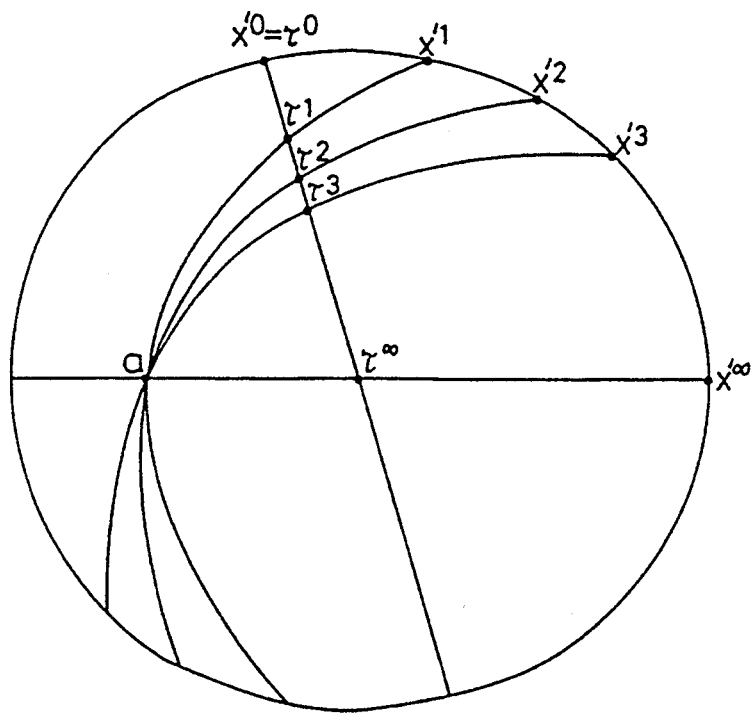
FIG. 26 is a view in a direction perpendicular to a projection plane, of a sphere in the plane projection type projection measurement method sharing a beginning point.

In this case, two processes are provided: the point at infinity $\tau^\infty$ is located at the same position as the point at infinity $x^\infty$ in one process as shown in FIG. 25; and the beginning point $\tau^0$ is located at the same position as the beginning point $x^0$ in the other process as shown in FIG. 26.

According to the above processes, when, for example, the object which is subject to the measurement is a point, the projected position on an arbitrary plane containing the camera center, can be obtained.

Since the points $x^t$ are projected on a great circle lw which has its pole at the point w, the trace of all the points is the great circle lw, and therefore, the measurement is possible even when the trace of projected points of the sequence of points which is subject to measurement is unknown.

In addition, since a plurality of images are used, credibility and accuracy of the measurement is improved. Further, since the measurement is carried out by using the pitch and the phase component of the sequence of points $x^t$, the credibility is further improved. The above-mentioned method for measuring a position and an orientation of an object, according to the third aspect of the present invention, is denoted as a plane projection-type projection measurement method.

(16) Three-Dimensional Measurement of a Contour Point by Plane Projection-Type Projection Measurement Method The method according to the third aspect of the present invention wherein the point at infinity $\tau^\infty$ of the sequence of reference points is located at the same position as the point at infinity $x^\infty$ of the sequence of movement points, is applied to the measurement of a contour point, as indicated by the following 1 to 3. It is assumed that the direction of the movement of the camera is known.

1. Points of contour of the object which is subject to the measurement are obtained by extracting a contour in each image which is obtained during movement of a camera.

2. The center of projection w is determined at an arbitrary position, and the plane projection-type projection measurement method ($x^\infty = \tau^\infty$) is executed for the above contour points.

Here, the points at infinity $p^\infty$ for all the projected points accord with the direction v of the movement of the camera. Therefore, the process is executed as $p^\infty = v$.

Figure 27:
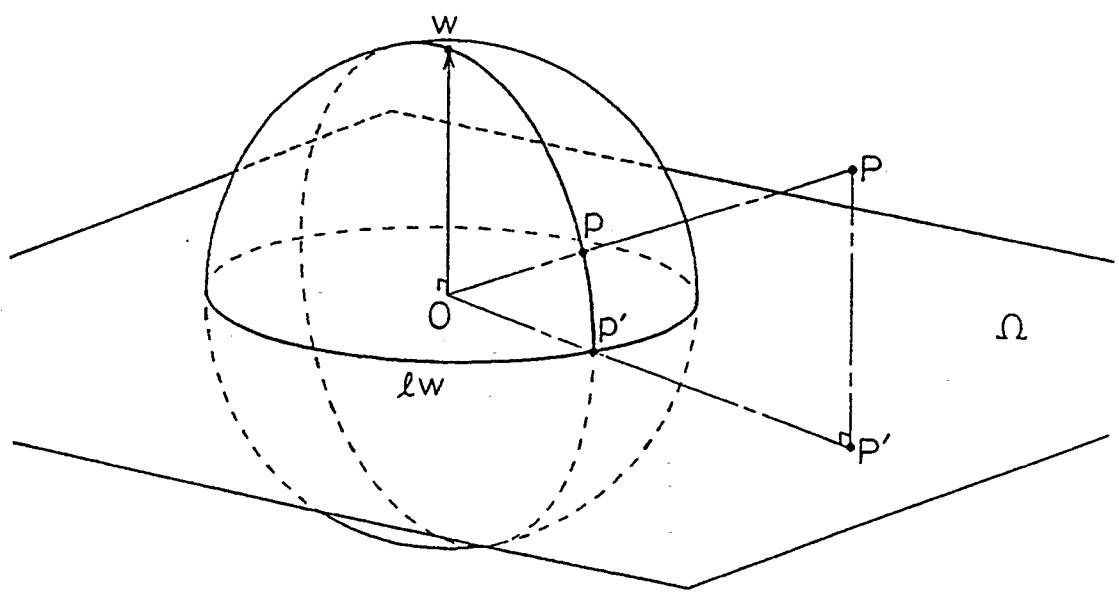
FIG. 27 is a diagram showing a relationship of positions in a three-dimensional space in the plane projection type projection measurement method for a contour point P as an object.

By this method, a projected position P' when the contour point P in the three-dimensional space is projected in parallel on an arbitrary plane $\Omega$ is obtained (FIG. 27).

Figure 28:
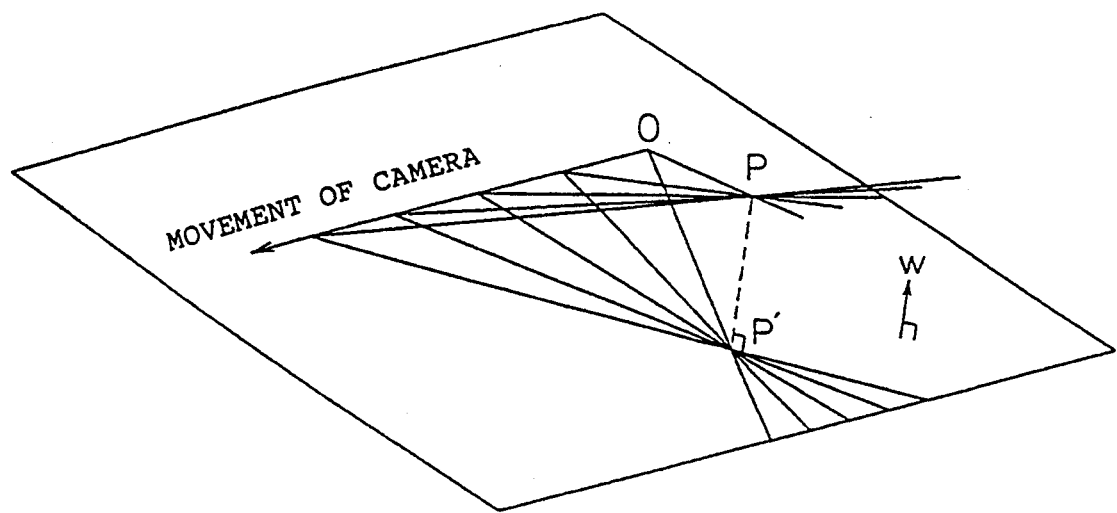
FIG. 28 is a diagram showing an operation of obtaining a position of a projected point P' on a plane $\Omega$ of a contour point P in a three-dimensional space by the sequence of projected movement points $p'^t$ which is obtained in the plane projection type projection measurement method ($x^\infty = \tau^\infty$)

The point $p'^t$ which is obtained by the plane projection-type projection measurement method ($x^\infty = \tau^\infty$) gives a direction to the projected point P' on the plane $\Omega$. Therefore, as shown in FIG. 28, the position of the contour point P in the three-dimensional space, can be obtained.

Thus, when only the direction v of the movement of the camera (two degrees of freedom) is given, the projected position P' of the contour point can be measured.

The projected positions of all the contour points in the same scene, can be obtained at one time. Namely, a plan view of the contour points can be made. Further, the measurement is possible even when the trace is unknown.

(17) Three-Dimensional Measurement of a Line Segment by Plane Projection-Type Projection Measurement Method ($x^\infty = \tau^\infty$)

The method according to the third aspect of the present invention wherein the point at infinity $\tau^\infty$ of the first and second sequence of reference points is located at the same position as the point at infinity $x^\infty$ of the sequence of movement points, is applied to the measurement of a line segment (straight line), as indicated by the following steps 1. to 3. It is assumed that the direction of the movement of the camera is known.

Figure 29:
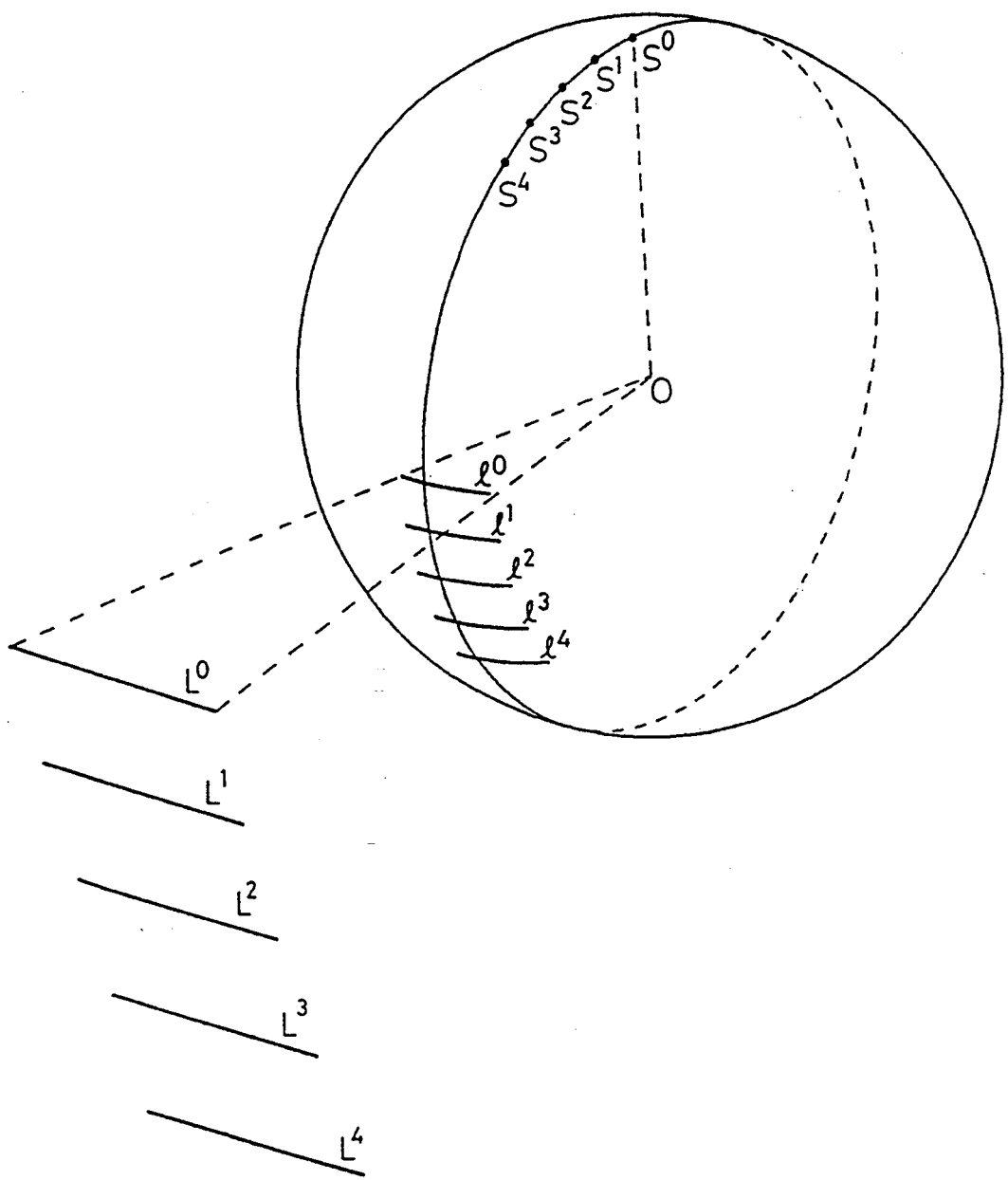
FIG. 29 is a diagram showing an operation of obtaining a sequence of movement points $s^t$ by projecting a line segment onto a sphere from a plurality of camera positions.

1. Contours are extracted from each image which is obtained during movement of the camera, and a contour image of the object is obtained on a sphere having its center at the position O of the camera. Then, a contour line segment l is extracted from the contour image. The contour line segment l is a part of a great circle, and then a pole s of the great circle is obtained. By executing the above operation for each image, a sequence of movement points $s^t$ (t=0, 1, 2, . . . ; t is a frame number) of poles s of great circles, is obtained. FIG. 29 shows an example of such a sequence of movement points $s^t$ (t=0, 1, 2, . . . ; t is a frame number) of poles s of great circles. In FIG. 29, the coordinate of the camera is fixed. When viewed from the camera, the line segment L moves relatively.

Figure 30:
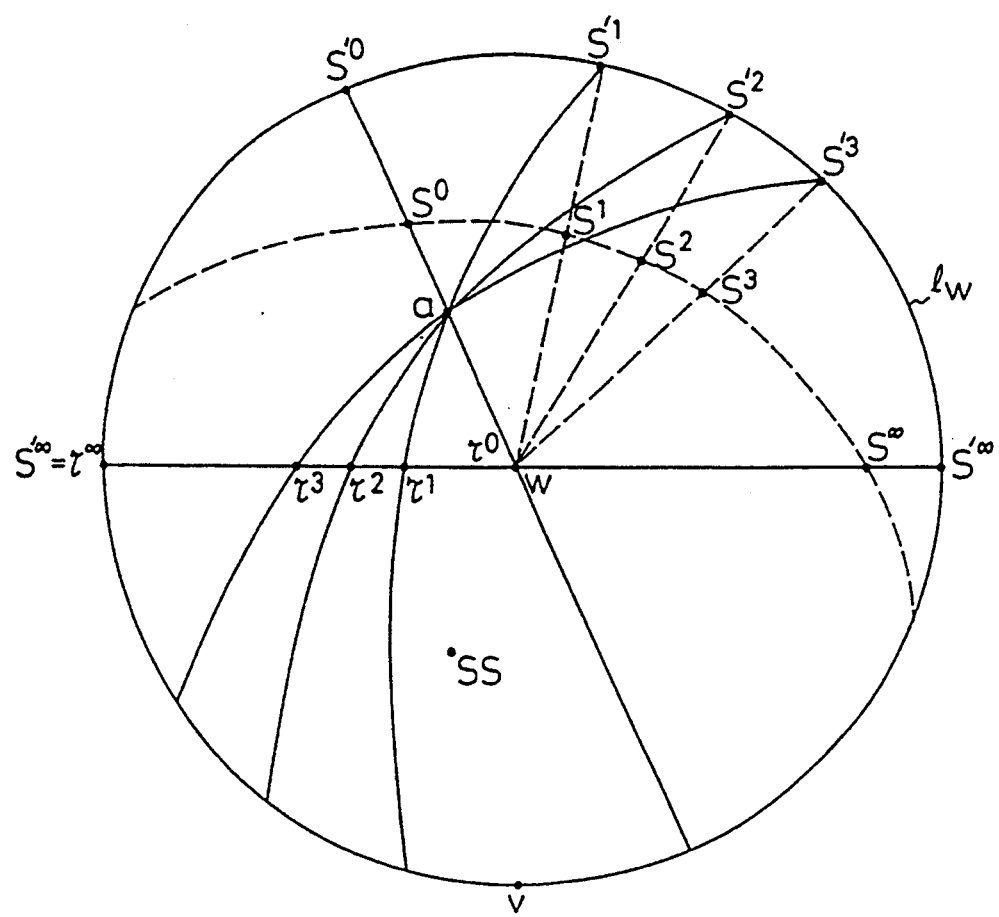
FIG. 30 is a view in a direction perpendicular to a projection plane, of a sphere in the plane projection type projection measurement method for an input signal as an object.

2. The center of projection w is determined on the sphere, at a position which is perpendicular to the direction v of the movement of the camera, and the plane projection-type projection measurement method ($x^\infty = \tau^\infty$) is executed wherein the point at infinity is shared as above. (FIG. 30). In this case, the point at infinity $s'^\infty$ of the projected pole $s'^t$ which is necessary for the above method, is obtained as an exterior product of v and w as follows.

$$s'^\infty = [v \times w] \quad (34)$$

Figure 31:
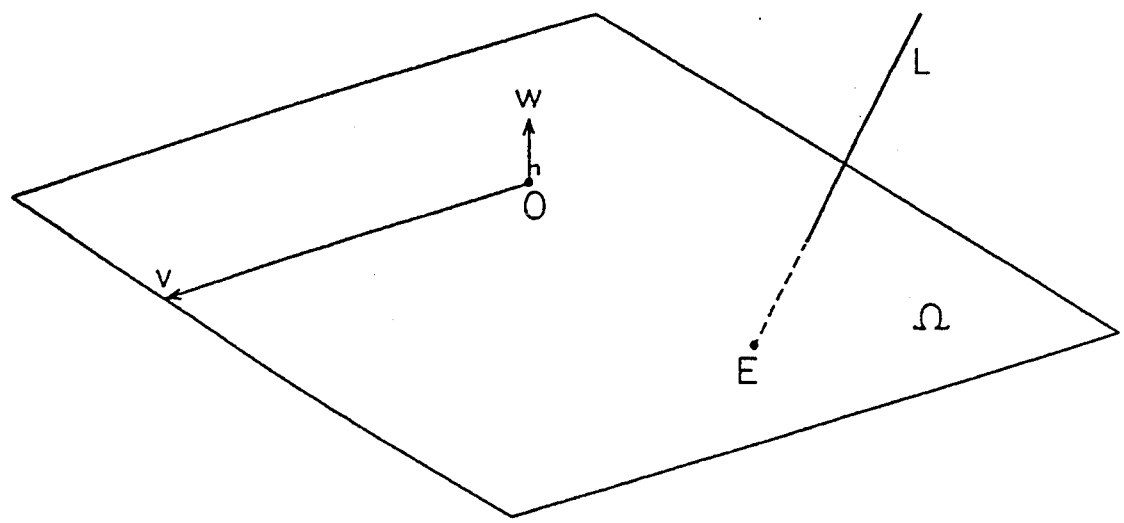
FIG. 31 is a diagram showing a position of an intersection point E of a projection plane $\Omega$ and a line segment which is subject to measurement.

3. The above-obtained $s'^0$ is rotated by 90 degrees on the great circle lw to obtain a point $s'^0_r$. Then, an intersection point E (FIG. 31) of the line segment (or a straight line containing the line segment) and a plane $\Omega$ containing the camera center O, and having an arbitrary normal line, is obtained as a point locating in the direction of $s'^0_r$, as follows.

$$E = r \cdot 0 \, s'^0_r / | O \, s'^0_r \quad (35)$$

Figure 32:
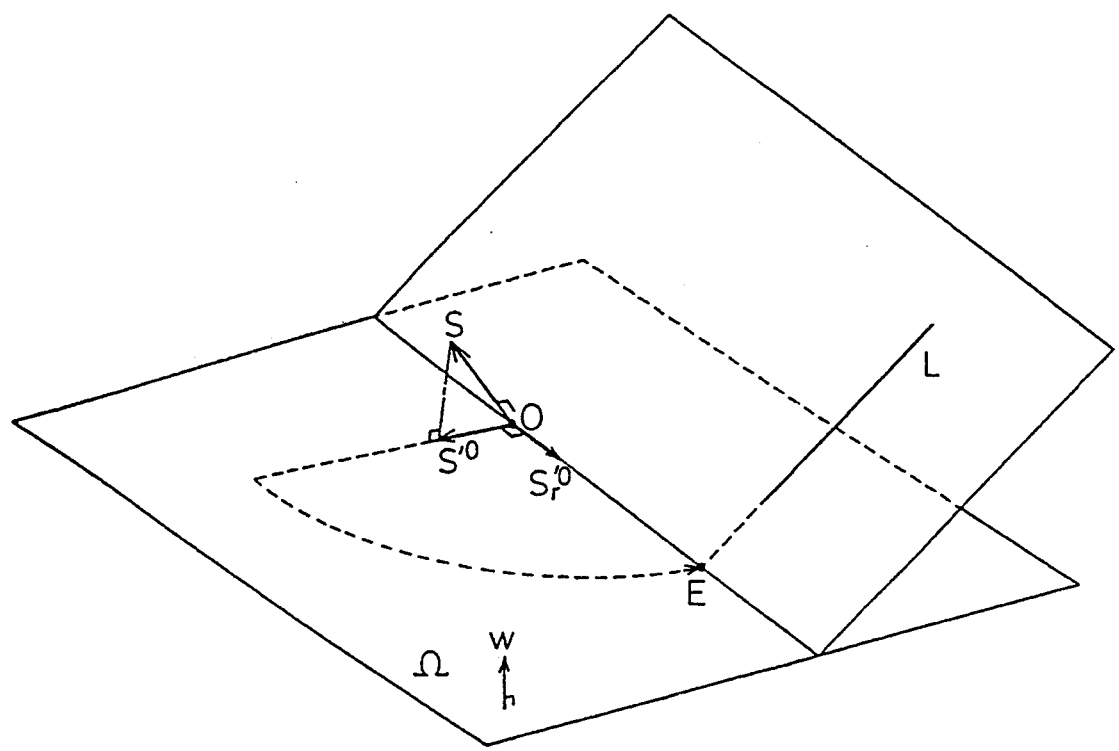
FIG. 32 is a diagram for explaining an operation of obtaining a position of an intersection point E of a projection plane $\Omega$ and a line segment which is subject to measurement, by executing measurement using a pole s of the line segment, and rotating the result of the measurement by 90 degrees.

The process for converting the pole s of the line segment to the point s' on the great circle lw, corresponds to an operation of obtaining a vector s' which is made by a projection of a vector s on the plane $\Omega$, as shown in FIG. 32. Since the point E is on the vector which is generated by a rotation of the vector s by 90 degrees, the position of the point E is obtained by carrying out the measurement for the point s, and rotating the result of the measurement by 90 degrees.

Generally, the point at infinity $s^\infty$ of the poles is located at an arbitrary position on the great circle lv having its pole in the direction v, and the position of the point at infinity $s^\infty$ varies according to the orientation of the line segment. As a result, the following problems occur when executing the method wherein the point at infinity is shared as above.

[1] Although it is necessary first to obtain an orientation of the line segment, and to obtain a point at infinity using the orientation of the line segment, the process for obtaining the orientation of the line segment cannot be executed stably.

[2] The execution must be repeated for the number of the orientations of the line segment to measure all the line segments.

However, due to the determination of the center of projection w at the position in the direction perpendicular to the direction v of the movement of the camera, the above problems [1] and [2] are solved at the same time. Namely, by making the above w perpendicular to the above v, the points at infinity $s'^\infty$ of the projected poles of all the line segments accord to a point. Therefore, all the line segments are measured by one operation (solution of the above problem [2]), and the point is obtained by the equation (solution of the above problem [1]).

As explained above, when the method according to the third aspect of the present invention wherein the point at infinity of the sequence of reference points is located at the same position as the point at infinity of the sequence of movement points, is applied to the measurement of a line segment (straight line), an intersection point E of the line segment (the straight line containing the line segment) and a plane $\Omega$ containing a camera center O, and having a normal line w which is perpendicular to the direction v of movement of the camera, can be obtained. The projected positions E of all the line segments in the same camera scene can be obtained at one time. This measurement is possible even when the trace is unknown.

(18) Application of Three-Dimensional Measurement of a Line Segment by Plane Projection-Type Projection Measurement Method ($x^\infty = \tau^\infty$)

Figure 33:
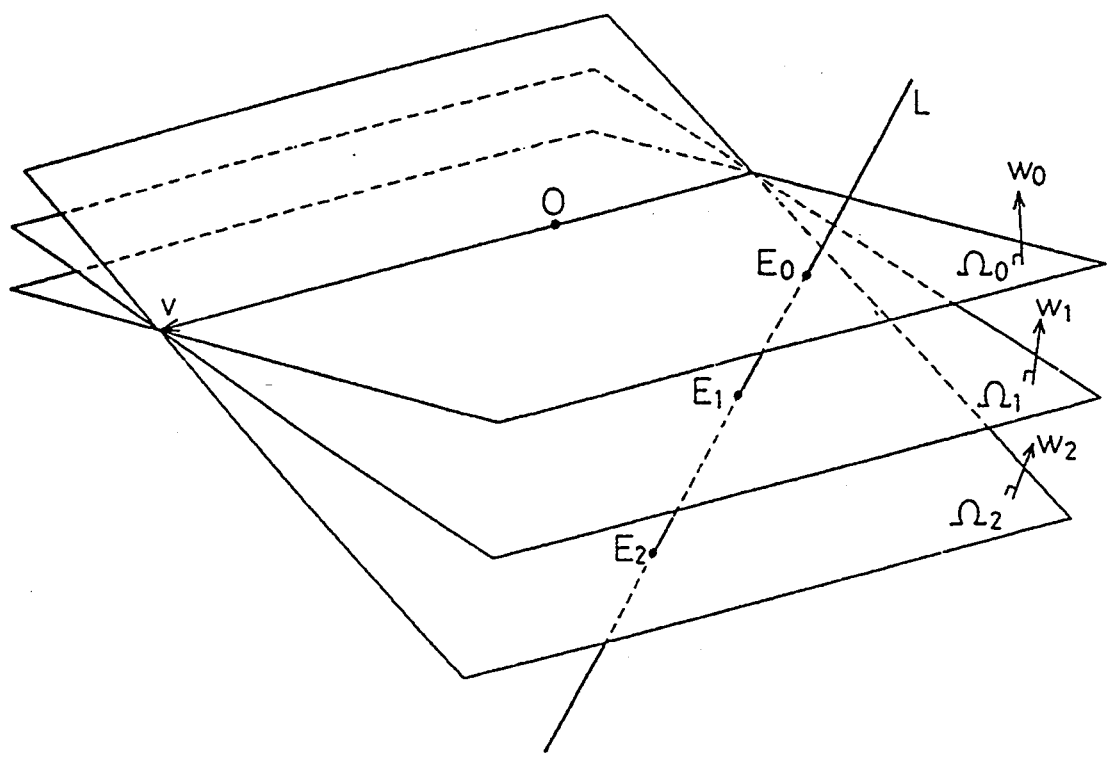
FIG. 33 is a diagram showing an example of measurement of a line segment in a three-dimensional space, using a plurality of projection planes.

As shown in FIG. 33, the above process for obtaining an intersection point E of a line segment (the straight line containing the line segment) and a plane $\Omega$ containing a camera center O, and having a normal line w which is perpendicular to the direction v of movement of the camera, is executed for a plurality of planes $\Omega 1$, $\Omega 2$, $\Omega 3$, . . . respectively having a normal line w1, w2, w3, . . . , and intersection points E1, E2, E3, . . . of the line segment which is subject to the measurement, and corresponding planes $\Omega 1$, $\Omega 2$, $\Omega 3$, . . . Then, three-dimensional parameters of the line segment are obtained by obtaining straight lines passing through the intersection points E1, E2, E3, . . . Here, the number of the planes (the number of the intersection points) must be increased with the number of line segments which are shot by the camera. For example, when only one line segment is shot by the camera, at least two planes (intersection points) are necessary. When the number of the planes (the number of the intersection points) is increased, the credibility of the measurement result is increased.

Thus, the three-dimensional parameters (orientation and position) can be obtained.

In addition, the credibility and accuracy of the measurement result is increased.

(19) Projection Measurement Method and Symmetrical Projection Measurement Method Using Plane and Surface of the Second Order Other Than Sphere Although the projection is made on a sphere in all the above explanations of the first to third aspect of the present invention, a plane or a surface of the second order other than a sphere may be used as a projection surface in all the above-explained embodiments.

Figure 34:
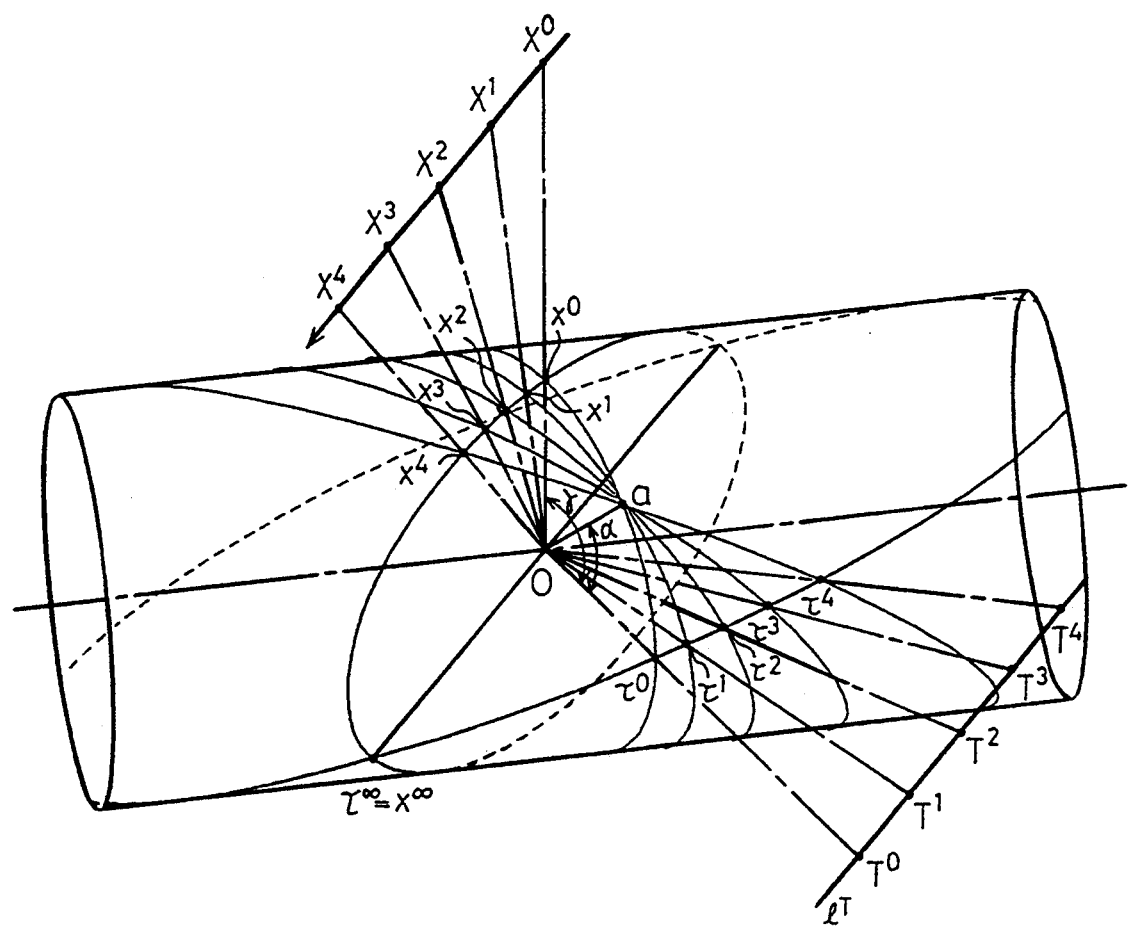
FIG. 34 is a diagram showing an example of the projection measurement method using a circular cylinder as a projection surface.

For example, with a circular cylinder as shown in FIG. 34, first, a sequence of movement points $x^t$ and a sequence of reference points $\tau^t$ are obtained on the circular cylinder. Next, intersection lines of the circular cylinder and planes respectively containing the center O of a projection point $x^t$ and a corresponding point $\tau^t$, are obtained. In the case of the circular cylinder, the intersection points are each an ellipse. Therefore, the aforementioned accumulating intersection point as the point a, and the like, is obtained as an intersection point of the ellipses. Then, the distance can be is obtained by the equation (8) for example, when the point of infinity ($x^\infty$) of the sequence of movement points and the point of infinity ($\tau^\infty$) of the sequence of reference points are common. The aforementioned angles $\alpha$ and $\gamma$ are obtained by coordinate transformation between the cylindrical coordinate ($\rho, \theta, \Phi$) and the Cartesian coordinate, as follows.

$$x = \rho \cdot \sin\theta \cdot \cos\Phi$$
$$y = \rho \cdot \sin\theta \cdot \sin\Phi \quad (36)$$
$$z = \rho \cdot \cos\theta$$

From the vectors $\tau^0$, $x^0$, and a which are represented by the Cartesian coordinate, $$\cos <\tau^0 O x^0 = (\tau^0, x^0)/|\tau^0||x^0| \quad (37)$$

$$\cos <\tau^0 O a = (\tau^0, a)/|\tau^0||a|. \quad (38)$$

Equations like the equation (36) are known for coordinate transformation between a Cartesian coordinate and other curvilinear coordinates, for example, a paraboloid, a hyperboloid, or the like. In the cases of the paraboloid and the hyperboloid, the center of projection is located at the centers of the paraboloid and the hyperboloid, respectively.

Figure 35:
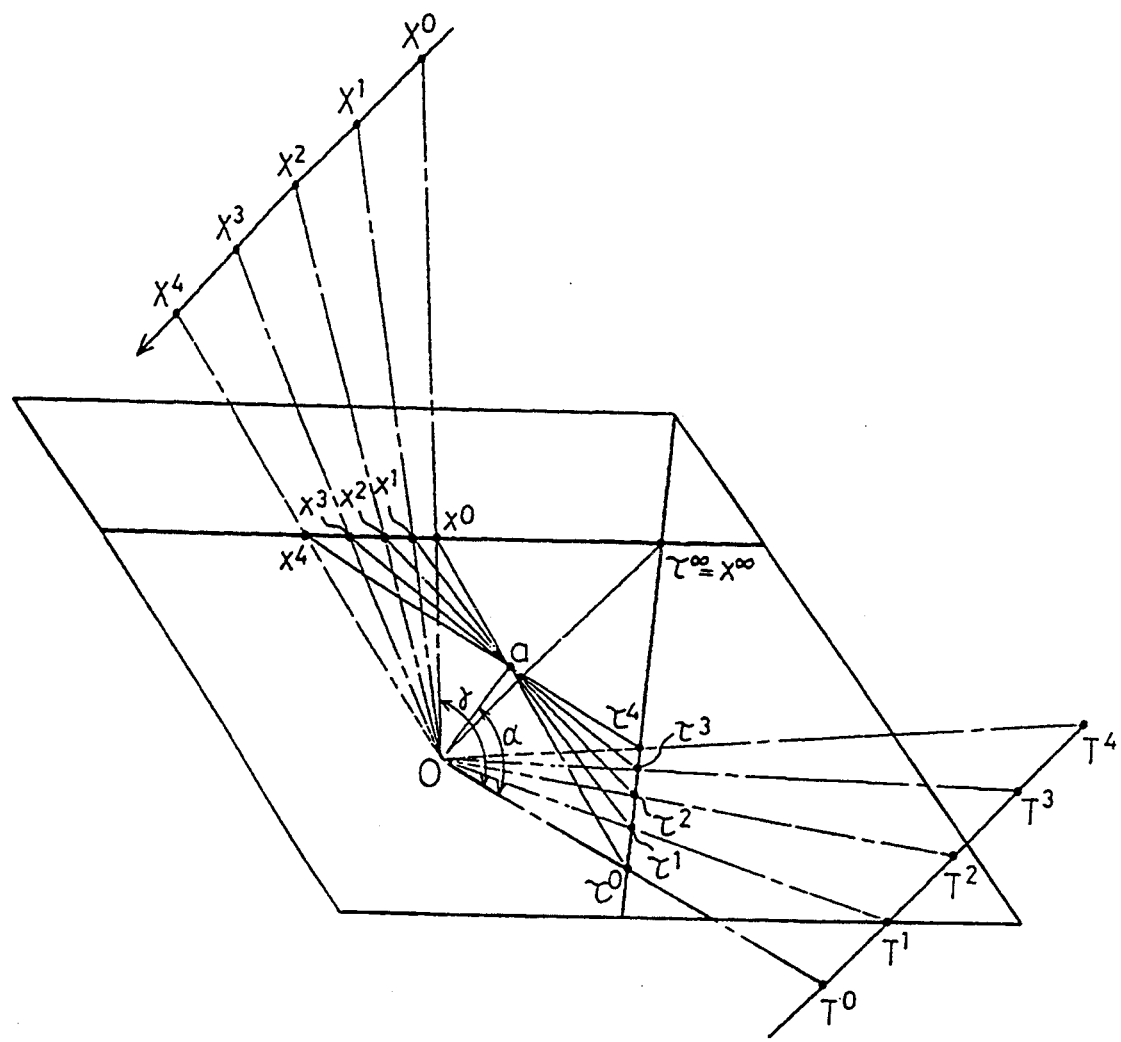
FIG. 35 is a diagram showing an example of the projection measurement method using a plane as a projection surface.

Similar operations are carried out in the case when a plane is used as a projection surface, as shown in FIG. 35. In this case, the intersection lines are straight lines, and therefore, corresponding points $x^t$ and $\tau^t$ are respectively connected by straight lines on the plane, and the accumulating intersection point is obtained therefrom. In addition, the distance is obtained by the equation (8). The angles $\alpha$ and $\gamma$ can be obtained from the vectors $\tau^0$, $x^0$, and a which are represented by the Cartesian coordinate, using the equations (37) and (38).

Otherwise, when the projection surface can be a plane, the distance is obtained by $$r = R^0 \cdot |A \cdot \alpha|/|B \cdot (\gamma - \alpha)| \quad (39)$$

where $\gamma = \quad \alpha = \quad A = \overline{Ox^0}$, and $B = \overline{O\tau^0}$.

Figure 36:
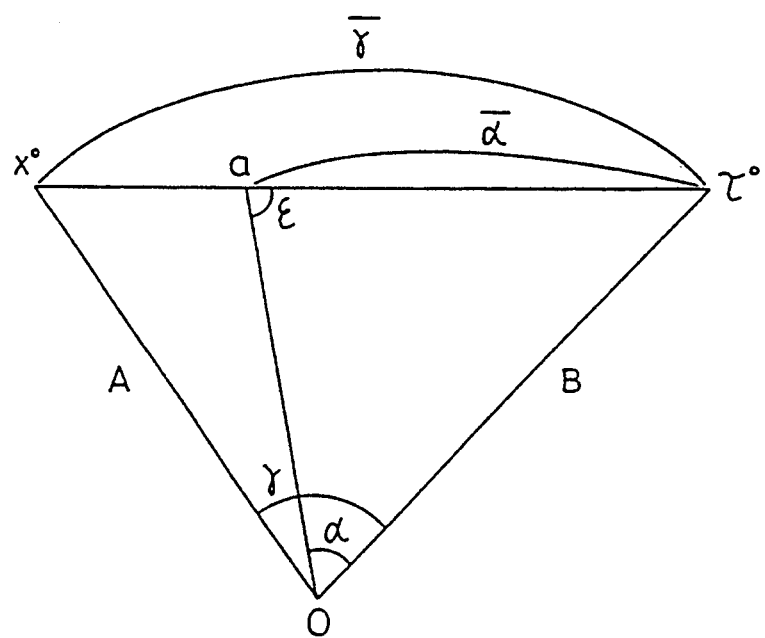
FIG. 36 is a diagram showing a relationship between sides and angles in the triangle $O\tau^0x^0$ in the arrangement of FIG. 34.

The above equation is obtained by using the sine formula in the triangle $O\tau^0 x^0$, as shown in FIG. 36. Namely, $$a/\sin \alpha = B/\sin \epsilon \quad (40)$$

and $$(\gamma - \alpha)/\sin(\gamma - \alpha) = A/\sin(\pi = \epsilon) \quad (41)$$

where $\epsilon = <\tau^0 Oa$. Therefore, the following equation exists.

$$\sin \alpha/\sin(\gamma - \alpha) = (A/B) \cdot [\alpha/(\gamma - \alpha)]$$

(20) Projection Measurement Method and Plane Projection-Type Projection Measurement Method Using Plane and Surface of the Second Order Other Than Sphere Although the projection is made on a sphere in all the above explanations of the third aspect of the present invention, a plane or a surface of the second order other than a sphere may be used as a projection surface in all the above-explained embodiments.

The plane projection-type projection measurement method comprises two stages: one is a stage of projecting the points $x^t$ to the projected points $x'^t$; and the other is a stage of distance-measuring process as the above-mentioned projection measuring method. Since the projection measuring method using the arbitrary surface of the second order is explained above, here, it is explained that the above stage of projecting the points $x^t$ to the projected points $x'^t$, can be carried out using the arbitrary surface of the second order.

The process of projecting the points $x^t$ to the projected points $x'^t$ using a sphere, comprises an operation of obtaining intersection points of the great circles $wx^t$ and the great circle $lw$ having w as its pole (FIGS. 23 and 24). Since a great circle on a sphere defines a plane in three-dimensional space, the above operation corresponds to an operation of obtaining intersection lines of the planes containing the three points O, w, and $x^t$, and the plane $\Omega$ passing through the point O and perpendicular to w. The above algorithm which is represented for a sphere, can be transformed to an algorithm for three-dimensional space. Further, the algorithm for the three-dimensional space can be transformed to an algorithm for another surface of the second order. Concretely, the above operation is realized by obtaining intersection lines of the above-mentioned two planes and the above surface of the second order, and obtaining the intersection point of the intersection lines to obtain the point $x'^t$.

Figure 37:
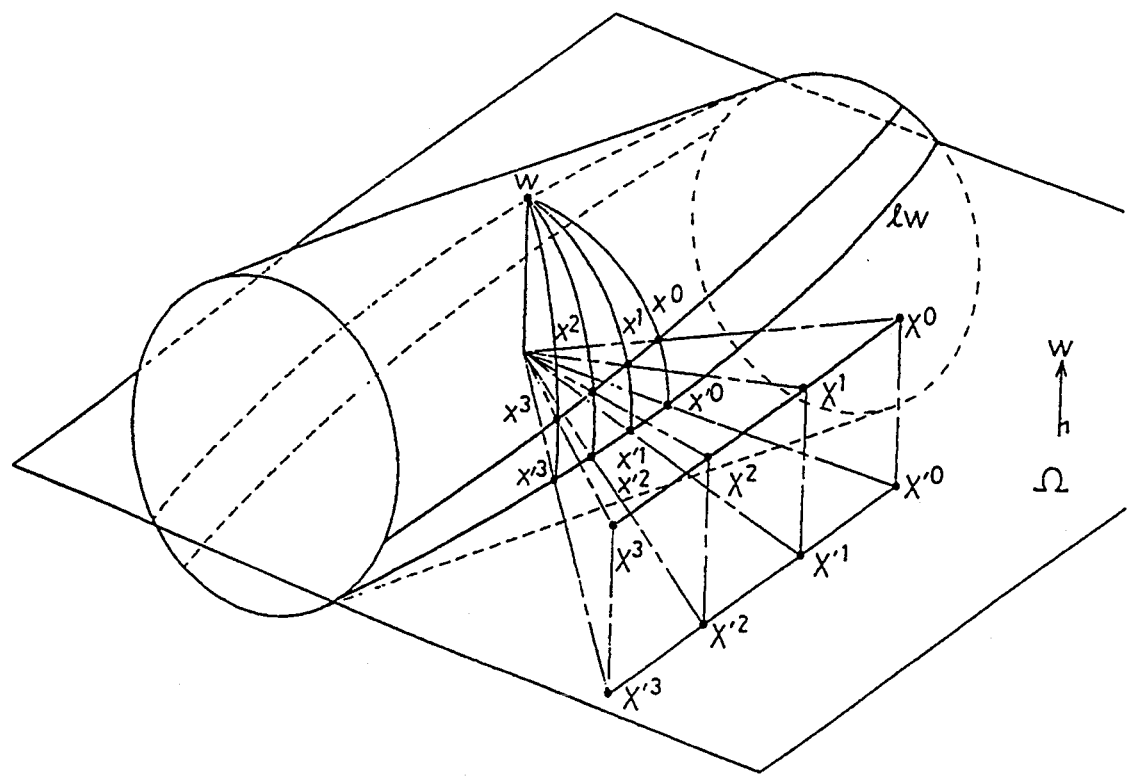
FIG. 37 is a diagram showing an example of plane projection type projection measurement method using a circular cylinder as a projection surface.

For example, when a circular cylinder is used, the above intersection line forms an ellipse. As shown in FIG. 37, the above operation of obtaining intersection lines of the planes containing the three points O, w, and $x^t$, and the plane $\Omega$ passing through the point O and perpendicular to w, is an operation of obtaining an intersection point of an ellipse passing through the points w and $x^t$, and an ellipse $lw$ defining the plane $\Omega$, on the circular cylinder.

Figure 38:
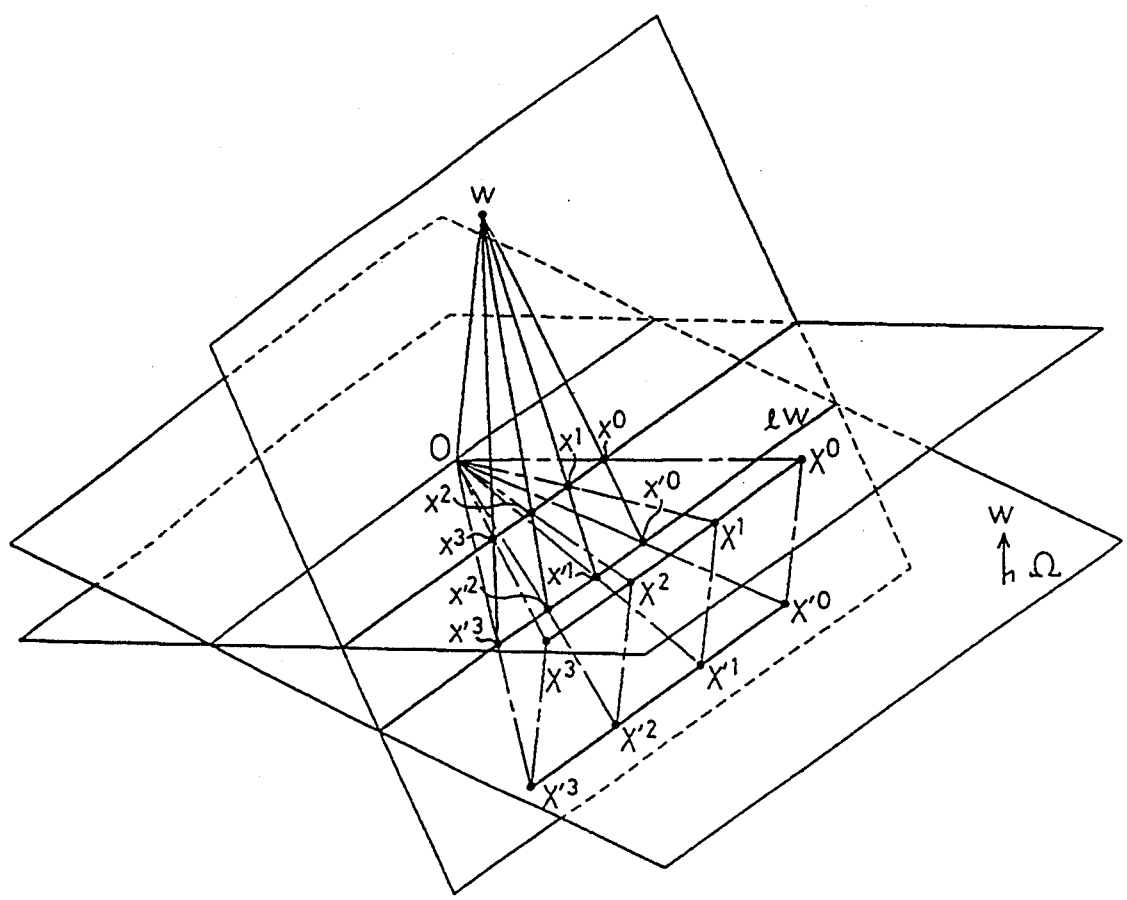
FIG. 38 is a diagram showing an example of plane projection type projection measurement method using a plane as a projection surface.

When a plane is used, since the intersection lines of planes and a plane are straight lines, as shown in FIG. 38, the above operation is an operation of obtaining an intersection point of a straight line passing through w and $x^t$, and a straight line $lw$ defining the plane $\Omega$.

Similar to the operation in the case of using a sphere, the above w in various surfaces can be obtained as an intersection point of a straight line passing through the point O of origin of the coordinate, and being parallel to the direction w of the projection, and the surface.

Thus, although the algorithms in the various embodiments of the present invention, are explained using a sphere for the sake of simplicity, these algorithms can be realized using an arbitrary surface of the second order other than a sphere.

(21) Construction of Symmetric Projection Measurement Apparatus

Figure 39:
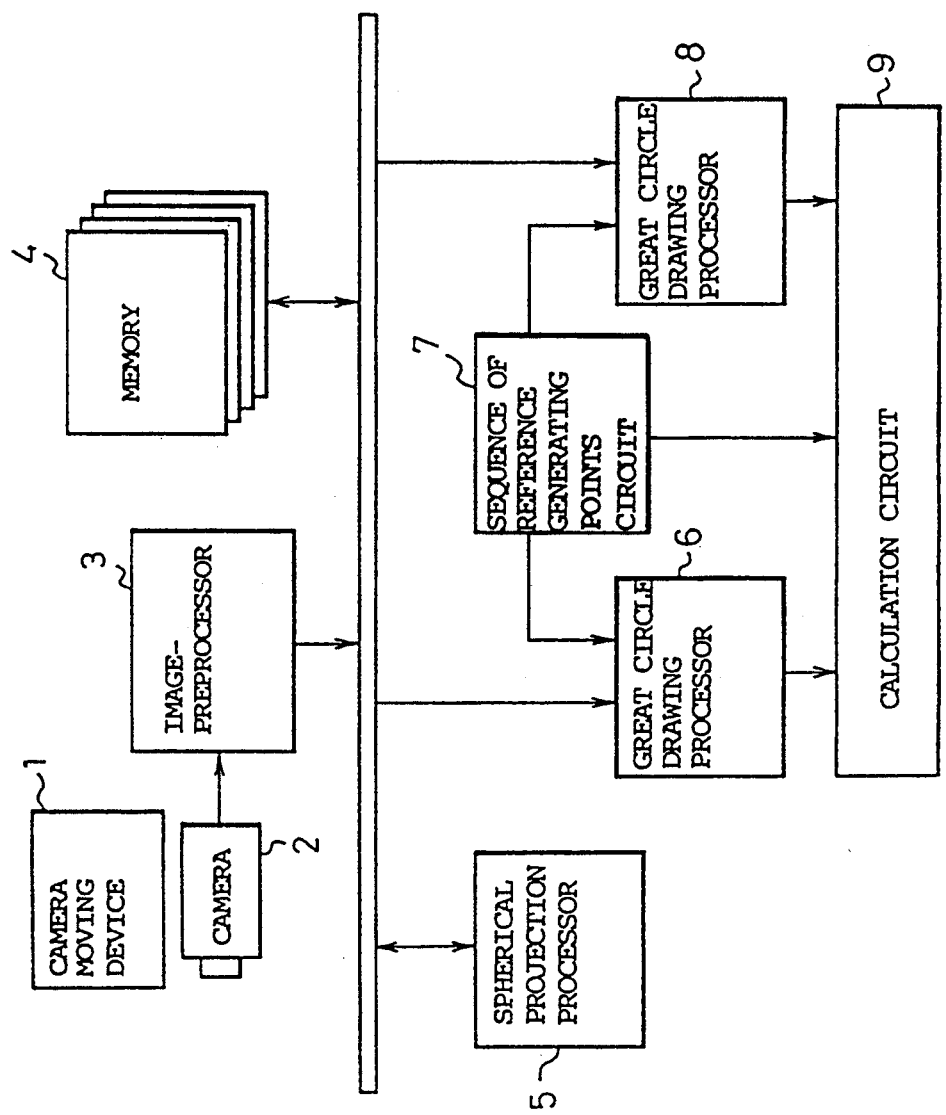
FIG. 39 is a diagram showing an outline construction of a symmetric projection measurement apparatus realizing the method for measuring a position and orientation of an object according to the second aspect of the present invention.

FIG. 39 shows a block diagram showing a construction of a symmetrical projection measurement apparatus which executes the method for measuring a position and an orientation of an object, according to the second aspect of the present invention. Since, as explained before, the method for measuring a position and an orientation of an object, according to the second aspect of the present invention, includes all the functions of the method for measuring a position and an orientation of an object, according to the first aspect of the present invention, the construction of the apparatus is explained for the above second aspect only.

In the construction of FIG. 39, the camera 2 which can be moved by the camera moving apparatus 1, moves in parallel with a predetermined pitch, and shoots an object to obtain an image of the object at a plurality of positions, where the object is subject to the measurement, and is located far from the camera 2. The image data is transferred to the image preprocessor 3. The image preprocessor 3 extracts a contour image from unprocessed image data, and stores the data in the memory 4. The technique for extracting a contour image from unprocessed image data, is well-known. The sequence of reference points Generating circuit 7 generates the first sequence of reference points $\tau^t$ (t=0, 1, 2, ...) and the second sequence of reference points $-\tau^t$ (t=0, 1, 2, ...) corresponding to the above pitch of the movement of the camera 2, as explained before. The first sequence of reference points $\tau^t$ (t=0, 1, 2, ...) is supplied to the great circle drawing processor 6, and the second sequence of reference points $-\tau^t$ ( t=0, 1, 2, ...) is supplied to the great circle drawing processor 8.

When measuring a position of a point in the three-dimensional space, the great circle drawing processor 6 draws an image of intersection points of lines connecting all the contour points which are memorized in the memory 4, and the respective points of the first sequence of reference points $\tau^t$(t=0, 1, 2, ...), on a memory (not shown) which is provided therein, to obtain the aforementioned first intersection point a. The great circle drawing processor 8 draws an image of intersection points of lines connecting all the contour points which are memorized in the memory 4, and the respective points of the second sequence of reference points $-\tau^t$(t=0, 1, 2, ...), on a memory (not shown) which is provided therein, to obtain the aforementioned second intersection point b. These data of the first and second intersection points are supplied to the calculation circuit 9. The calculation circuit 9 calculates a three-dimensional position of the object which is subject to the measurement, by the aforementioned equation for calculating the distance, using the above data of the first and second intersection points, and the point at infinity $\tau^\infty$ of the sequence of reference points (in the case where the beginning point is shared as explained before) or the beginning point $\tau^0$ of the sequence of reference points (in the case where the point at infinity is shared as explained before), where the above point at infinity $\tau^\infty$ or the above beginning point $\tau^0$ is supplied from the sequence of reference points generating circuit 7.

When measuring a position and an orientation of a line segment in the three-dimensional space, data once stored in the memory 4 is transferred to the spherical projection processor 5. The spherical projection processor 5 projects all the contour points on a sphere, and extracts a pole s. The data of the extracted pole s is transferred again to the memory 4, and processed by the great circle drawing processors 6 and 8, and the calculation circuit 9.

Thus, by the construction of FIG. 39, the steps according to the second aspect of the present invention are performed. The above processors 3, 6, and 8, the sequence of reference points generating circuit 7, and the calculation circuit 9 are each realized by a hardware logic circuit for realizing a corresponding function. Further, all the calculations in all the embodiments and applications in the (first and) second aspect(s) of the present invention, are each realized by a hardware logic circuit for realizing a corresponding function.

(22) Construction of Plane Projection-Type Projection Measurement Apparatus

Figure 40:
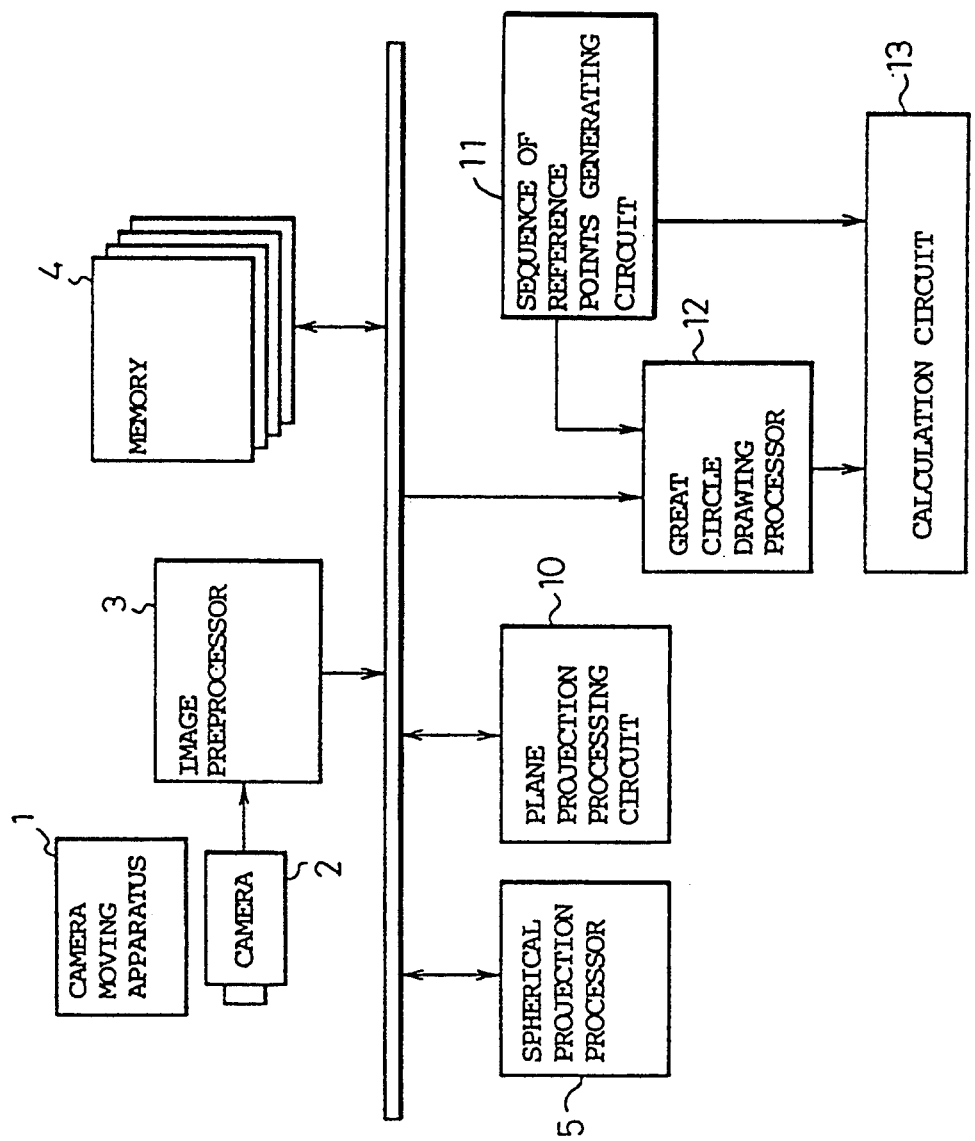
FIG. 40 is a diagram showing an outline construction of a plane projection type projection measurement apparatus realizing the method for measuring a position and orientation of an object according to the third aspect of the present invention.

FIG. 40 shows a block diagram showing a construction of a plane projection-type projection measurement apparatus which executes the method for measuring a position and an orientation of an object, according to the third aspect of the present invention.

In the construction of FIG. 40, the functions of the camera 2, the camera moving apparatus 1, the image preprocessor 3, and the spherical projection processor 5, are the same as those in the construction of FIG. 39. In the construction of FIG. 40, the projected points (the aforementioned sequence of projected movement points) of the sequence of movement points on the plane are obtained by the plane projection processing circuit 10, corresponding to the third step in the aforementioned third aspect of the present invention. That is, the data of the contour points $p^t$ which is stored in the memory 4, and the data of the poles $s^t$ which is obtained by projection of line segments by the spherical projection processor 5, and is stored in the memory 4, are respectively transformed to the sequence of movement points $p'^t$ or projected poles $s'^t$, and are then stored in the memory 4. The great circle drawing processor 12 and the calculation circuit 13 carry out the calculation of the projection measurement method, using the data of the above sequence of projected movement points $p'^t$ or $s'^t$. The process is the same as in the construction of FIG. 39.

Thus, the process according to the third aspect of the present invention is executed in the construction of FIG. 40. The above processors 35 and 12, the plane projection processing circuit 10, and the calculation circuit 13 are each realized by a hardware logic circuit for realizing the corresponding function. Further, all the calculations in all the embodiments and applications in the third aspect of the present invention, are each realized by a hardware logic circuit for realizing the corresponding function.

More detailed constructions of the spherical projection processor, the great circle drawing processor, and the like which are used in the above constructions of FIGS. 39 and 40, are shown, for example, in the U.S. Pat. No. 4,736,436, of Yasukawa, dated Apr. 5, 1988.

Figure 41:
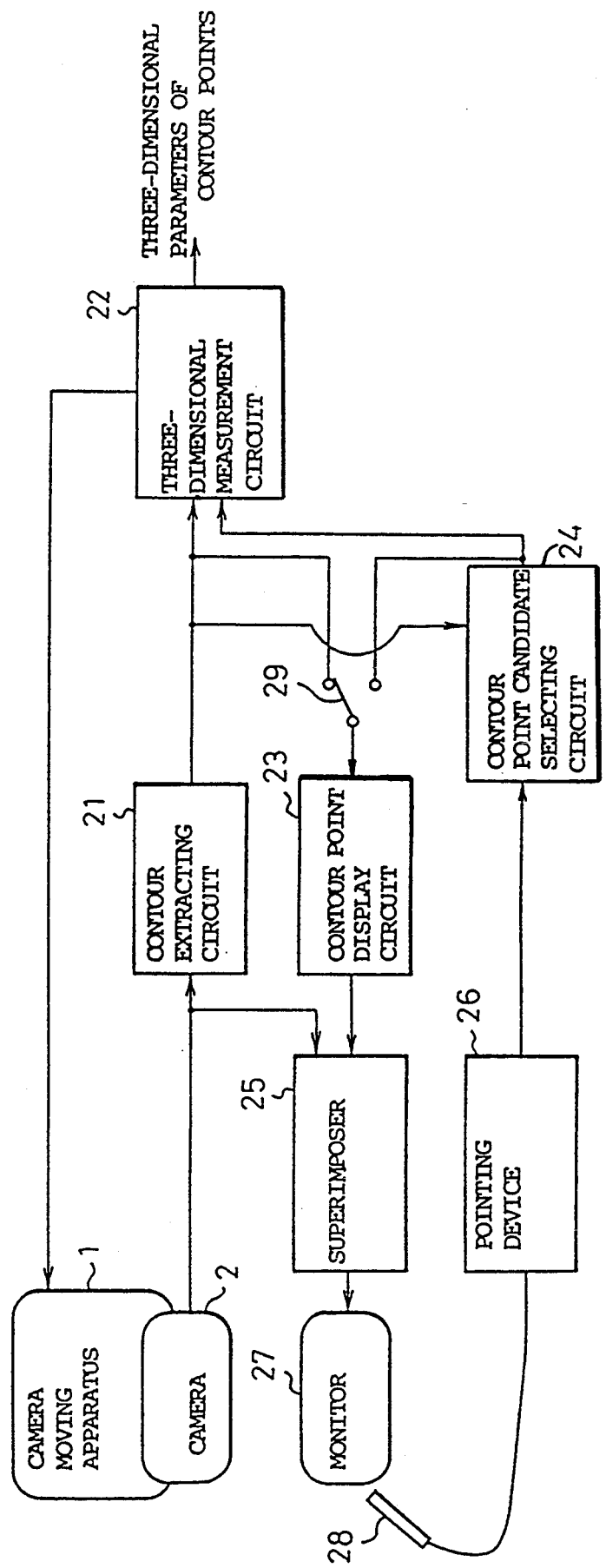
FIG. 41 is a diagram showing an outline construction of a symmetric projection measurement apparatus realizing the method for measuring a position and orientation of an object according to the second aspect of the present invention, where the apparatus is constructed so that the measurement of a contour point in a three-dimensional space can be interactively carried out.

(23) Construction of Symmetric Projection Measurement Apparatus for Measurement of a Contour Point FIG. 41 shows a block diagram showing a construction of a symmetric projection measurement apparatus which executes the method for measuring a position and an orientation of an object, according to the second aspect of the present invention, where the apparatus is adapted to an interaction with an operator for carrying out measurement of a contour point. In the construction of FIG. 41, the camera 2 inputs an image of an object. The camera moving device 1 moves the camera 2 in a predetermined direction. The contour extracting circuit 21 extracts a contour point from the image. The contour point display circuit 23 processed data to display the contour point. The superimposer 25 displays the image superimposing the contour point with the image. The monitor 27 displays the image for the operator. The pointing device 26 is provided for inputting a position when the position is designated on the monitor 27. The contour point candidate selecting circuit 24 selects one point which is at the nearest position from the position which is designated by the pointing device 26, among the contour points which are sent from the contour extracting circuit 21. The three-dimensional measurement circuit 22 obtains the three-dimensional position of the contour point which is selected by the contour point candidate selecting circuit 24, based on the contour points which are obtained during the movement of the camera.

The above apparatus performs the following steps 1 to 8.

1. First, an image is input into the camera 2 which is located at an initial position, and then, contour points are extracted by the contour extracting circuit 21.

2. The extracted contour points are sent to the three-dimensional measurement circuit 22, and to the contour point display circuit 23 through the switch 29, and is displayed on the monitor 27, superimposed on the input image, by the contour point display circuit 23 and the superimposer 25.

3. The operator watches the above image, and designates one contour point which the operator wishes to measure, by the pointing device 26.

4. The contour point candidate selecting circuit 24 selects one contour point which is at the nearest position from the position which the operator designates by the pointing device 26.

5. The switch 29 is switched so that the output of the contour point candidate selecting circuit 24 is selected thereat, and only the selected contour point is superimposed on the original image, and is displayed to prompt confirmation by the operator.

6. A plurality of contour images are input by moving the camera 2.

7. The aforementioned symmetrical projection measurement method wherein the beginning point is a common $(x^0=\tau^0)$ is executed in the three-dimensional measurement circuit 22, by using each contour image and the above-confirmed contour point $p^0$ to obtain the three-dimensional position of the contour point.

8. The above operation is repeated when necessary.

Thus, according to the construction FIG. 41, the three-dimensional position of the required contour point can be measured interactively. By using the apparatus, for example, data of a shape of an object can be input into a computer.

Figure 42:
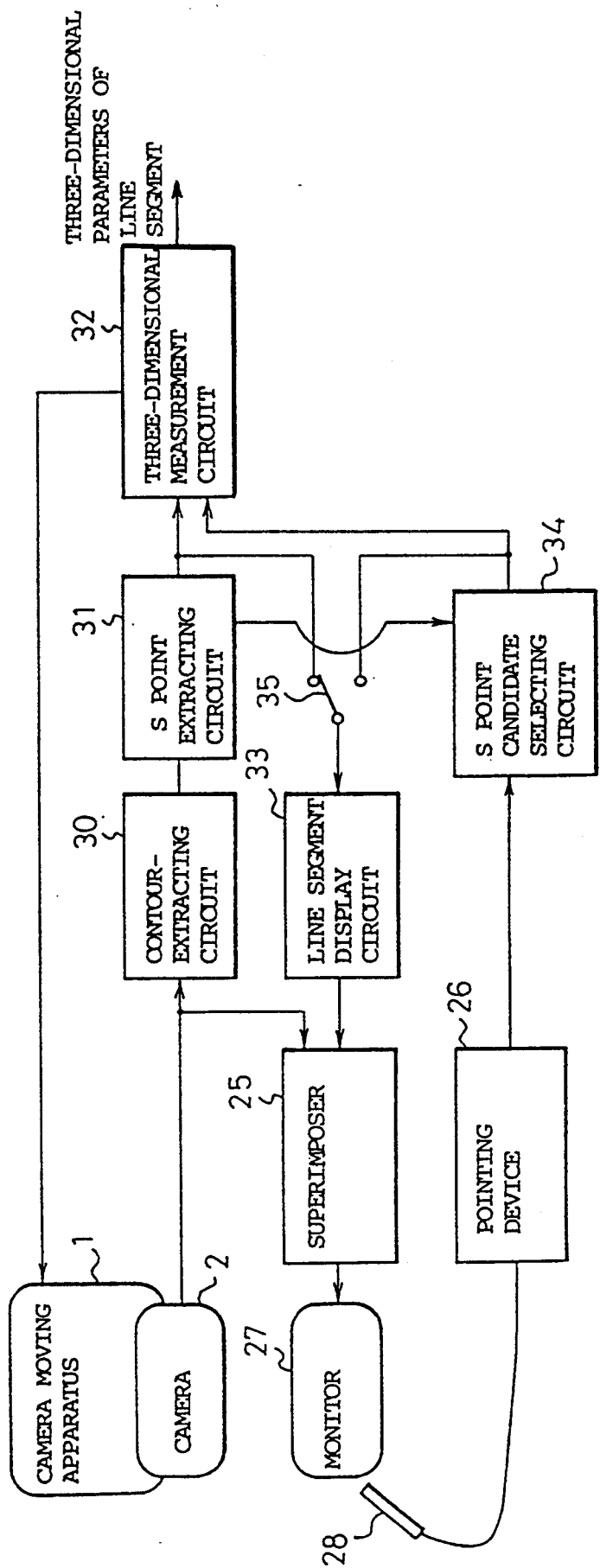
FIG. 42 is a diagram showing an outline construction of a symmetric projection measurement apparatus realizing the method for measuring a position and orientation of an object according to the second aspect of the present invention, where the apparatus is constructed so that the measurement of a line segment in a three-dimensional space can be interactively carried out.

(24) Construction of Symmetric Projection Measurement Apparatus for Measurement of a Line Segment FIG. 42 shows a block diagram showing a construction of a symmetric projection measurement apparatus which executes the method for measuring a position and an orientation of an object, according to the second aspect of the present invention, where the apparatus is adapted to an interaction with an operator for carrying out measurement of a line segment. In the construction of FIG. 42, the constructions and the functions of the camera 2, the camera moving device 1, the contour extracting circuit 30, the superimposer 25, the monitor 27, and the pointing device 26, are the same as the corresponding constructions in FIG. 41. The s point extracting circuit 31 extracts a line segment from a contour image, and obtains a pole of the line segment. The line segment display circuit 33 receives the above s point, and generates an image of the line segment at a corresponding position. The s point candidate selecting circuit 34 estimates the s point of the line segment which the operator selects, by using the position which is designated by the pointing device 26, and a sequence of the s points which is output from the s point extracting circuit 31. The three-dimensional measurement circuit 32 obtains three-dimensional parameters based on each s point which is obtained during the movement of the camera 2, and an initial s point $(s^0)$ which the s point candidate selecting circuit 34 selected out.

The above apparatus operates as the following steps 1 to 9.

1. First, an image is input into the camera 2 which is located at an initial position, and then, contour points are extracted by the contour extracting circuit 30.

2. In the s point extracting circuit 31, a line segment is extracted from the contour image, and a pole of the line segment is obtained.

3. The above-obtained pole is supplied to the three-dimensional measurement circuit 32, and to the line segment display circuit 33 through the switch 35. The line segment display circuit 33 generates an image of a line segment corresponding to the pole, and the superimposer 25 superimposes the generated result on the original image to display the superimposed image on the monitor 27.

4. The operator watches the above image on the monitor 27, and designates a point on a line segment which the operator wishes to measure, by the pointing device 26.

5. The s point candidate selecting circuit 34 estimates the s point of the line segment which the operator selects, based on the position which the operator designates, and s points which are output from the s point extracting circuit 31.

6. Only the line segment corresponding to the selected s point is displayed with superimposed on the original image to prompt confirmation by the operator.

7. A plurality of contour images are input by moving the camera 2 to obtain a sequence of movement points of the s points.

8. The aforementioned symmetrical projection measurement method wherein the beginning point is a common $(x^0=\tau^0)$ is executed in the three-dimensional measurement circuit 22, by using the above sequence of movement points and the above-confirmed s point $(s^0)$ to obtain the three-dimensional parameters of the contour point.

9. The above operation is repeated when necessary.

Thus, according to the construction FIG. 42, the three-dimensional position of the required contour point can be measured interactively. By using the apparatus, for example, data of a shape of an object can be input into a computer.

We claim:

1. A method for obtaining geometrical information on an object, comprising the steps of:
    a) moving a camera in a predetermined direction with regard to an object subject to measurement;
    b) taking a plurality of images of the object by the camera at a plurality of camera positions;
    c) extracting a plurality of contour images respectively from the plurality of images taken in step b) by the camera, where each of the plurality of contour images contains at least one image element of the object;
    d) projecting at least one image element in each of the plurality of contour images of the object onto a projected point on a predetermined projection surface, for each of the at least one image element, from a predetermined projection center corresponding to a camera center, to obtain, for each of the at least one image element, a plurality of projected points on a predetermined projection surface as a sequence of movement points $(x^t, t=0, 1, 2, \ldots)$ which line up on a first intersection line at which the predetermined projection surface intersects with a first plane containing the predetermined projection center, where the predetermined projection surface is one of a plane and a surface of the second order;

e) generating as a sequence of reference points ($\tau^t$, $t=0, 1, 2, \ldots$), a plurality of points which line up on a second intersection line of the predetermined projection surface and a second plane containing the projection center, so that the sequence of reference points ($\tau^t$, $t=0, 1, 2, \ldots$) and the sequence of movement points ($x^t$, $t=0, 1, 2, \ldots$) share a point, and the sequence of reference points ($\tau^t$, $t=0, 1, 2, \ldots$) is not identical with the sequence of movement points ($x^t$, $t=0, 1, 2, \ldots$), and has the same cross ratio (inharmonic ratio) as a cross ratio of the sequence of movement points ($x^t$, $t=0, 1, 2, \ldots$);

f) obtaining a first intersection point of a plurality of third intersection lines at which a plurality of third planes respectively intersect the predetermined projection surface, the plurality of third planes each containing the projection center, one movement point in the sequence of movement points ($x^t$, $t=0, 1, 2, \ldots$), and one reference point, corresponding to the movement point, in the sequence of reference points ($\tau^t$, $t=0, 1, 2, \ldots$); and g) obtaining geometrical information on the object with respect to the camera position, based on the position of the first intersection point to achieve environment recognition.

2. A method according to claim 1, wherein, in said step c) the sequence of movement points ($x^t$, $t=0, 1, 2, \ldots$) is obtained as a plurality of intersection points at which a plurality of straight lines intersects the predetermined projection surface, and the straight lines passing through the projection center and being parallel to respective directions of shooting by the camera at the plurality of camera positions.

3. A method according to claim 1, wherein, in said step e) the geometrical information on the object comprises a distance from an initial position of the camera to a point, corresponding to the image element of the object.

4. A method according to claim 1, wherein, in said step d), the sequence of movement points ($x^t$, $t=0, 1, 2, \ldots$) and the sequence of reference points ($\tau^t$, $t=0, 1, 2, \ldots$) share a common point as their beginning points ($x^0$ and $\tau^0$).

5. A method according to claim 4, wherein the plurality of positions of the camera line up in the predetermined direction with arbitrary pitches, and wherein said step d) for generating the sequence of reference points ($\tau^t$, $t=0, 1, 2, \ldots$) includes the substeps of:
(i) generating an auxiliary sequence of points ($T^t$, $t=0, 1, 2, \ldots$) which line up with the same pitches as the arbitrary pitches on a first straight line (IT) passing through an arbitrary position on a second straight line passing through the projection center and the beginning point ($x^0$) of the sequence of movement points ($x^t$, $t=0, 1, 2, \ldots$), where the beginning point ($T^0$) of the auxiliary sequence of reference points ($T^t$, $t=0, 1, 2, \ldots$) is the arbitrary point; and
(ii) projecting each point of the auxiliary sequence of points ($T^t$, $t=0, 1, 2, \ldots$) onto the predetermined projection surface from the projection center.

6. A method according to claim 5, wherein the first straight line (IT) passing through the arbitrary position on the second straight line passing through the projection center and the beginning point ($x^0$) of the sequence of movement points ($x^t$, $t=0, 1, 2, \ldots$), is perpendicular to the second straight line passing through the projection center and the beginning point ($\tau^0$) of the sequence of reference points ($\tau^t$, $t=0, 1, 2, \ldots$).

7. A method according to claim 5, further comprising the steps of:

g) defining a first point at infinity ($x\infty$) of the sequence of movement points as an intersection point of the predetermined projection surface and a first straight line passing through the projection center and being parallel to a direction of shooting the object by the camera when the camera is moved to infinity in the predetermined direction; and h) defining a second point at infinity ($\tau\infty$) of the sequence of reference points ($\tau^t$, $t=0, 1, 2, \ldots$) as an intersection point of the predetermined projection surface and a second straight line passing through the projection center and being parallel to the straight line (IT) passing through the arbitrary position on the other straight line passing through the projection center and the beginning point ($x^0$) of the sequence of movement points ($x^t$, $t=0, 1, 2, \ldots$);

wherein said step f) comprises obtaining a distance r from an initial position of the camera to a point, corresponding to the image element of the object by $$r = R^0 \cdot |\sin(\gamma - \alpha)| / |\sin\alpha|$$

where $R^0$ denotes a distance from the projection center to the beginning point ($T^0$) of the auxiliary sequence of points ($T^t$, $t=0, 1, 2, \ldots$), $\gamma$ denotes an angle between a direction to the first point at infinity ($x\infty$) of the sequence of movement points and a direction to the second point at infinity ($\tau\infty$) of the sequence of reference points ($\tau^t$, $t=0, 1, 2, \ldots$) at the projection center, and $\alpha$ denotes an angle between a direction to the first intersection point and a direction to the point at infinity ($\tau\infty$) of the sequence of reference points ($\tau^t$, $t=0, 1, 2, \ldots$) at the projection center.

8. A method according to claim 4, wherein the plurality of positions of the camera line up in the predetermined direction with an equal pitch ($\Delta X$); and wherein the sequence of reference points ($\tau^t$, $t=0, 1, 2, \ldots$) being generated by:
(i) generating an auxiliary sequence of points ($T^t$, $t=0, 1, 2, \ldots$) which line up with the same pitch as the equal pitch ($\Delta X$) on a first straight line (IT) passing through an arbitrary position on a second straight line passing through the projection center and the beginning point ($x^0$) of the sequence of movement points ($x^t$, $t=0, 1, 2, \ldots$), where the beginning point ($T^0$) of the auxiliary sequence of reference points ($T^t$, $t=0, 1, 2, \ldots$) is the arbitrary point; and
(ii) projecting each point of the auxiliary sequence of points ($T^t$, $t=0, 1, 2, \ldots$) onto the predetermined projection surface from the projection center.

9. A method according to claim 1, further comprising the steps of:

g) defining a first point at infinity ($x\infty$) of the sequence of movement points as an intersection point of the predetermined projection surface and a straight line passing through the projection center and being parallel to a direction of shooting the object by the camera when the camera is moved to infinity in the predetermined direction; and h) defining a second point at infinity ($\tau\infty$) of the sequence of reference points ($\tau^t$, t=0, 1, 2, . . .) which corresponds to the first point at infinity ($x\infty$) of the sequence of movement points, and which is the same point as the first point at infinity ($x\infty$) of the sequence of movement points.

10. A method according to claim 9, wherein the plurality of positions of the camera line up in the predetermined direction with arbitrary pitches, and wherein said step d for generating the sequence of reference points ($\tau^t$, t=0, 1, 2, . . .) comprises the substeps of:

(i) generating an auxiliary sequence of points ($T^t$, t=0, 1, 2, . . .) which line up with the same pitches as the arbitrary pitches on an arbitrary straight line (lT) parallel to another straight line passing through the projection center and the first point at infinity ($x\infty$) of the sequence of movement points, where the beginning point ($T^0$) of the auxiliary sequence of points ($T^t$, t=0, 1, 2, . . .) is the arbitrary position, and a step for projecting each point of the auxiliary sequence of points ($T^t$, t=0, 1, 2, . . .) onto the predetermined projection surface from the projection center.

11. A method according to claim 10, wherein the arbitrary position ($T^0$) is determined so that a straight line passing through the arbitrary position ($T^0$) and the projection center is perpendicular to the parallel arbitrary straight line (lT).

12. A method according to claim 10, wherein, in said step f), a distance r from an initial position of the camera to a point corresponding to the image element of said object is obtained by $$r = R^0 \cdot |\sin\alpha| / |\sin(\gamma - \alpha)|$$

where $R^0$ denotes a distance from the projection center to the beginning point ($T^0$) of the auxiliary sequence of points ($T^t$, t=0, 1, 2, . . .), $\gamma$ denotes an angle between a direction to the beginning point ($x^0$) of the sequence of movement points which corresponds to the initial position of the camera and a direction to the beginning point ($\tau^0$) of the sequence of reference points ($\tau^t$, t=0, 1, 2, . . .) at the projection center, and $\alpha$ denotes an angle between a direction to the first intersection point and a direction to the beginning point ($\tau^0$) of the sequence of reference points at the projection center.

13. A method according to claim 9, wherein said plurality of positions of the camera line up in the predetermined direction with an equal pitch ($\Delta X$), and wherein said step d) for generating said sequence of reference points ($\tau^t$, t=0, 1, 2, . . .) comprises the substeps of:

(i) generating an auxiliary sequence of points ($T^t$, t=0, 1, 2, . . .) which line up with the same pitch as the equal pitch ($\Delta X$) on an arbitrary straight line (lT) parallel to another straight line passing through the projection center and the first point at infinity ($x\infty$) of the sequence of movement points, where the beginning point ($T^0$) is the arbitrary position; and ii) projecting each point of the auxiliary sequence of points ($T^t$, t=0, 1, 2, . . .) onto the predetermined projection surface from the projection center.

14. A method according to claim 1, wherein the predetermined projection surface onto which the at least one image element is projected in the projection step is a plane.

15. A method according to claim 1, wherein the predetermined projection surface onto which the at least one image is projected in the projection step is a sphere, and the projection center is the center of the sphere.

16. A method according to claim 1, wherein the predetermined projection surface onto which the at least one image is projected in the projection step is a circular cylinder, and the projection center is a point on an axis of the circular cylinder.

17. A method for obtaining geometrical information on an object, comprising the steps of:

a) moving a camera in a predetermined direction with regard to an object subject to measurement; and b) taking a plurality of images of the object by the camera at a plurality of camera positions, respectively, by moving a camera in a predetermined direction;

c) extracting a plurality of contour images respectively from the plurality of images taken in said step b) by the camera, where each of the plurality of contour images contains at least one image element of the object;

d) projecting the at least one image element in each of the plurality of contour images of the object onto a projected point on a predetermined projection surface, for each of the at least one image element, from a predetermined projection center corresponding to a camera center, to obtain, for each of the at least one image element, a plurality of projected points on a predetermined projection surface as a sequence of movement points ($x^t$, t=0, 1, 2, . . .) which line up on a first intersection line at which the predetermined projection surface intersects with a first plane containing the predetermined projection center, and where the predetermined projection surface is one of a plane and a surface of the second order;

e) generating as a first sequence of reference points ($\tau^t$, t=0, 1, 2, . . .), a plurality of points which line up on a second intersection line of the predetermined projection surface and a second plane containing the projection center, so that the first sequence of reference points ($\tau^t$, t=0, 1, 2, . . .) and the sequence of movement points ($x^t$, t=0, 1, 2, . . .) share a point, and the sequence of reference points ($\tau^t$, t=0, 1, 2, . . .) is not identical with the sequence of movement points ($x^t$, t=0, 1, 2, . . .), and has the same cross ratio (inharmonic ratio) as a cross ratio of the sequence of movement points ($x^t$, t=0, 1, 2, . . .);

f) generating as a second sequence of reference points ($-\tau^t$, t=0, 1, 2, . . .), a plurality of points which line up on the second intersection line, so that the second sequence of reference points ($-\tau^t$, t=0, 1, 2, . . .) and the first sequence of reference points ($\tau^t$, t=0, 1, 2, . . .) share a beginning point ($\tau^0$), and the second sequence of reference points ($-\tau^t$) has the same cross ratio (inharmonic ratio) as the cross ratio of the first sequence of reference points ($\tau^t$, t=0, 1, 2, . . .);

g) obtaining a first intersection point of a plurality of third intersection lines at which a plurality of third planes respectively intersects the predetermined projection surface, the plurality of third planes each containing the projection center, one movement point in the sequence of movement points ($x^t$, t=0, 1, 2, . . .) and one reference point, corresponding to the movement point in the first sequence of reference points ($\tau^t$, t=0, 1, 2, . . .); and h) obtaining a second intersection point of a plurality of fourth intersection lines at which a plurality of fourth planes respectively intersects the predetermined projection surface, the plurality of fourth planes each containing the projection center, one movement point in the sequence of movement points ($x^t$, t=0, 1, 2, . . .) and one reference point, corresponding to the movement point in said second sequence of reference points ($-\tau^t$, t=0, 1, 2, . . .); and i) obtaining geometrical information on the object with respect to the camera position, based on the positions of the first and second intersection points to achieve environment recognition.

18. A method for measuring a position and an orientation of an object according to claim 17, wherein, in said step c), said sequence of movement points ($x^t$, t=0, 1, 2, . . .) is obtained by obtaining intersection points of the predetermined projection surface and straight lines passing through the projection center and being parallel to respective directions of shooting by the camera at the plurality of positions of the camera corresponding to the movement of the camera in the predetermined direction.

19. A method according to claim 17, wherein, in said step f) said geometrical information on the object comprises a distance from an initial position of the camera to a point corresponding to the image element of the object.

20. A method according to claim 17, wherein, in said step d), said sequence of movement points ($x^t$, t=0, 1, 2, . . .) and the sequence of reference points ($\tau^t$, t=0, 1, 2, . . .) share a common point as their beginning points ($x^0$ and $\tau^0$).

21. A method according to claim 20, wherein the plurality of positions of the camera line up in the predetermined direction with arbitrary pitches, wherein said first reference-point-sequence generating step d) for generating the first sequence of reference points ($\tau^t$, t=0, 1, 2, . . .) comprises the substeps of:

(i) generating a first auxiliary sequence of points ($T^t$, t=0, 1, 2, . . .) which line up with the same pitches as the arbitrary pitches on a straight line (IT) passing through an arbitrary position on another straight line passing through the projection center and the beginning point ($x^0$) of the sequence of movement points ($x^t$, t=0, 1, 2, . . .), where the beginning point ($T^0$) of the first auxiliary sequence of reference points ($T^t$, t=0, 1, 2, . . .) is the arbitrary point; and (ii) projecting each point of the first auxiliary sequence of points ($T^t$, t=0, 1, 2, . . .) onto the predetermined projection surface from the projection center, and wherein said second reference-point-sequence generating step e) for generating a second sequence of reference points ($-\tau^t$, t=0, 1, 2, . . .) comprises the substeps of:

(i) generating a second auxiliary sequence of points ($-T^t$, t=0, 1, 2, . . .) which line up in the direction opposite to the first sequence of reference points ($\tau^t$, t=0, 1, 2, . . .) with the same pitches as the arbitrary pitches on the straight line (IT) passing through the arbitrary position on the other straight line, where the beginning point ($T^0$) of the second auxiliary sequence of reference points ($-T^t$, t=0, 1, 2, . . .) is the arbitrary point; and (ii) projecting each point of the second auxiliary sequence of points ($-T^t$, t=0, 1, 2, . . .) onto the predetermined projection surface from the projection center.

22. A method according to claim 21, wherein the straight line (IT) passing through an arbitrary position on the other straight line passing through the projection center and the beginning point ($x^0$) of the sequence of movement points ($x^t$, t=0, 1, 2, . . .) is perpendicular to the straight line passing through the projection center and the beginning point ($x^0$) of the sequence of movement points ($x^t$, t=0, 1, 2, . . .).

23. A method according to claim 21, further comprising the steps of:

i) defining a first point at infinity ($x\infty$) of the sequence of movement points as an intersection point of the predetermined projection surface and a first straight line passing through the projection center and being parallel to a direction of shooting the object by the camera when the camera is moved to infinity in the predetermined direction;

j) defining a second point at infinity ($\tau^\infty$) of the first and second sequences of reference points ($\tau^t$ and $-\tau^t$, t=0, 1, 2, . . .) is defined as an intersection point of the predetermined projection surface and a straight line passing through the projection center and being parallel to the straight line (IT) passing through the arbitrary position on a second straight line passing through the projection center and the beginning point ($x^0$) of the sequence of movement points ($x^t$, t=0, 1, 2, . . .); and k) determining a third reference point on a fifth intersection line of the predetermined projection surface and a fifth plane containing the projection center and the first and second intersection points so that an angle $\gamma$ between a direction to the third reference point and the direction to the second point at infinity ($\tau^\infty$) of the first and second sequences of reference points ($\tau^t$ and $-\tau^t$, t=0, 1, 2, . . .) at the projection center on the predetermined projection surface, is defined as $$\gamma - \cot^{-1}((\cot\alpha + \cot\beta/2)$$

where $\alpha$ denotes an angle between a direction to the first intersection point and a direction to the second point at infinity ($\tau^\infty$) of the first and second sequences of reference points ($\tau^t$ and $-\tau^t$, t=0, 1, 2, . . .) at the projection center, $\beta$ denotes an angle between a direction to the second intersection point and the direction to the second point at infinity ($\tau^\infty$) of the first and second sequences of reference points ($\tau^t$ and $-\tau^t$, t=0, 1, 2, . . .) at the projection center;

in said geometrical information obtaining step h), a distance r from an initial position of the camera to a point, corresponding to the image element, of the object is obtained by $$r - R^0 \cdot |\sin(\gamma - \alpha)| / |\sin \alpha|,$$

where $R^0$ denotes a distance from the projection center to the beginning point ($T^0$) of the first auxiliary sequence of points ($T^t$, $t=0, 1, 2, \ldots$).

24. A method according to claim 23, further comprising the steps of:
   l) selecting a point of the contour image which is extracted from the image taken in the initial camera position of the plurality of camera positions, and
   wherein in said projection step c), the selected point of contour is regarded as the image element to be projected onto the predetermined projection surface; and
   m) obtaining a distance to a point on the object corresponding to the point of the contour image selected in the point selecting step in said geometrical information obtaining step f), assuming that a direction of the point at infinity of the sequence of movement points is equal to a known direction (v) of the movement of the camera.

25. A method according to claim 24, further comprising the steps of:
   n) determining a direction to the third reference point by executing said geometrical information obtaining step h), wherein the image element is the selected point of the contour image; and
   o) comparing the direction of the third reference point with the direction of the movement of the camera which is known in advance.

26. A method according to claim 23, further comprising the steps of:
   l) selecting a plurality of points of the contour image which is extracted from the image taken in the initial camera position of the plurality of camera positions; and
   m) determining the direction to the third reference point for each of the plurality of points of the contour image, to obtain a plurality of third reference points, by executing said step f), where each of the plurality of selected points of contour is regarded as the image element; and
   n) obtaining the direction of the movement of the camera by obtaining an average of the determined directions to the plurality of third reference points.

27. A method according to claim 23, further comprising before execution of said first reference-point-sequence generating step d):
   o) extracting a contour line segment (l) from each contour image extracted in said contour image extracting step b); and
   wherein in said projection step c), an intersection point of the predetermined projection surface and a normal line, passing through the projection center of a sixth plane containing the projection center and the contour line segment (l), is obtained as a projected point (s) of each contour line segment for each of a plurality of images, said projection step c) comprising the substep of:
   (i) selecting a beginning point ($s^0$) of a sequence of movement points ($s^t$, $t=0, 1, 2, \ldots$, t is a frame number), where the projected points (s) which are obtained from the plurality of images, are regarded as the points of the sequence of movement points ($x^t$, $t=0, 1, 2, \ldots$);

wherein in said geometrical information obtaining step f) the beginning point ($s^0$) of the sequence of movement points is made to be the same as the beginning point of the first and second sequence of reference points;

wherein said geometrical information obtaining step f) comprising the substeps of:
   i) obtaining a third intersection point (Ss) of the predetermined projection surface and a normal line, passing through the projection center, of a seventh plane containing a trace of the sequence of movement points ($s^t$, $t=0, 1, 2, \ldots$); and
   ii) obtaining an orientation ($_s h^0$) of a perpendicular line which is dropped from the initial position of the camera to a portion of the object, by obtaining an exterior product of a first vector being directed to the beginning point ($s^0$), and a second vector being directed to the third intersection point (Ss) of the predetermined projection surface and the normal line, passing through the projection center of the seventh plane containing the trace of the sequence of movement points.

28. A method according to claim 23, further comprising before execution of said geometrical information obtaining step f) the steps of:
   i) extracting a contour line segment (l) from each of the contour image extracted in said contour image extracting step b); and
   wherein in said projection step c), an intersection point of the predetermined projection surface and a normal line, passing through the projection center of a sixth plane containing the projection center and the contour line segment (l), is obtained as a projected point (s) of each contour line segment for each of a plurality of images, where the projected points (s) obtained from the plurality of images are regarded as the points of the sequence of movement points, said projection step c) comprising the substep of:
   i) selecting a beginning point ($s^0$) of a sequence of movement points ($s^t$, $t=0, 1, 2, \ldots$, t is a frame number), where the projected points (s) which are obtained from the plurality of images are regarded as the points of the sequence of movement points ($x^t$, $t=0, 1, 2, \ldots$);
   wherein in said geometrical information obtaining step h) said beginning point ($s^0$) of the sequence of movement points is made to be the same as the beginning point of the first and second sequence of reference points, said geometrical information obtaining step h) comprising the substeps of:
   (i) obtaining a third intersection point (Ss) of the predetermined projection surface and a normal line passing through the projection center of a seventh plane containing a trace of said sequence of movement points ($s^t$, $t=0, 1, 2, \ldots$); and
   (ii) obtaining a distance h from the initial camera position to a foot of a perpendicular line which is dropped to a portion of the object corresponding to the contour line segment which is subject to the measurement, by equations $h = r \cdot \sin \pi$, $\pi = \cos^{-1}(v \cdot Ss)$ using the distance r, where v denotes a first vector being directed in a known direction of the movement of the camera, Ss denotes a second vector being directed to the third intersection point (Ss) and (v·Ss) denotes an inner product of the first and second vectors.

29. A method according to claim 28, further comprising a step for confirming that a relative angle between the direction of said third reference point (c) and the direction of the movement of the camera, which is known in advance, is equal to 90 degrees.

30. A method according to claim 23, further comprising the step of:
l) selecting a plurality of contour line segments which are subject to the measurement from the image which is obtained in an initial camera position;
wherein in said projection step c), the plurality of selected contour line segments are each regarded as one of the at least one image element to be projected onto the predetermined projection surface, and the sequence of movement points is obtained for each of the plurality of selected contour line segments to produce a plurality of sequences of movement points; and
wherein said geometrical information obtaining step h) comprises:
(i) obtaining a third intersection point (Ss) of the predetermined projection surface and a normal line passing through the projection center of a sixth plane containing a trace of each of the plurality of sequences of movement points ($s^t$, t=0, 1, 2, ...) to produce a plurality of third intersection points (Ss); and
(ii) determining a direction of the movement of the camera as a direction of a fourth intersection point of a plurality of sixth intersection lines at which the predetermined projection surface intersect with a plurality of seventh planes respectively perpendicular to directions to the determined plurality of reference points (c).

31. A method according to claim 21, further comprising the steps of:
i) defining a first point at infinity ($x^\infty$) of the sequence of movement points as an intersection point of the predetermined projection surface and a first straight line passing through the projection center and being parallel to a direction of shooting the object by the camera when the camera is moved to infinity in the predetermined direction;
j) defining a second point at infinity ($\tau^\infty$) of the first and second sequences of reference points ($\tau^t$ and $-\tau^t$, t=0, 1, 2, ...) as an intersection point of the predetermined projection surface and a straight line passing through the projection center and being parallel to the straight line (lT) passing through the arbitrary position on a second straight line passing through the projection center and the beginning point ($x^0$) of the sequence of movement points ($x^t$, t=0, 1, 2, ...); and
k) determining a third reference point on a fifth intersection line of the predetermined projection surface and a fifth plane containing the projection center and the first and second intersection points so that an angle $\gamma$ between a direction to the third reference point and the direction to the second point at infinity ($\tau^\infty$) of the first and second sequences of reference points ($\tau^t$ and $-\tau^t$, t=0, 1, 2, ...) at the projection center on the predetermined projection surface, is defined as $$\gamma = \cot^{-1}((\cot\alpha + \cot\beta)/2)$$

where $\alpha$ denotes an angle between a direction to the first intersection point and a direction to the second point at infinity ($\tau^\infty$) of the first and second sequences of reference points ($\tau^t$ and $-\tau^t$, t=0, 1, 2, ...) at the projection center, $\beta$ denotes an angle between a direction to the second intersection point and the direction to the second point at infinity ($\tau^\infty$) of the first and second sequences of reference points ($\tau^t$ and $-\tau^t$, t=0, 1, 2, ...) at the projection center; and wherein
in said step h), a distance r from an initial position of the camera to a point, corresponding to the image element of the object is obtained by $$r = R^0 \cdot |\sin(\gamma - \alpha)|/|\sin\alpha|,$$

where $R^0$ denotes a distance from the projection center to the beginning point ($T^0$) of the first auxiliary sequence of points ($T^t$, t=0, 1, 2, ...).

32. A method according to claim 20, wherein the plurality of positions of the camera line up in the predetermined direction with an equal pitch ($\Delta X$),
wherein said first reference-point-sequence generating step d) for generating the first sequence of reference points ($\tau^t$, t=0, 1, 2, ...) comprises the substeps of:
i) generating a first auxiliary sequence of points ($T^t$, t=0, 1, 2, ...) which line up with the same pitch as the equal pitch ($\Delta X$) on a straight line (lT) passing through an arbitrary position on another straight line passing through the projection center and the beginning point ($x^0$) of the sequence of movement points ($x^t$, t=0, 1, 2, ...), where the beginning point ($T^0$) of the first auxiliary sequence of reference points ($T^t$, t=0, 1, 2, ...) is the arbitrary point; and
(ii) projecting each point of the first auxiliary sequence of points ($T^t$ t=0, 1, 2, ...) onto the predetermined projection surface from the projection center; and
wherein said second reference-point-sequence generating step e) for generating the second sequence of reference points ($-\tau^t$, t=0, 1, 2, ...) comprises the substeps of:
(i) generating a second auxiliary sequence of points ($-T^t$, t=0, 1, 2, ...) which line up in the direction opposite to the first sequence of reference points ($\tau^t$, t=0, 1, 2, ...) with the same pitch as the equal pitch ($\Delta X$) on the straight line (lT) passing through the arbitrary position on the other straight line, where the beginning point ($T^0$) of the second auxiliary sequence of reference points ($-T^t$, t=0, 1, 2, ...) is the arbitrary point; and
(ii) projecting each point of the second auxiliary sequence of points ($-T^t$, t=0, 1, 2, ...) onto the predetermined projection surface from the projection center.

33. A method according to claim 17, further comprising the steps of:
i) defining a first point at infinity ($x^\infty$) of the sequence of movement points as an intersection point of the predetermined projection surface and a first straight line passing through the projection center and being parallel to a direction of shooting the object by the camera when the camera is moved to infinity in the predetermined direction; and
j) defining a second point at infinity ($\tau^\infty$) of the first and second sequences of reference points ($\tau^t$ and $-\tau^t$, t=0, 1, 2, ...) corresponding to the point at infinity (x∞) of the sequence of movement points, is the same point as the point at infinity (x∞) of the sequence of movement points.

34. A method according to claim 33, wherein the plurality of positions of the camera line up in the predetermined direction with arbitrary pitches, wherein said first reference-point-sequence generating step d) for generating the first sequence of reference points ($\tau^t$, t=0, 1, 2, . . .) comprises the substeps of:

(i) generating a first auxiliary sequence of points ($T^t$, t=0, 1, 2, . . .) which line up with the same pitches as the arbitrary pitches on a second straight line (lT) parallel to a third straight line passing through the projection center and the first point at infinity (x∞) of the sequence of movement points, where the beginning point ($T^0$) of the first auxiliary sequence of reference points ($T^t$, t=0, 1, 2, . . .) is an arbitrary point on the second straight line (lT); and (ii) projecting each point of the first auxiliary sequence of points ($T^t$, t=0, 1, 2, . . .) onto the predetermined projection surface from the projection center, and wherein said second reference-point-sequence generating step e) for generating the second sequence of reference points ($-\tau^t$, t=0, 1, 2, . . .) comprises the substeps of:

(i) generating a second auxiliary sequence of points ($-T^t$, t=0, 1, 2, . . .) which line up in the opposite direction with the same pitches as the arbitrary pitches on the second straight line (lT) parallel to the third straight line passing through the projection center and the first point at infinity (x∞) of the sequence of movement points, where the beginning point ($T^0$) of the second auxiliary sequence of reference points ($-T^t$, t=0, 1, 2 . . .) is the arbitrary point on the second straight line (lT); and (ii) projecting each point of the second auxiliary sequence of points ($-T^t$, t=0, 1, 2, . . .) onto the predetermined projection surface from the projection center.

35. A method according to claim 34, wherein the beginning point ($T^0$) is determined so that the third straight line passing through the beginning point ($T^0$) and the projection center, is perpendicular to the second straight line (lT).

36. A method according to claim 34, further comprising the step of:

i) determining a third reference point on a fifth intersection line of the predetermined projection surface and a fifth plane containing the projection center and the first and second intersection points so that an angle $\gamma$ between a direction to the beginning point ($x^0$) of the sequence of reference points ($x^t$, t=0, 1, 2, . . .) and the direction to the beginning point ($\tau^0$) of the first and second sequences of reference points ($\tau^t$ and $-\tau^t$, t=0, 1, 2, . . .) at the projection center on the predetermined projection surface is defined as $$\gamma = \cot^{-1}((\cot\alpha + \cot\beta)/2);$$

where $\alpha$ denotes an angle between a direction to the first intersection point and a direction to the beginning point ($\tau^0$) of the first and second sequences of reference points ($\tau^t$ and $-\tau^t$, t=0, 1, 2, . . .) at the projection center, $\beta$ denotes an angle between a direction to the second intersection point and the direction to the beginning point ($\tau^0$) of the first and second sequences of reference points ($\tau^t$ and $-\tau^t$, t=0, 1, 2, . . .) at the projection center;

wherein in said geometrical information obtaining step h), a distance r from an initial position of the camera to a point corresponding to the image element of the object which is subject to the measurement is obtained by $$r = R^0 \cdot |\sin\beta| / |\sin(\gamma-\beta)|,$$

where $R^0$ denotes a distance from the projection center to the beginning point ($T^0$) of the auxiliary sequence of points ($T^t$, t=0, 1, 2, . . .).

37. A method according to claim 36, wherein in said projection step c), more than one point of the contour image extracted in the contour extracting step being regarded as the image element, and being projected onto the predetermined projection surface; and wherein in said geometrical information obtaining step h), a distance to more than one point on the object corresponding to more than one point of the contour image is obtained assuming that a direction of the point at infinity of the sequence of movement points is equal to a known direction (v) of the movement of the camera.

38. A method according to claim 36, further comprising before execution of said step f) the steps of:

i) extracting a contour line segment (l) from each contour image extracted in the contour image extracting step;

wherein in said projection step c), an intersection point of the predetermined projection surface and a normal line, passing through the projection center, of a fifth plane containing the projection center and the contour line segment (l), is obtained as a projected point (s) of each contour line segment for each of a plurality of images, where the projected points (s) obtained from the plurality of images, are regarded as the points of the sequence of movement points and further comprising the substep of:

(i) selecting one movement point of the sequence of movement points as the first point at infinity (s∞) of the sequence of movement points ($s^t$, t=0, 1, 2, . . ., t is a frame number), where the projected points (s) which are obtained from the plurality of images are regarded as the points of the sequence of movement points ($x^t$, t=0, 1, 2, . . .); and wherein in said geometrical information obtaining step h) said first point at infinity (s∞) of the sequence of movement points is made to be the same as the point at infinity of the first and second sequence of reference points, said geometrical information obtaining step comprising the substeps of:

(i) obtaining a third intersection point (Ss) of the predetermined projection surface and a normal line, passing through the projection center, of a sixth plane containing a trace of the sequence of movement points ($s^t$, t=0, 1, 2, . . .);

(ii) a distance obtaining step for obtaining a distance h from the initial camera position to a foot of a perpendicular line which is dropped to a portion of the object corresponding to the contour line segment which is subject to the measurement, by equations h=r·sin $\pi$, and $\pi = \cos^{-1}(v \cdot Ss)$ using the distance r, where v denotes a first vector being directed in a direction of the movement of the camera, Ss denotes a second vector being directed to the third intersection point (Ss), and (v·Ss) denotes an inner product of the first and second vectors.

39. A method according to claim 36, further comprising before execution of said first reference-point-sequence generating step d) the substep of:
  (i) extracting a contour line segment (l) [(l)] from each of the contour image extracted in the contour image extracting step; and
 wherein in said projection step c), an intersection point of the predetermined projection surface and a normal line, passing through the projection center of a fifth plane containing the projection center and the contour line segment (l), is obtained as a projected point (s) of each contour line segment for each of a plurality of images, said projection step c) comprising the substep of:
  (i) selecting one movement point of the sequence of movement points as the first point at infinity ($s^\infty$) of the sequence of movement points ($s^t$, t=0, 1, 2, ..., t is a frame number), where the projected points (s) which are obtained from the plurality of images, are regarded as the points of the sequence of movement points ($x^t$, t=0, 1, 2, ...); and
 wherein in said geometrical information obtaining step h) said first point at infinity ($s^\infty$) of the sequence of movement points is made to be the same as the second point at infinity of the first and second sequence of reference points, said geometrical information obtaining step comprising the substeps of:
  (i) obtaining a third intersection point (Ss) of the predetermined projection surface and a normal line, passing through the projection center of a sixth plane containing a trace of the sequence of movement points ($s^t$, t=0, 1, 2, ...); and
  (ii) an orientation obtaining step for obtaining an orientation ($Sh^0$) of a perpendicular line which is dropped from the initial position of the camera to a portion of the object, by obtaining an exterior product of a first vector being directed to the third reference point ($c = s^0$), and a second vector being directed to the third intersection point (Ss) of the predetermined projection surface and the normal line, passing through the projection center of the sixth plane containing the trace of the sequence of movement points.

40. A method according to claim 34, further comprising the step of:
 i) determining a third reference point on a fifth intersection line of the predetermined projection surface and a fifth plane containing the projection center and the first and second intersection points so that an angle $\gamma$ between a direction to the beginning point ($x^0$) of the sequence of reference points ($x^t$, t=0, 1, 2, ...) and the direction to the beginning point ($\tau^0$) of the first and second sequences of reference points ($\tau^t$ and $-\tau^t$, t=0, 1, 2, ...) at the projection center on the predetermined projection surface is defined as $$\gamma = \cot^{-1}((\cot\alpha + \cot\beta)/2),$$

where $\alpha$ denotes an angle between a direction to the first intersection point and a direction to the beginning point ($\tau^0$) of the first and second sequences of reference points ($\tau^t$ and $-\tau^t$, t=0, 1, 2, ...) at the projection center, and $\beta$ denotes an angle between a direction to the second intersection point and the direction to the beginning point ($\tau^0$) of the first and second sequences of reference points ($\tau^t$ and $-\tau^t$, t=0, 1, 2, ...) at the projection center; and wherein in said step h), a distance r from an initial position of the camera to a point, corresponding to the image element of the object which is subject to the measurement is obtained by $$r = R^0 \cdot |\sin\alpha| / |\sin(\gamma - \alpha)|,$$

where $R^0$ denotes a distance from the projection center to the beginning point ($T^0$) of the auxiliary sequence of points ($T^t$, t=0, 1, 2, ...).

41. A method according to claim 33, wherein the plurality of positions of the camera line up in the predetermined direction with an equal pitch ($\Delta X$);
 wherein said first reference-point sequence generating step d) comprises the substeps of:
  (i) generating a first auxiliary sequence of points ($T^t$, t=0, 1, 2, ...) which line up with the same pitch as the equal pitch ($\Delta X$) on a second straight line (lT) parallel to a third straight line passing through the projection center and the first point at infinity ($x^\infty$) of the sequence of movement points, where the beginning point ($T^0$) of the second auxiliary sequence of reference points ($T^t$, t=0, 1, 2, ...) is an arbitrary point on the second straight line (lT);
  (ii) projecting each point of the first auxiliary sequence of points ($T^t$, t=0, 1, 2, ...) onto the predetermined projection surface from the projection center; and
 wherein said second reference-point sequence generating step e) includes a step for generating a second auxiliary sequence of points ($-T^t$, t=0, 1, 2, ...) which line up in the opposite direction with the same pitch as the equal pitch ($\Delta X$) on the second straight line (lT) parallel to the third other straight line passing through the projection center and the first point at infinity ($x^\infty$) of the sequence of movement points, where the beginning point ($T^0$) of the first auxiliary sequence of reference points (($T^t$, t=0, 1, 2, ...) is the arbitrary point on the second straight line (lT); and
  (iii) projecting each point of the second auxiliary sequence of points ($-T^t$, t=0, 1, 2, ...) onto the predetermined projection surface from the projection center.

42. A method according to claim 17, wherein the predetermined projection surface is a plane.

43. A method according to claim 17, wherein the predetermined projection surface is a sphere, and said projection center is the center of the sphere.

44. A method according to claim 17, wherein the predetermined projection surface is a circular cylinder, and the projection center is a point on an axis of the circular cylinder.

45. A method for obtaining geometrical information on an object, comprising the steps of:
 a) moving a camera in a predetermined direction with regard to an object subject to measurement; and
 b) taking a plurality of images of the object by the camera at a plurality of camera positions, respectively, by moving a camera in a predetermined direction;

c) extracting a plurality of contour images respectively from the plurality of images taken in said step b) by the camera, where each of the plurality of contour images contains at least one image element of the object;

d) projecting at least one image element in each of the plurality of contour images of the object onto a projected point on a predetermined projection surface, for each of the at least one image element, from a predetermined projection center corresponding to a camera center, to obtain, for each of the at least one image element, a plurality of projected points on a predetermined projection surface as a sequence of movement points ($x^t$, t=0, 1, 2, . . .) which line up on a first intersection line at which the predetermined projection surface intersects a first plane containing the predetermined projection center, where the predetermined projection surface is one of a plane and a surface of the second order;

e) obtaining, as a reference point for plane projection, a first intersection point of the predetermined projection surface and a straight line which passes through the projection center and is perpendicular to an arbitrary projection plane which contains the projection center;

f) obtaining a sequence of projected movement points ($x'^t$, t=0, 1, 2, . . .), comprising the substeps of:
  (i) obtaining a plurality of second planes each containing the projection center, the reference point for plane projection, and one movement point of the sequence of movement points ($x^t$, t=0, 1, 2, . . .);
  (ii) obtaining a plurality of second intersection lines at which the plurality of second planes respectively intersect the predetermined projection surface; and
  (iii) obtaining, as the sequence of projected movement points ($x'^t$, t=0, 1, 2, . . .), a plurality of second intersection points at which the plurality of second intersection lines respectively intersect the predetermined projection surface;

g) generating, as a sequence of reference points ($\tau^t$, t=0, 1, 2, . . .), a plurality of points which line up on a third intersection line of the predetermined projection surface and a third plane containing the projection center, so that the sequence of reference points ($\tau^t$, t=0, 1, 2, . . .) and the sequence of projected movement points ($x'^t$, t=0, 1, 2, . . .) share a point, and the sequence of reference points ($\tau^t$, t=0, 1, 2, . . .) is not identical with either of the sequence of movement points ($x^t$, t=0, 1, 2, . . .) and the sequence of projected movement points ($x'^t$, t=0, 1, 2, . . .), and has the same cross ratio (inharmonic ratio) as a cross ratio of the sequence of projected movement points ($x^t$, t=0, 1, 2, . . .);

h) obtaining a third intersection point of a plurality of third intersection lines at which a plurality of fourth planes respectively intersects the predetermined projection surface, the plurality of fourth planes each containing the projection center, one projected movement point in the sequence of projected movement points ($x'^t$, t=0, 1, 2, . . .) and one reference point corresponding to the projected movement point in the sequence of reference points ($\tau^t$, t=0, 1, 2, . . .); and i) obtaining geometrical information which receives the third intersection point, on the object with respect to the camera position, based on the position of the third intersection point to achieve environment recognition.

46. A method according to claim 45, wherein, in said step c) the sequence of movement points ($x^t$, t=0, 1, 2, . . .) is obtained as a plurality of intersection points at which a plurality of straight lines intersects with the predetermined projection surface, and the straight lines passing through the projection center and being parallel to respective directions of shooting by the camera at the plurality of camera positions.

47. A method according to claim 45, wherein, in said step h) the geometrical information on the object comprises a distance from an initial position of the camera to a plane projected point, where the plane projected point is obtained by projecting a point, corresponding to the image element, of the object, onto the projection plane.

48. A method according to claim 45, wherein, in said step d), the sequence of projected movement points ($x'^t$, t=0, 1, 2, . . .) and the sequence of reference points ($\tau^t$, t=0, 1, 2, . . .) share a common point as their beginning points ($x'^0$ and $\tau^0$).

49. A method according to claim 48, wherein the plurality of positions of the camera line up in the predetermined direction with arbitrary pitches, and said step e) for generating the sequence of reference points ($\tau^t$, t=0, 1, 2, . . .) comprises the substeps of:
  (i) generating an auxiliary sequence of points ($T^t$, t=0, 1, 2, . . .) which line up with the same pitches as the arbitrary pitches on a first straight line (lT) passing through an arbitrary position on a second straight line passing through the projection center and the beginning point ($x'^0$) of the sequence of projected movement points ($x'^t$, t=0, 1, 2, . . .), where the beginning point ($T^0$) of the auxiliary sequence of reference points ($T^t$, t=0, 1, 2, . . .) is the arbitrary point; and
  (ii) projecting each point of the auxiliary sequence of points ($T^t$, t=0, 1, 2, . . .) onto the predetermined projection surface from the projection center.

50. A method according to claim 49, wherein the first straight line (lT) passing through the arbitrary position on the second straight line passing through the projection center and the beginning point ($x'^0$) of the sequence of projected movement points ($x'^t$, t=0, 1, 2, . . .) is perpendicular to the second straight line passing through the projection center and the beginning point ($\tau^0$) of the sequence of reference points ($\tau^t$, t=0, 1, 2, . . .).

51. A method according to claim 49, further comprising the steps of:
  i) defining a first point at infinity ($x'^\infty$) of the sequence of projected movement points as an intersection point of the predetermined projection surface and a first straight line passing through the projection center and being parallel to a direction of shooting the object by the camera when the camera is moved to infinity in the predetermined direction; and
  j) defining a second point at infinity ($\tau^\infty$) of the sequence of reference points ($\tau^t$, t=0, 1, 2, . . .) as an intersection point of the predetermined projection surface and a second straight line passing through the projection center and being parallel to the straight line (lT) passing through the arbitrary position on the other straight line passing through the projection center and the beginning point ($x'^0$) of the sequence of projected movement points ($x'^t$, t=0, 1, 2, . . .);

and wherein in said step h), a distance r from an initial position of the camera to a plane projected point is obtained by $$r = R^0 \cdot |\sin(\gamma - \alpha)| / |\sin\alpha|,$$

where the plane projected point is obtained by projecting a point, corresponding to the image element of the object, onto the projection plane, $R^0$ denotes a distance from the projection center to the beginning point ($T^0$) of the auxiliary sequence of points ($T^t$, t=0, 1, 2, . . .), $\gamma$ denotes an angle between a direction to the first point at infinity ($x'^\infty$) of the sequence of projected movement points and a direction to the second point at infinity ($\tau^\infty$) of the sequence of reference points ($\tau^t$, t=0, 1, 2, . . .) at the projection center, and $\alpha$ denotes an angle between a direction to the first intersection point and a direction to the point at infinity ($\tau^\infty$) of the sequence of reference points ($\tau^t$, t=0, 1, 2, . . .) at the projection center.

52. A method according to claim 48, wherein the plurality of positions of the camera line up in the predetermined direction with an equal pitch ($\Delta X$);
    wherein the sequence of reference points ($\tau^t$, t=0, 1, 2, . . .) is generated comprising the steps of:
    i) generating an auxiliary sequence of points ($T^t$, t=0, 1, 2, . . .) which line up with the same pitch as the equal pitch ($\Delta X$) on a first straight line (IT) passing through an arbitrary position on a second straight line passing through the projection center and the beginning point ($x'^0$) of the sequence of projected movement points ($x'^t$, t=0, 1, 2, . . .), where the beginning point ($T^0$) of the auxiliary sequence of reference points ($T^t$, t=0, 1, 2, . . .) is the arbitrary point; and
    j) projecting each point of the auxiliary sequence of points ($T^t$, t=0, 1, 2, . . .) onto the predetermined projection surface from the projection center.

53. A method according to claim 45, further comprising the steps of:
    i) defining a first point at infinity ($x'^\infty$) of the sequence of projected movement points as an intersection point of the predetermined projection surface and a straight line passing through the projection center and being parallel to a direction of shooting the object by the camera when the camera is moved to infinity in the predetermined direction; and
    j) defining a second point at infinity ($\tau^\infty$) of the sequence of reference points ($\tau^t$, t=0, 1, 2, . . .) which corresponds to the first point at infinity ($x'^\infty$) of the sequence of projected movement points, and which is the same point as the first point at infinity ($x'^\infty$) of the sequence of projected movement points.

54. A method according to claim 53, wherein the plurality of positions of the camera line up in the predetermined direction with arbitrary pitches, and
    wherein said step f) for generating said sequence of reference points ($\tau^t$, t=0, 1, 2, . . .) comprises the substeps of:
    (i) generating an auxiliary sequence of points ($T^t$, t=0, 1, 2, . . .) which line up with the same pitches as the arbitrary pitches on an arbitrary straight line (IT) parallel to another straight line passing through the projection center and the first point at infinity ($x'^\infty$) of the sequence of projected movement points, where the beginning point ($T^0$) of the auxiliary sequence of points ($T^t$, t=0, 1, 2, . . .) is the arbitrary position; and
    (ii) projecting each point of the auxiliary sequence of points ($T^t$, t=0, 1, 2, . . .) onto the predetermined projection surface from the projection center.

55. A method according to claim 54, wherein the arbitrary position ($T^0$) is determined so that a straight line passing through the arbitrary position ($T^0$) and the projection center is perpendicular to the parallel arbitrary straight line (IT).

56. A method according to claim 54, wherein, in said step h), a distance r from an initial position of the camera to a plane projected point is obtained by $$r = R^0 \cdot |\sin\alpha| / |\sin(\gamma - \alpha)|,$$

where the plane projected point is obtained by projecting a point, corresponding to the image element, of the object, onto the projection plane, $R^0$ denotes a distance from the projection center to the beginning point ($T^0$) of the auxiliary sequence of points ($T^t$, t=0, 1, 2, . . .), $\gamma$ denotes an angle between a direction to the beginning point ($x'^0$) of the sequence of projected movement points which corresponds to the initial position of the camera and a direction to the beginning point ($\tau^0$) of the sequence of reference points ($\tau^t$, t=0, 1, 2, . . .) at the projection center, and $\alpha$ denotes an angle between a direction to the third intersection point and a direction to the beginning point ($\tau^0$) of the sequence of reference points at the projection center.

57. A method according to claim 56, further comprising the steps of:
    i) selecting a point of the contour image which is extracted from the image taken in the initial camera position of the plurality of camera positions, and in said projection step c), the selected point of contour is regarded as the image element to be projected onto the predetermined projection surface; and
    wherein in said geometrical information obtaining step c), a distance to a point on the object corresponding to the point of the contour image selected in the point selecting step is obtained determining a fourth reference point (w) for plane projection, and assuming that a direction of the point at infinity of the sequence of projected movement points is equal to a known direction (v) of the movement of the camera.

58. A method according to claim 56, further comprising the steps of:
    i) extracting a contour line segment (l) from each of the contour images extracted in said step b); and
    wherein in said projection step c), a fourth intersection point of the predetermined projection surface and a normal line, passing through the projection center of a sixth plane containing the projection center and the contour line segment (l), is obtained as a projected point (s) of each contour line segment for each of a plurality of images, where the projected points (s) obtained from the plurality of images are regarded as the points of the sequence of movement points;

wherein said step h) further comprises the substeps of:
   (i) determining the fourth reference point (w) for plane projection in a direction perpendicular to a known direction of the movement of the camera regarding the projection center; and
   (ii) obtaining the point at infinity of the sequence of projected movement points by an exterior product of a first vector directed in the known direction (v) of the camera and a second vector directed to the fourth reference point (w) for plane projection, the first point at infinity (s'∞) of the sequence of projected movement points is regarded to be the same as the second point-at-infinity of the first and second sequence of reference points, and the distance from the initial camera position to a fifth intersection point at which a line segment, corresponding to the contour line segment on the object or a straight line containing the line segment, intersects with the predetermined projection plane in the three-dimensional space, is obtained by the distance r.

59. A method according to claim 58, further comprising, in said step h), after executing the operation of obtaining the point at infinity (s∞) of a sequence of movement points ($s^t$, t=0, 1, 2, ..., t is a frame number), the substep of:
   i) rotating the beginning point of the sequence of projected movement points by 90 degrees around the direction of the fourth reference point (w) for plane projection, to obtain a direction from the initial camera position to the fifth intersection point of the line segment and the predetermined projection plane.

60. A method according to claim 59, further comprising the steps of:
   i) executing the operations of said geometrical information obtaining step h) for a plurality of fourth reference points (w) for plane projection which are perpendicular to the known direction of the movement of the camera, to obtaining the distance r and direction to the line segment or the straight line containing the line segment on the object for each of the plurality of the fourth reference points (w) for plane projection; and
   j) determining positions and orientations of the line segment on the object in the three-dimensional space based on the distances r and the directions of the intersection points of the line segment and the predetermined projection plane, where the intersection points are obtained in the plural projection plane step for the plurality of fourth reference points (w) for plane projection.

61. A method according to claim 53, wherein the plurality of positions of the camera line up in the predetermined direction with an equal pitch (ΔX), and
   wherein said step f) for generating the sequence of reference points ($\tau^t$, t=0, 1, 2, ...) comprises the substeps of:
   (i) generating an auxiliary sequence of points ($T^t$, t=0, 1, 2, ...) which line up with the same pitch as the equal pitch (ΔX) on an arbitrary straight line (IT) parallel to another straight line passing through the projection center and the first point at infinity (x'∞) of the sequence of projected movement points, where the beginning point ($T^0$) is the arbitrary position; and
   (iii) projecting each point of the auxiliary sequence of points (Tt, t=0, 1, 2, ...) onto the predetermined projection surface from the projection center.

62. A method according to claim 45, wherein the predetermined projection surface is a plane.

63. A method according to claim 45, wherein the predetermined projection surface is a sphere, and the projection center is the center of the sphere.

64. A method according to claim 45, wherein the predetermined plane or surface of the second class is a circular cylinder, and the projection center is a point on an axis of the circular cylinder.

65. An apparatus comprising:
   a camera, for taking a plurality of images of an object which is subject to measurement, at a plurality of camera positions, respectively, by moving said camera in a predetermined direction; and
   data processing means for processing image data which is taken by said camera, said data processing means comprising:
      a contour image extracting circuit, operatively connected to said camera, for extracting a plurality of contour images respectively from said plurality of images taken by said camera, where each of said plurality of contour images contains at least one image element of said object;
      a projection circuit, operatively connected to said contour image extracting circuit, for projecting said at least one image element in each of said plurality of contour images of said object onto a projected point on a predetermined projection surface, for each of said at least one image element, from a predetermined projection center corresponding to a camera center, to obtain, for each of said at least one image element, a plurality of projected points on a predetermined projection surface as a sequence of movement points ($x^t$, t=0, 1, 2, ...) which line up on a first intersection line at which said predetermined projection surface intersects with a first plane containing said predetermined projection center, said predetermined projection surface is one of a plane and a surface of the second order;
      a reference-point-sequence generating circuit for generating, as a sequence of reference points ($\tau^t$, t=0, 1, 2, ...), a plurality of points which line up on a second intersection line of said predetermined projection surface and a second plane containing said projection center, so that said sequence of reference points ($\tau^t$, t=0, 1, 2, ...) and said sequence of movement points ($x^t$, t=0, 1, 2, ...) share a point, and said sequence of reference points ($\tau^t$, t=0, 1, 2, ...) is not identical with said sequence of movement points ($x^t$, t=0, 1, 2, ...), and has the same cross ratio (inharmonic ratio) as a cross ratio of said sequence of movement points ($x^t$, t=0, 1, 2, ...);
      an intersection-point obtaining circuit for obtaining a first intersection point of a plurality of third intersection lines at which a plurality of third planes respectively intersecting the predetermined projection surface, said plurality of third planes each containing said projection center, one movement point in said sequence of movement points ($x^t$, t=0, 1, 2, ...), and one reference point, corresponding to the movement point, in said sequence of reference points ($\tau^t$, t=0, 1, 2, . . .); and a geometrical information obtaining circuit, operatively connected to said intersection-point-obtaining circuit, for obtaining geometrical information on said object with respect to said camera position, based on the position of said first intersection point.

66. An apparatus comprising:

a camera, for taking a plurality of images of an object which is subject to the measurement, at a plurality of camera positions, respectively, by moving said camera in a predetermined direction; and data processing means for processing image data which is taken by said camera, said data processing means comprising:

a contour image extracting circuit, operatively connected to said camera, for extracting a plurality of contour images respectively from said plurality of images taken by said camera, where each of said plurality of contour images contains at least one image element of said object;

projection means for projecting said at least one image element in each of said plurality of contour images of said object onto a projected point on a predetermined projection surface, for each of said at least one image element, from a predetermined projection center corresponding to a camera center, to obtain, for each of said at least one image element, a plurality of projected points on a predetermined projection surface as a sequence of movement points ($x^t$, t=0, 1, 2, . . .) which line up on a first intersection line at which said predetermined projection surface intersects with a first plane containing said predetermined projection center, where said predetermined projection surface is one of a plane and a surface of the second order;

a first reference-point-sequence generating circuit for generating, as a first sequence of reference points ($\tau^t$, t=0, 1, 2, . . .), a plurality of points which line up on a second intersection line of said predetermined projection surface and a second plane containing said projection center, so that said first sequence of reference points ($\tau^t$, t=0, 1, 2, . . .) and said sequence of movement points ($x^t$, t=0, 1, 2, . . .) share a point, and said sequence of reference points ($\tau^t$, t=0, 1, 2, . . .) is not identical to the sequence of movement points ($x^t$, t=0, 1, 2, . . .), and has the same cross ratio (inharmonic ratio) as a cross ratio of said sequence of movement points ($x^t$, t=0, 1, 2, . . .);

a second reference-point-sequence generating circuit for generating, as a second sequence of reference points ($-\tau^t$, t=0, 1, 2, . . .), a plurality of points which line up on said second intersection line, so that said second sequence of reference points ($-\tau^t$, t=0, 1, 2, . . .) and said first sequence of reference points ($\tau^t$, t=0, 1, 2, . . .) share a beginning point ($\tau^0$), and said second sequence of reference points ($-\tau^t$, t=0, 1, 2, . . .) has the same cross ratio (inharmonic ratio) as the cross ratio of said first sequence of reference points ($\tau^t$, t=0, 1, 2, . . .);

a first intersection-point obtaining circuit for obtaining a first intersection point of a plurality of third intersection lines at which a plurality of third planes respectively intersecting said predetermined projection surface, said plurality of third planes each containing said projection center, one movement point in said sequence of movement points ($x^t$, t=0, 1, 2, . . .), and one reference point, corresponding to the movement point, in said first sequence of reference points ($\tau^t$, t=0, 1, 2, . . .);

a second intersection-point obtaining circuit for obtaining a second intersection point of a plurality of fourth intersection lines at which a plurality of fourth planes respectively intersecting the predetermined projection surface, said plurality of fourth planes each containing said projection center, one movement point in said sequence of movement points ($x^t$, t=0, 1, 2, . . .), and one reference point, corresponding to the movement point, in said second sequence of reference points ($-\tau^t$, t=0, 1, 2, . . .); and a geometrical information obtaining circuit, operatively connected to said first and second intersection-point obtaining circuits, for obtaining geometrical information on the object with respect to said camera position, based on the positions of said first and second intersection points.

67. An apparatus according to claim 66, wherein in said first reference-point-sequence generating circuit, said sequence of movement ($x^t$, t=0, 1, 2, . . .) and said sequence of reference points ($\tau^t$, t=0, 1, 2, . . .) share a common point as their beginning points ($x^0$ and $\tau^0$).

68. An apparatus according to claim 67, wherein said plurality of camera positions line up in said predetermined direction with arbitrary pitches, wherein said first reference-point-sequence generating circuit generates said sequence of reference points ($\tau^t$, t=0, 1, 2, . . .) by means for generating a first auxiliary sequence of points ($T^t$, t=0, 1, 2, . . .) which line up with the same pitches as said arbitrary pitches on a straight line (lT) passing through an arbitrary position on another straight line passing through said center of projection and said beginning point ($x^0$) of the sequence of movement points ($x^t$, t=0, 1, 2, . . .), where the beginning point ($T^0$) of said first auxiliary sequence of reference points ($T^t$, t=0, 1, 2, . . .) is said arbitrary point, and means for projecting each point of said first auxiliary sequence of points ($T^t$, t=0, 1, 2, . . .) onto said predetermined plane or surface of the second order from said center of projection, and wherein said second reference-point-sequence generating circuit generates said second sequence of reference points ($-\tau^t$, t=0, 1, 2, . . .) by means for generating a second auxiliary sequence of points ($-T^t$, t=0, 1, 2, . . .) which line up in the direction opposite to said first auxiliary sequence of reference points ($T^t$, t=0, 1, 2, . . .) with the same pitches as said arbitrary pitches on said straight line (lT) passing through said arbitrary position on said other straight line, where the beginning point ($T^0$) of said second auxiliary sequence of reference points ($-T^t$, t=0, 1, 2, . . .) is said arbitrary point, and means for projecting each point of said second auxiliary sequence of points ($-T^t$, t=0, 1, 2, . . .) onto said predetermined plane or surface of the second order from the center of projection.

69. An apparatus according to claim 68, further comprising:

first point-at-infinity defining means for defining a first point at infinity ($x^\infty$) of said sequence of movement points as an intersection point of said predetermined projection surface and a first straight line passing through said projection center and being parallel to a direction of shooting said object by said camera when said camera is moved to infinity in said predetermined direction; and second point-at-infinity defining means for defining a second point at infinity ($\tau^\infty$) of said first and second sequences of reference points ($\tau^t$ and $-\tau^t$, $t=0, 1, 2, \ldots$) as an intersection point of said predetermined projection surface and a straight line passing through said projection center and being parallel to said straight line (lT) passing through said arbitrary position on a second straight line passing through said projection center and said beginning point ($x^0$) of the sequence of movement points ($x^t$, $t=0, 1, 2, \ldots$); and reference point determining means for determining a third reference point on a fifth intersection line of said predetermined projection surface and a fifth plane containing said projection center and said first and second intersection points so that an angle $\gamma$ between a direction to the third reference point and the direction to said second point at infinity ($\tau^\infty$) of said first and second sequences of reference points ($\tau^t$ and $-\tau^t$, $t=0, 1, 2, \ldots$) at said projection center on said predetermined projection surface, is defined as $$\gamma = \cot^{-1}((\cot\alpha + \cot\beta)/2),$$

where $\alpha$ denotes an angle between a direction to said first intersection point and a direction to said second point at infinity ($\tau^\infty$) of said first and second sequences of reference points ($\tau^t$ and $-\tau^t$, $t=0, 1, 2, \ldots$) at said projection center, and $\beta$ denotes an angle between a direction to said second intersection point and the direction to said second point at infinity ($\tau^\infty$) of said first and second sequences of reference points ($\tau^t$ and $-\tau^t$, $t=0, 1, 2, \ldots$) at said projection center;

wherein in said geometrical information obtaining circuit, a distance r from an initial camera position to a point, corresponding to the image element of said object is obtained by $$r = R^0 \cdot |\sin(\gamma - \alpha)| / |\sin\alpha|,$$

where $R^0$ denotes a distance from said projection center to said beginning point ($T^0$) of said first auxiliary sequence of points ($T^t$, $t=0, 1, 2, \ldots$).

70. An apparatus according to claim 69, further comprising:

contour line segment extracting means for extracting a contour line segment (l) from each contour image extracted by the contour image extracting means; and said projection means obtaining, by an intersection point of said predetermined projection surface and a normal line, passing through said projection center, of a sixth plane containing the projection center and the contour line segment (l), a projected point (s) of each contour line segment for each of a plurality of images, where said projected points (s) obtained from said plurality of images are regarded as the points of said sequence of movement points, said projection means comprising:

beginning point selecting means for selecting a beginning point ($s^0$) of a sequence of movement points ($s^t$, $t=0, 1, 2, \ldots$, t is a frame number), where said projected points (s) are obtained from said plurality of images and are regarded as the points of said sequence of movement points ($x^t$, $t=0, 1, 2, \ldots$);

said geometrical information obtaining circuit obtaining said beginning point ($s^0$) of the sequence of movement points made to be the same as said beginning point of said first and second sequence of reference points, said geometrical information obtaining means comprising:

an intersection point obtaining means for obtaining a third intersection point (Ss) of said predetermined projection surface and a normal line, passing through said projection center of a seventh plane containing a trace of said sequence of movement points ($s^t$, $t=0, 1, 2, \ldots$); and distance obtaining means for obtaining a distance h from the initial camera position to a foot of a perpendicular line which is dropped to a portion of the object corresponding to said contour line segment which is subject to the measurement, by equations $h = r \cdot \sin\pi$, and $\pi = \cos^{-1}(v \cdot Ss)$ using the distance r, where v denotes a first vector being directed in a known direction of the movement of said camera, Ss denotes a second vector being directed to said third intersection point (Ss), and ($v \cdot Ss$) denotes an inner product of the first and second vectors.

71. An apparatus according to claim 70, wherein said camera comprises a moving device for moving said camera;

said apparatus further comprising:

a monitor device for displaying an image;

a superimposer for controlling the superimposition of an image of points of said contour image on the image which is taken by said camera, and displaying the superimposed image on said monitor device;

a pointing device for receiving information on a designated position, the information on said designated position being manually input to said monitor device;

contour point display means for generating an image of the points to be displayed on said monitor device according to outputs of said contour extracting means and said contour point candidate selecting means; and contour line segment selecting means for selecting a contour line segment nearest to said designated position pointed to by said pointing device, among the contour line segments contained in said contour image supplied from said contour extracting means, said projected point (s) obtained by said projection means for the contour line segment selected by said contour line segment selecting means;

wherein in said beginning point selecting means, said beginning point ($s^0$) can be selected by inputting through said pointing device a position of one of the projected points of the contour line segment (l) corresponding to the plurality of camera positions and being displayed on said monitor device, said projected point (s) of the selected line segment is regarded as the beginning point ($s^0$).

72. An apparatus according to claim 69, further comprising:
point selecting means for selecting a point of said contour image which is extracted from the image taken in the initial camera position of said plurality of camera positions, said selected point of contour is regarded as said image element to be projected onto the predetermined projection surface; and wherein
a distance to a point on said object corresponding to said point of said contour image selected by said point selecting means is obtained in said geometrical information obtaining means assuming that a direction of said point at infinity of said sequence of movement points is equal to a known direction (v) of the movement of said camera.

73. An apparatus according to claim 72, wherein
said camera comprises a moving device for moving said camera;
and wherein said apparatus further comprises:
a monitor device for displaying an image;
a superimposer for controlling superimposition of an image of points of one of said contour images on the image which is taken by said camera, and displaying the superimposed image on said monitor device;
a pointing device for receiving information on a designated position, the information on said designated position being manually input to said monitor device;
contour point display means for generating an image of the points to be displayed on said monitor device, according to outputs of said contour image extracting means and said contour point candidate selecting means;
means for obtaining a distance to the selected point of one of said contour images in a three-dimensional space regarding the selected point as said image element;
contour point three-dimensional measuring means for obtaining the position of the point of contour which is selected by the contour point candidate selecting means, based on the points of said one of said contour images obtained during the movement of said camera.

74. An apparatus according to claim 73, further comprising:
means for determining a direction to said third reference point wherein said selected point of contour is regarded as said image element; and
means for comparing said direction of said third reference point with the direction of movement of said camera which is known in advance.

75. An apparatus according to claim 72, wherein
said camera further comprises a moving device for moving said camera;
said apparatus further comprising:
a monitor device for displaying an image;
a superimposer for controlling the superimposition of an image of points of said one of said contour images on said image which is taken by said camera, and displaying the superimposed image on said monitor device;
a pointing device for receiving information on a designated position, the information on the designated position being manually input to said monitor device;

contour point candidate selecting means for selecting a point nearest to said designated position pointed to by said pointing device, among the points of the contour supplied from said contour image extracting means;
contour point display means for generating an image of the points to be displayed on the monitor device, according to outputs of said contour image extracting means and said contour point candidate selecting means;
plural point selecting means for selecting a plurality of points of said contour images which are subject to the measurement from said image which is obtained at the initial position of said camera;
direction determining means for determining the direction to said third reference point for each of said plurality of points of said contour image, where each of said plurality of selected points of said contour image is regarded as said image element; and
movement direction obtaining means for obtaining the direction of the movement of said camera by obtaining an average of the determined directions to the third reference points obtained by said reference point determining means for the plurality of points selected by said plural point selecting means.

76. An apparatus according to claim 72, further comprising means for confirming that a relative angle between the direction of said third reference point (c) and the direction of the movement of said camera, which is known in advance, is equal to 90 degrees.

77. An apparatus according to claim 69, wherein
said camera comprises a moving device for moving said camera;
said apparatus further comprising:
a monitor device for displaying said image;
a superimposer for controlling the superimposition of an image of points of said contour image on said image which is taken by said camera, and displaying the superimposed image on said monitor device;
a pointing device for receiving information on a designated position, the information on said designated position being manually input to said monitor device;
contour line segment selecting means for selecting a contour line segment nearest to said designated position pointed to by said pointing device, among the contour line segments contained in said contour image supplied from the contour image extracting means;
contour point displaying means for generating an image of the points to be displayed on said monitor device, according to outputs of said contour image extracting means and the contour point candidate selecting means;
contour line segment extracting means for extracting a contour line segment (l) from each of said contour images extracted in said contour image extracting means; and
projected point obtaining means for obtaining as a projected point of the contour line segment an intersection point of the predetermined projection surface and a normal line, passing through the projection center of a plane containing said projection center and a contour line segment (l);
beginning point selecting means for selecting the beginning point ($s^0$) of the sequence of movement points ($s^t$, t=0, 1, 2, ..., t is a frame number) of the projected points (s) of the contour line segment, where said projected points (s) which are obtained from said plurality of images, are regarded as the points of said sequence of movement points ($x^t$, t=0, 1, 2, ...);

said geometrical information obtaining circuit comprising:

an intersection point obtaining means for obtaining an intersection point (Ss) of said predetermined projection surface and a normal line, passing through said center of projection, of a plane containing a trace of said sequence of movement points ($s^t$, t=0, 1, 2, ...); and an orientation obtaining circuit for obtaining the orientation ($sh^0$) of a perpendicular line which is dropped from said camera to the line segment which is subject to the measurement, by an exterior product of said intersection point (Ss) of said predetermined plane or surface of the second order, and a normal line, passing through said center of projection, of a plane containing a trace of said sequence of movement points and said reference point ($c=s^0$), wherein said beginning point ($s^0$) of the sequence of movement points is made to be the same as said beginning point of said first and second sequence of reference points.

78. An apparatus comprising:

a camera, for taking a plurality of images of an object which is subject to the measurement, at a plurality of camera positions, respectively, by moving said camera in a predetermined direction; and a data processor, operatively connected to said camera, for processing image data which is taken by said camera, said data processor comprising:

a contour image extracting circuit, operatively connected to said camera, for extracting a plurality of contour images respectively from said plurality of images taken by said camera, where each of said plurality of contour images contains at least one image element of said object;

a projector for projecting said at least one image element in each of said plurality of contour images of said object onto a projected point on a predetermined projection surface, for each of said at least one image element, from a predetermined projection center corresponding to a camera center, to obtain, for each of said at least one image element, a plurality of projected points on a predetermined projection surface as a sequence of movement points ($x^t$, t=0, 1, 2, ...) which line up on a first intersection line at which said predetermined projection surface intersects with a first plane containing said predetermined projection center, where said predetermined projection surface is one of a plane and a surface of the second order;

a plane-projection-reference-point obtaining circuit for obtaining, as a reference point for plane projection, a first intersection point of said predetermined projection surface and a straight line which passes through said projection center and is perpendicular to an arbitrary projection plane which contains said projection center;

a plane projection circuit for obtaining a sequence of projected movement points ($x'^t$, t=0, 1, 2, ...), by obtaining a plurality of second planes each containing said projection center, said reference point for plane projection, and one movement point of the sequence of movement points ($x^t$, t=0, 1, 2, ...), by obtaining a plurality of second intersection lines at which said plurality of second planes respectively intersect with said predetermined projection surface, and by obtaining, as said sequence of projected movement points ($x'^t$, t=0, 1, 2, ...), a plurality of second intersection points at which said plurality of second intersection lines respectively intersect with said predetermined projection surface;

a reference-point-sequence generating circuit for generating, as a sequence of reference points ($\tau^t$, t=0, 1, 2, ...), a plurality of points which line up on a third intersection line of said predetermined projection surface and a third plane containing said projection center, so that said sequence of reference points ($\tau^t$, t=0, 1, 2, ...) and said sequence of projected movement points ($x'^t$, t=0, 1, 2, ...) share a point, and said sequence of reference points ($\tau^t$, t=0, 1, 2, ...) is not identical with either of said sequence of movement points ($x^t$, t=0, 1, 2, ...) and said sequence of projected movement points ($x'^t$, t=0, 1, 2, ...), and has the same cross ratio (inharmonic ratio) as a cross ratio of said sequence of projected movement points ($x^t$, t=0, 1, 2, ...);

an intersection-point obtaining circuit for obtaining a third intersection point of a plurality of third intersection lines at which a plurality of fourth planes respectively intersecting the predetermined projection surface, said plurality of fourth planes each containing said projection center, one projected movement point in said sequence of projected movement points ($x'^t$t, t=0, 1, 2, ...), and one reference point, corresponding to the projected movement point, in said sequence of reference points ($\tau^t$, t=0, 1, 2, ...); and a geometrical information obtaining circuit, operatively connected to said intersection-point obtaining circuit, for obtaining geometrical information on said object with respect to said camera position, based on the position of said third intersection point.

79. A method of measuring a position and orientation of an object, comprising the steps of:

(a) moving a camera in a predetermined direction with regard to an object subject to measurement;

(b) projecting movement points from the image of the object based on positions of the camera onto a plane or second order surface at an intersection with a plane formed by the positions of the camera and a center of projection;

(c) generating reference points, each corresponding to one of said movement points, on the plane or second order surface at an intersection with a plane containing the center of projection, said reference points sharing a point with said movement points and having a same cross harmonic ratio as said movement pints;

(d) obtaining an intersection point of lines on the plane or second order surface that connect corresponding pairs of said movement points and said reference pints; and (e) obtaining the position and orientation of the object based on the positions of the camera, the center of projection and said intersection point to achieve environment recognition.

80. A method according to claim 79, wherein the surface of the second order is a sphere and the center of projection is a center of the sphere.

81. A method according to claim 79, wherein the surface of the second order is a circular cylinder and the center of projection is a point on the axis of the circular cylinder.

82. A method according to claim 79, wherein the surface of the second order is a sphere and the center of projection is a center of the sphere.

83. A method according to claim 79, wherein the surface of the second order is a circular cylinder and the center of projection is a point on the axis of the circular cylinder.

84. A method of measuring a position and orientation of an object, comprising the steps of:
 (a) moving a camera to various positions with regard to an object subject to measurement;
 (b) projecting movement points from an image of an object based on the positions of a camera onto a plane or second order surface of an intersection with a plane formed by the positions of the camera and a center of projection;
 (c) generating a first sequence of reference points, each corresponding to one of said movement points, on the plane or second order surface at an intersection with a plane containing the center of projection, said reference points sharing a point with said movement points and having a same cross harmonic ratio as said movement points;
 (d) generating a second sequence of reference points, each corresponding to one of said movement points, on the plane or second order surface at an intersection with a plane containing the center of projection, said reference points sharing a point with said movement points and having a same cross harmonic ratio as said movement points, said sequence of reference points lining up in the opposite direction to said first sequence of reference points;
 (e) obtaining a first intersection point of lines on the plane or second order surface that connect corresponding pairs of said movement points and said first sequence of reference points;
 (f) obtaining a second intersection point of lines on the plane or second order surface that connect corresponding pairs of said movement points and said second sequence of reference points; and
 (g) obtaining the position and orientation of the object based on the positions of the camera, the center of projection and said first and second intersection points to achieve environment recognition.

* * * * *

UNITED STATES PATENT AND TRADEMARK OFFICE
CERTIFICATE OF CORRECTION

PATENT NO. : 5,446,798          Page 1 of 18
DATED      : August 29, 1995
INVENTOR(S): Toshihiko MORITA et al.

It is certified that error appears in the above-indentified patent and that said Letters Patent is hereby corrected as shown below:

Col. 2,   line 34, after "obtained" insert --,-- (comma).

Col. 4,   line 41, delete ")";

line 56, after ")" insert --,-- (comma); and line 58, after "Finally," insert --a--.

Col. 5,   line 11, delete ")";

line 17, delete ")";

line 32, delete ")"; and line 58, delete "of" (first occurrence).

Col. 6,   line 43, change "showin" to --showing--.

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

Col. 9, line 51, change $$\frac{\sin\ x^t x^{t+2}}{\sin\ x^t x^{t+3}} : \frac{\sin\ x^{t+1} x^{t+2}}{\sin\ x^{t+1} x^{t+3}} = \frac{\sin\ \tau^t \tau^{t+2}}{\sin \tau^t \tau^{t+3}} : \frac{\sin\ \tau^{t+1} \tau^{t+2}}{\sin\ \tau^{t+1} \tau^{t+3}}$$
$$(t=0,1,2\ldots)$$

to $$\frac{\sin\ \widehat{x^t x^{t+2}}}{\sin\ \widehat{x^t x^{t+3}}} : \frac{\sin\ \widehat{x^{t+1} x^{t+2}}}{\sin\ \widehat{x^{t+1} x^{t+3}}} = \frac{\sin\ \widehat{\tau^t \tau^{t+2}}}{\sin \widehat{\tau^t \tau^{t+3}}} : \frac{\sin\ \widehat{\tau^{t+1} \tau^{t+2}}}{\sin\ \widehat{\tau^{t+1} \tau^{t+3}}}$$
$$(t=0,1,2\ldots)$$

line 56, after "equation," insert --$x^t x^{t+2}$--.

Col. 10, line 68, delete "1T" and insert --1τ--.

UNITED STATES PATENT AND TRADEMARK OFFICE
CERTIFICATE OF CORRECTION

PATENT NO. : 5,446,798     Page 3 of 18

DATED : August 29, 1995

INVENTOR(S) : Toshihiko MORITA et al.

It is certified that error appears in the above-indentified patent and that said Letters Patent is hereby corrected as shown below:

Col. 11, line 7, delete "1T" and insert --1τ--;

line 18, delete "1T" and insert --1τ--;

line 19, delete "1T" and insert --1τ--;

line 20, change "1T⊥0T⁰" and insert --1τ⊥0τ⁰--;

line 25, change "Great" to --great--;

line 26, before "=" insert -- $\widehat{\tau^0\tau^t}$ --;

line 30, after "case," insert -- $\widehat{\tau^0\tau^t}$ --;

line 32, change "τhu o" to --$\tau^0$--;

line 35, after "is," insert -- $\widehat{\tau^0\tau^\infty}$ --;

line 41, change "1T⊥0T⁰" and insert --1τ⊥0τ⁰--; and line 56, change "beg inning" to --beginning--.

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

Col. 12, line 12, change equation (5) to read $$--X^0 = r \cdot \overrightarrow{Ox^0} / | \overrightarrow{Ox^0} | --;$$

line 15, change "$Ox^0/|Ox^0|$" to $-- \overrightarrow{Ox^0} / |Ox^0| --$;

line 18, change "$1T \perp OT^0$" to $--1T \perp OT^0 --$;

line 42, change "three dimensional" to --three-dimensional--; and line 66, delete "1T" and insert --1T--.

UNITED STATES PATENT AND TRADEMARK OFFICE
CERTIFICATE OF CORRECTION

PATENT NO. : 5,446,798     Page 5 of 18

DATED : August 29, 1995

INVENTOR(S) : Toshihiko MORITA et al.

It is certified that error appears in the above-indentified patent and that said Letters Patent is hereby corrected as shown below:

Col. 13,    line 9, change "$1T\perp OT^0$" to --$1T\perp OT^0$--;

line 17, after "is" insert -- $\widehat{\tau^0 \tau^\infty}$ --;

line 20, after "equation." insert -- $\widehat{\tau^0 \tau^t}$ --;

line 24, after "and" insert -- $\widehat{\tau^0 \tau^t}$ --;

line 25, change "$<\tau^0 \tau^1$" to --$\angle \tau^0 \tau^1$--;

line 28, change "$\tau^{28}$" to --$\tau^0$--;

line 30, change "$1T\perp OT^0$" to --$1T\perp OT^0$--;

line 31, change "$\tau^\infty$" to --$\tau^0$--;

line 62, change "$x^\infty$" to --$x^0$--;

line 63, change "$\tau^\infty$" to --$\tau^0$--; and line 67, change "$\tau^\infty$" to --$\tau^0$--.

UNITED STATES PATENT AND TRADEMARK OFFICE
CERTIFICATE OF CORRECTION

PATENT NO. : 5,446,798         Page 6 of 18

DATED : August 29, 1995

INVENTOR(S) : Toshihiko MORITA et al.

It is certified that error appears in the above-indentified patent and that said Letters Patent is hereby corrected as shown below:

Col. 14, line 5, change equation (9) to read $$--X^0 = r \cdot \overrightarrow{Ox^0} \,/\, |\overrightarrow{Ox^0}|\, --; \text{ and}$$

line 8, after "x⁰" insert --is known--.

Col. 16, line 62, delete "1T" and insert --1τ--.

Col. 17, line 1, delete "1T" and insert --1τ--;

line 17, delete "1T" and insert --1τ--;

line 18, delete "1T" and insert --1τ--;

line 19, change "1T⊥OT⁰" and insert --1τ⊥Oτ⁰--;

line 27, before "=" insert -- $\widehat{\tau^0 \tau^t}$ --;

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

line 30, after "case," insert -- $\widehat{\tau^0\tau^t}$ --;

line 38, before "=", insert -- $\widehat{\tau^0(-\tau^t)}$ --;

line 48, before "=", insert -- $\widehat{\tau^0\tau^\infty}$ --; and line 54, change "1T⊥OT⁰" to --1T⊥OT⁰--.

Col. 19, line 17, change equation (18) to

--$X^0 = r \cdot \vec{Ox^0} / |\vec{Ox^0}|$--.

Col. 21, line 9, change "l" to --L in the three-dimensional space--;

line 10, delete "l" and insert --l--; and line 29, delete "l" and insert --l--.

Col. 22, line 5, delete " 1 " and insert --(1)--;

line 28, delete "(1)" and insert --(1)--; and

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

line 33, delete "(1)" and insert --(1)--.

Col. 24, line 8, delete "1T" and insert --1τ--;

line 10, delete "1T" and insert --1τ--;

line 26, change "1T⊥0T⁰" to --1τ⊥0τ⁰--;

line 32, before "=", insert -- $\widehat{\tau^0\tau^\infty}$ --;

line 37, before "=", insert -- $\widehat{\tau^0(\tau^t)}$ --;

line 42, change "<τ⁰0τ¹" to --∠τ⁰0τ¹--;

line 48, change "1T⊥0T⁰" to --1τ⊥0τ⁰--;

line 56, before "=", insert -- $\widehat{\tau^0(-\tau^t)}$ --; and

UNITED STATES PATENT AND TRADEMARK OFFICE
CERTIFICATE OF CORRECTION

PATENT NO. : 5,446,798   Page 9 of 18
DATED : August 29, 1995
INVENTOR(S) : Toshihiko MORITA et al.

It is certified that error appears in the above-indentified patent and that said Letters Patent is hereby corrected as shown below:

line 62, before "=", insert -- $\widehat{\tau^0 \tau^\infty}$ --; and move

"(25)" to right margin.

Col. 25, line 8, change "$x^\infty = \tau^\infty$," to --$x^\infty = \tau^\infty$)--;

Col. 26, line 20, change equation (30) to

--$X^0 = r \cdot \overrightarrow{Ox^0} / |Ox^0|$--; and line 60, change "Given," to --given,--.

Col. 27, line 60, change "$h = r \cdot \sin\pi$" to --$h = r \cdot \sin\eta$--, and move "(31)" to the right margin; and line 62, change "$\pi = \cos^{-1}(v \cdot Ss)$." to --$\eta = \cos^{-1}(v \cdot Ss)$.--.

Col. 28, line 1, change "$sh^0 = [s^0 \times Sx]$." to --$Sh^0 = [s^0 \times Ss]$.--; and line 27, change "$S^\infty$" to --$s^\infty$--.

UNITED STATES PATENT AND TRADEMARK OFFICE
CERTIFICATE OF CORRECTION

PATENT NO. : 5,446,798
DATED : August 29, 1995
INVENTOR(S) : Toshihiko MORITA et al.

It is certified that error appears in the above-indentified patent and that said Letters Patent is hereby corrected as shown below:

Col. 31, line 10, delete "1" and insert --l--;
line 11, delete "1" and insert --l--;
line 26, change "above." to --above--; and
line 40, change equation (35) to read $$--E = r \cdot \overrightarrow{Os'^0r} / |\overrightarrow{Os'^0r}| --\ .$$

Col. 33, line 17, change "$\tau^0$, x$^0$, and a" to $$--\overrightarrow{\tau^0},\ \overrightarrow{x^0},\ and\ \overrightarrow{a}--\ ;$$

line 20, change "cos $<\tau^0 Ox^0 = (\tau^0, x^0)/|\tau^0||x^0|$" to $$--\cos \angle \tau^0 OX^0 = (\overrightarrow{\tau^0}, \overrightarrow{x^0}) / |\overrightarrow{\tau^0}||\overrightarrow{x^0}|--\ ;$$

line 22, change "cos $<\tau^0 Oa = (\tau^0, a)/|\tau^0||a|$" to $$--\cos \angle \tau^0 Oa = (\overrightarrow{\tau^0}, \overrightarrow{a}) / |\overrightarrow{\tau^0}||\overrightarrow{a}|--\ ;$$

UNITED STATES PATENT AND TRADEMARK OFFICE
CERTIFICATE OF CORRECTION

PATENT NO. : 5,446,798
DATED : August 29, 1995
INVENTOR(S) : Toshihiko MORITA et al.

It is certified that error appears in the above-indentified patent and that said Letters Patent is hereby corrected as shown below:

line 43, change "$r=R^0 \cdot |A \cdot \alpha|/|B \cdot (\gamma-\alpha)|$" to
--$r=R^0 \cdot |A \cdot \overline{\alpha}|/|B \cdot (\overline{\gamma}-\overline{\alpha})|$--;

line 45, delete line in its entirety and insert

--where $\overline{\gamma} = \overparen{\tau^0 x^0}$ , $\overline{\alpha} = \overparen{\tau^0 a}$ , $A = \overrightarrow{Ox^0}$ , and $B = \overrightarrow{O\tau^0}$ .--;

line 51, change "$\alpha/\sin \alpha = B/\sin \epsilon$" to
--$\overline{\alpha}/\sin \alpha = B/\sin \epsilon$--;

line 55, change "$(\gamma-\alpha)/\sin(\gamma-\alpha)=A/\sin(\pi=\epsilon)$" to
--$(\overline{\gamma}-\overline{\alpha})/\sin(\gamma-\alpha)=A/\sin(\pi-\epsilon)$--;

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

line 57, change "$\epsilon = <\tau^0 0a$" to --$\epsilon = \angle \tau^0 0a$--; and line 60, change "$\sin \alpha / \sin(\gamma-\alpha) = (A/B) \cdot [\alpha/(\gamma-\alpha)]$" to --$\sin \alpha / \sin(\gamma-\alpha) = (A/B) \cdot [\overline{\alpha}/(\overline{\gamma}-\overline{\alpha})]$--.

Col. 35, line 12, change "Generating" to

--generating--.

Col. 39, line 58, delete "1T" and insert --1τ--.

Col. 40, line 2, delete "(1T)" and insert --(1τ)--;

line 11, change "(X∞)" to --($X^\infty$)--;

line 18, change "(τ∞)" to --($\tau^\infty$)--;

line 23, delete "(1T)" and insert --(1τ)--;

line 39, change "(X∞)" to --($X^\infty$)--;

line 40, change "(τ∞)" to --($\tau^\infty$)--;

line 44, change "(τ∞)" to --($\tau^\infty$)--; and line 54, delete "(1T)" and insert --(1τ)--.

UNITED STATES PATENT AND TRADEMARK OFFICE
CERTIFICATE OF CORRECTION

PATENT NO. : 5,446,798
DATED : August 29, 1995
INVENTOR(S) : Toshihiko MORITA et al.

It is certified that error appears in the above-indentified patent and that said Letters Patent is hereby corrected as shown below:

Col. 41, line 1, change "$(X\infty)$" to --$(X^\infty)$--;

line 8, change "$(T\infty)$" to --$(T^\infty)$--;

line 11, change "$(X\infty)$" to --$(X^\infty)$--;

line 12, change "$(X\infty)$" to --$(X^\infty)$--;

line 23, delete "(1T)" and insert --$(1\tau)$--;

line 25, change "$(X\infty)$" to --$(X^\infty)$--;

line 37, delete "(1T)" and insert --$(1\tau)$--;

line 66, delete "(1T)" and insert --$(1\tau)$--; and line 68, change "$(X\infty)$" to --$(X^\infty)$--.

Col. 43, line 56, delete "(1T)" and insert --$(1\tau)$--.

Col. 44, line 7, delete "(1T)" and insert --$(1\tau)$--;

line 18, delete "(1T)" and insert --$(1\tau)$--;

line 27, change "$(X\infty)$" to --$(X^\infty)$--; and line 39, delete "(1T)" and insert --$(1\tau)$--.

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

Col. 45, line 4, change "$r\text{-}R^0\cdot|\sin(\gamma-\alpha|/|\sin\alpha|$" to --$r=R^0\cdot|\sin(\gamma-\alpha)|/|\sin\alpha|$--;

line 52, change "(l)" to --(1)--; and line 59, change "(l)" to --(1)--.

Col. 46, line 13, change "$(_{sh}{}^0)$" to --$(Sh^0)$;

line 27, change "(l)" to --(1)--;

line 34, change "(l)" to --(1)--;

line 62, change "$h=r\cdot\sin\pi,$" to --$h=r\cdot\sin\eta,$--; and line 63, change "$\pi=\cos^{-1}(v\cdot Ss)$" to --$\eta=\cos^{-1}(v\cdot Ss)$--.

Col. 47, line 49, delete "(1T)" and insert --(1T)--.

Col. 48, line 4, delete "$(\tau^t)$" and insert --$(\tau^\infty)$--;

line 12, change "$r=R^0\cdot|\sin(\gamma-\alpha|/|\sin\alpha|$" to

--$r=R^0\cdot|\sin(\gamma-\beta)|/|\sin\beta|$--;

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

Page 15 of 18

It is certified that error appears in the above-indentified patent and that said Letters Patent is hereby corrected as shown below:

line 26, delete "(1T)" and insert --(1τ)--; and line 46, delete "(1T)" and insert --(1τ)--.

Col. 49, line 14, delete "(1T)" and insert --(1τ)--;

line 20, delete "(1T)" and insert --(1τ)--;

line 31, delete "(1T)" and insert --(1τ)--;

line 38, delete "(1T)" and insert --(1τ)--; and line 47, delete "(1T)" and insert --(1τ)--.

Col. 50, line 30, change "(1)" to --(l)--;

line 37, change "(1)" to --(l)--;

line 62, after ");" insert --and--; and line 68, change "h=r·sinπ, to --h=r·sinη,--.

Col. 51, line 1, change "π=$\cos^{-1}$ (v·Ss) to --η=$\cos^{-1}$ (v·Ss)--;

line 10, change "(1)" to --(l)--; and line 17, change "(1)" to --(l)--.

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

Col. 52, line 13, "$r=R^0 \cdot |\sin(\gamma-\alpha)|/|\sin\alpha|$" to

--$r=R^0 \cdot |\sin(\gamma-\beta)|/|\sin\beta|$--;

line 31, delete "(1T)" and insert --(1т)--;

line 41, delete "(1T)" and insert --(1т)--; and line 47, delete "(1T)" and insert --(1т)--.

Col. 54, line 33, delete "(1T)" and insert --(1т)--;

* line 45, delete "(1T)" and insert --(1т)--; and

* line 68, delete "(1T)" and insert --(1т)--.

Col. 55, line 33, delete "(1T)" and insert --(1т)--; and

* line 69, delete "(1T)" and insert --(1т)--.

Col. 56, line 15, delete "(1T)" and insert --(1т)--;

line 59, change "(1)" to --(l)--;

line 65, change "(1)" to --(l)--.

UNITED STATES PATENT AND TRADEMARK OFFICE
CERTIFICATE OF CORRECTION

PATENT NO. : 5,446,798

DATED : August 29, 1995

INVENTOR(S) : Toshihiko MORITA et al.

It is certified that error appears in the above-indentified patent and that said Letters Patent is hereby corrected as shown below:

Col. 58, line 4, change "Tt, t=0, 1, 2,...)" to --$T^t$, t=0, 1, 2,...)--.

Col. 60, line 39, delete "(1T)" and insert --(1T)--; and line 58, delete "(1T)" and insert --(1T)--.

Col. 61, line 15, delete "(1T)" and insert --(1T)--;

line 58, change "(1)" to --(1)--; and line 65, change "(1)" to --(1)--.

Col. 62, line 27, change "h=r·sin$\pi$" to --h=r·sin$\eta$--, and change "$\pi$=cos$^{-1}$(v·Ss)" to --$\eta$=cos$^{-1}$(v·Ss)--; and line 64, change "(1)" to --(1)--.

Col. 64, line 58, change "(1)" to --(1)--; and line 66, change "(1)" to --(1)--.

UNITED STATES PATENT AND TRADEMARK OFFICE
CERTIFICATE OF CORRECTION

PATENT NO. :   5,446,798
DATED      :   August 29, 1995
INVENTOR(S) :
               Toshihiko MORITA et al.

It is certified that error appears in the above-indentified patent and that said Letters Patent is hereby corrected as shown below:

Col. 66, line 60, delete "pints" and insert --points--; and line 64, delete "pints" and insert --points--.

Signed and Sealed this

First Day of April, 1997

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,446,798
DATED : August 29, 1995
INVENTOR(S) : Toshihiko MORITA et al.

It is certified that error appears in the above-identified patent and that said Letters Patent is hereby corrected as shown below:

Col. 24, line 41, after "and" insert --  --.

*Col. 44, line 36, delete "is defined".

Signed and Sealed this

Twenty-first Day of April, 1998

Attest:

BRUCE LEHMAN

Attesting Officer

Commissioner of Patents and Trademarks